(12) United States Patent
Fukagawa et al.

(10) Patent No.: US 7,667,801 B2
(45) Date of Patent: Feb. 23, 2010

(54) LIQUID CRYSTAL DISPLAY DEVICE

(75) Inventors: Nobutaka Fukagawa, Minami-ashigara (JP); Hajime Nakayama, Minami-ashigara (JP); Yusuke Ohashi, Minami-ashigara (JP)

(73) Assignee: Fujifilm Corporation, Minato-Ku, Tokyo (JP)

(*) Notice: Subject to any disclaimer, the term of this patent is extended or adjusted under 35 U.S.C. 154(b) by 154 days.

(21) Appl. No.: 11/990,737

(22) PCT Filed: Aug. 22, 2006

(86) PCT No.: PCT/JP2006/316809

§ 371 (c)(1),
(2), (4) Date: Feb. 21, 2008

(87) PCT Pub. No.: WO2007/023990

PCT Pub. Date: Mar. 1, 2007

(65) Prior Publication Data

US 2009/0251650 A1    Oct. 8, 2009

(30) Foreign Application Priority Data

Aug. 22, 2005   (JP) .............................. 2005-239820

(51) Int. Cl.
*G02F 1/1335*      (2006.01)

(52) U.S. Cl. ...................................................... 349/117
(58) Field of Classification Search ................... 349/117
See application file for complete search history.

(56) References Cited

U.S. PATENT DOCUMENTS 7,586,569 B2 * 9/2009 Yano et al. .................. 349/117

FOREIGN PATENT DOCUMENTS

| | | |
|---|---|---|
| JP | 5-19249 A | 1/1993 |
| JP | 2003-170492 A | 6/2003 |
| JP | 2005-49398 A | 2/2005 |
| JP | 2005-128498 A | 5/2005 |
| JP | 2005-283846 A | 10/2005 |
| JP | 2006-91251 A | 4/2006 |
| JP | 2006-119623 A | 5/2006 |

OTHER PUBLICATIONS

Notification Concerning Transmittal of International Preliminary Report on Patentability (IPRP) (Form PCT/IB/326), International Preliminary Report on Patentability (Form PCT/IB/373), Written Opinion of the International Searching Authority (Form PCT/ISA/237) mailed Sep. 26, 2006.
*PCT/ISA/210, PCT/ISA/220 and PCT/ISA/237.

* cited by examiner

*Primary Examiner*—Jerry T Rahll
(74) *Attorney, Agent, or Firm*—Buchanan Ingersoll & Rooney PC

(57) ABSTRACT

A liquid crystal display device comprising a first polarizer, a first retardation film satisfying (1) to (6) below, a liquid crystal cell, a second retardation film satisfying (7) to (12) below, a second polarizer in this order wherein the absorption axis of the first and second polarizer and the slow axis of the first and second retardation film are substantially in parallel, respectively:

$$10\ \text{nm} < Re(548) < 100\ \text{nm} \quad (1)$$

$$20\ \text{nm} < Rth(548) < 400\ \text{nm} \quad (2)$$

$$1.0 < Re(446)/Re(548) < 2.0 \quad (3)$$

$$0.5 < Re(628)/Re(548) < 1.0 \quad (4)$$

$$1.0 < Rth(446)/Rth(548) < 2.0 \quad (5)$$

$$0.5 < Rth(628)/Rth(548) < 1.0 \quad (6)$$

$$40\ \text{nm} < Re(548) < 300\ \text{nm} \quad (7)$$

$$20\ \text{nm} < Rth(548) < 400\ \text{nm} \quad (8)$$

$$0.5 < Re(446)/Re(548) < 1.5 \quad (9)$$

$$0.5 < Re(628)/Re(548) < 2.0 \quad (10)$$

$$0.5 < Rth(446)/Rth(548) < 2.0 \quad (11)$$

$$0.5 < Rth(628)/Rth(548) < 1.5 \quad (12)$$

8 Claims, 1 Drawing Sheet

LIQUID CRYSTAL DISPLAY DEVICE

TECHNICAL FIELD

The present invention relates to a liquid crystal display device, in particular to a VA-mode liquid crystal display device having excellent viewing angle characteristics.

BACKGROUND ART

Every year applications of liquid crystal display devices are broadening for power-saving and space-saving image display devices. Heretofore, one serious defect of liquid crystal display devices is that the viewing angle dependence of images is large, but recently, VA-mode, broad viewing angle liquid crystal display devices have been put into practical use, by which the demand for liquid crystal display devices is rapidly increasing also in the market that requires high-quality images as in TVs.

VA-mode liquid crystal display devices have an advantage in that, as compared with other liquid crystal display modes, the contrast is generally high, but on the other hand, they have a problem in that the viewing angle-dependent contrast and color tone change is great. As a method for compensating it, various optical compensatory films have been proposed. In particular, a method of using two stretched cellulose acylates for an optical compensatory film, as in JP-A-2003-170492, is preferred in that the optical compensatory film may serve also as a protective film of a polarizer and that the liquid crystal display devices comprising the optical compensatory film may be thinned.

However, with the recent tendency more promoted in the art toward large-panel display devices mainly for large-size TVs, more definite display capabilities are being required. In the above-mentioned method, the compensation for viewing angle-dependent color tone change is insufficient, and further improvements thereon are desired.

DISCLOSURE OF THE INVENTION

An object of the invention is to provide a liquid crystal display device which can be produced at low costs in a simplified manner and of which the viewing angle dependence of color tone is low.

The above-mentioned problems can be solved by the following means:

(1) A liquid crystal display device comprising a liquid crystal cell, a first polarizer disposed on one side of the liquid crystal cell, a second polarizer disposed on the other side of the liquid crystal cell, a first retardation film disposed between the first polarizer and the liquid crystal cell, and a second retardation film disposed between the second polarizer and the liquid crystal cell, wherein the absorption axis of the first polarizer and the slow axis of the first retardation film are substantially in parallel to each other, the transmission axis of the second polarizer and the slow axis of the second retardation film are substantially in parallel to each other, the first retardation film satisfies the following formulae (1) to (6), and the second retardation film satisfies the following formulae (7) to (12):

$$10 \text{ nm} < Re(548) < 100 \text{ nm} \tag{1}$$

$$20 \text{ nm} < Rth(548) < 400 \text{ nm} \tag{2}$$

$$1.0 < Re(446)/Re(548) < 2.0 \tag{3}$$

$$0.5 < Re(628)/Re(548) < 1.0 \tag{4}$$

$$1.0 < Rth(446)/Rth(548) < 2.0 \tag{5}$$

$$0.5 < Rth(628)/Rth(548) < 1.0 \tag{6}$$

$$40 \text{ nm} < Re(548) < 300 \text{ nm} \tag{7}$$

$$20 \text{ nm} < Rth(548) < 400 \text{ nm} \tag{8}$$

$$0.5 < Re(446)/Re(548) < 1.5 \tag{9}$$

$$0.5 < Re(628)/Re(548) < 2.0 \tag{10}$$

$$0.5 < Rth(446)/Rth(548) < 2.0 \tag{11}$$

$$0.5 < Rth(628)/Rth(548) < 1.5 \tag{12}$$

(2) The liquid crystal display device of (1), wherein the first retardation film and the second retardation film satisfy the following formula:

$$\lambda 1.0(1st) - \lambda 1.0(2nd) > 0 \tag{A}$$

wherein $\lambda 1.0$ (1st) indicates a wavelength at which the absorbance of the first retardation film is 1.0, as calculated in terms of the film having a thickness of 80 μm, within a wavelength range of from 200 nm to 700 nm; and $\lambda 1.0$(2nd) indicates a wavelength at which the absorbance of the second retardation film is 1.0, as calculated in terms of the film having a thickness of 80 μm, within a wavelength range of from 200 nm to 700 nm.

(3) The liquid crystal display device of (1) or (2), wherein the first retardation film also serves as a protective film of the first polarizer and/or the second retardation film also serves as a protective film of the second polarizer.

(4) The liquid crystal display device of any one of (1) to (3), wherein at least one of the first retardation film and the second retardation film is a cellulose acylate film.

(5) The liquid crystal display device of any one of (1) to (4), wherein the first retardation film contains a compound having at least one absorption maximum within a range of from 200 nm to 380 nm.

(6) The liquid crystal display device of any one of (1) to (5) wherein the first retardation film is a cellulose acylate film stretched in the longitudinal direction (machine direction).

(7) The liquid crystal display device of any one of (1) to (6), wherein the second retardation film is a cellulose acylate film stretched in the cross direction.

(8) The liquid crystal display device of any one of (1) to (7), wherein the liquid crystal cell is a VA-mode cell.

According to the invention, a liquid crystal display device can be provided at low costs in a simplified manner, of which the viewing angle dependence of color tone is low.

BRIEF DESCRIPTION OF THE DRAWING

In FIG. 1, 1 denotes upper polarizing plate, 2 denotes direction of the absorption axis of upper polarizing plate, 5 denotes upper electrode substrate of liquid crystal cell, 6 denotes alignment control direction of upper substrate, 7 denotes liquid crystal layer, 8 denotes lower electrode substrate of liquid crystal cell, 9 denotes alignment control direction of lower substrate, 10 denotes liquid crystal display device, 12 denotes lower polarizing plate and 13 denotes direction of absorption axis of lower polarizing plate.

BEST MODE FOR CARRYING OUT THE INVENTION

Figure 1:
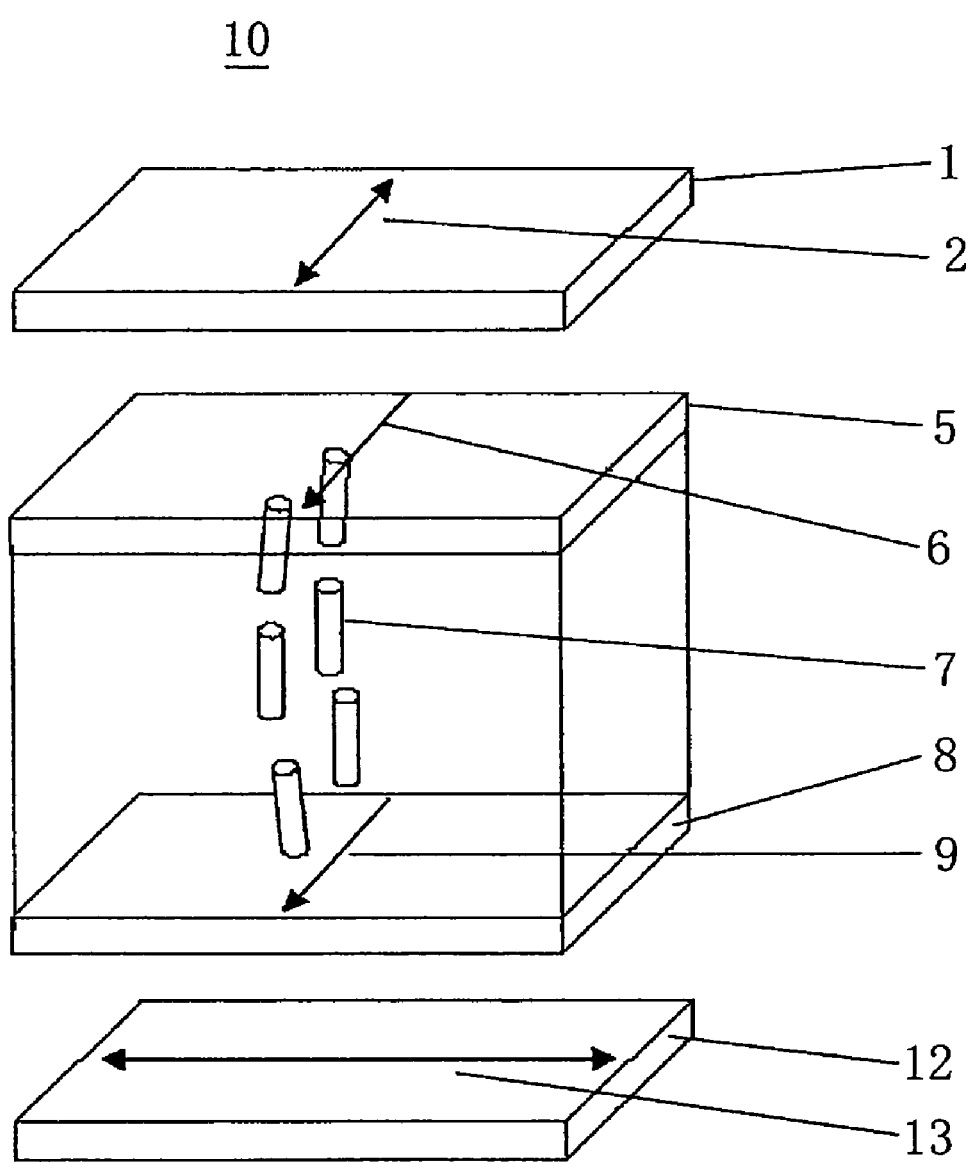
FIG. 1 is a schematic view showing an example of the liquid crystal display device of the invention.

The contents of the invention are described in detail hereinunder. In this description, the numerical range expressed by the wording "a number to another number" means the range that falls between the former number indicating the lowermost limit of the range and the latter number indicating the uppermost limit thereof.

In the invention, the wording "substantially in parallel" means that the angle between the two axes is from −10° to +10°.

[Retardation of Film]

In this description, $Re(\lambda)$ and $Rth(\lambda)$ represent an in-plane retardation and a retardation in the thickness direction at a wavelength $\lambda$, respectively. The $Re(\lambda)$ is measured by means of KOBRA 21ADH or WR manufactured by Oji Scientific Instruments while applying a $\lambda$nm wavelength light in the normal line direction of the film. The $Rth(\lambda)$ is calculated in the following manner in the case of measuring a film of a uniaxial or biaxial refractive index ellipsoid.

The $Rth(\lambda)$ is calculated by KOBRA 21ADH or WR based on 6 retardation values, an assumed value of average refractive index, and an inputted thickness, the 6 retardation values being $Re(\lambda)$ values measured by applying a $\lambda$ nm wavelength light to the film from 6 directions tilted at 0 to 50 degrees with 10 degrees interval to the film normal line such that an in-plane slow axis (detected by KOBRA 21ADH or WR) is used as a tilt axis (a rotation axis), or alternatively an arbitrary in-plane axis is used as a rotation axis when there is no slow axis.

In the above calculation, in a case where a retardation value is 0 at a certain tilt angle to the normal line using the in-plane slow axis as the rotation axis, positive sign of a retardation value at a tilt angle larger than the certain tilt angle is converted to negative sign, and then the negative retardation value is used in the calculation by KOBRA 21ADH or WR.

The Rth may be calculated by the following equalities (21) and (22) based on an assumed value of average refractive index, an inputted thickness, and 2 retardation values that is measured in 2 tilt directions such that a slow axis is used as a tilt axis (a rotation axis), or alternatively an arbitrary in-plane axis is used as a rotation axis when there is no slow axis.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equality (21)

$Re(\theta)$ represents a retardation value in a direction tilted at an angle $\theta$ to the normal line. In the equality (21), nx represents an in-plane refractive index in the slow axis direction, ny represents an in-plane refractive index in a direction perpendicular to the slow axis direction, and nz represents a refractive index in a direction perpendicular to the directions.

$$Rth = ((nx+ny)/2 - nz) \times d$$

Equality (22)

The $Rth(\lambda)$ is calculated in the following manner in the case of measuring a film that is not a uniaxial or biaxial index ellipsoid and thus has no so-called optic axes. The $Rth(\lambda)$ is calculated by KOBRA 21ADH or WR based on 11 retardation values, an assumed value of average refractive index, and an inputted thickness, the 11 retardation values being $Re(\lambda)$ values measured by applying a nm wavelength light to the film from 11 directions tilted at −50 to +50 degrees with 10 degrees interval to the film normal line such that an in-plane slow axis (detected by KOBRA 21ADH or WR) is used as a tilt axis (a rotation axis).

In the above measurement, the assumed values of average refractive indexes may be those described in *Polymer Handbook* (JOHN WILEY & SONS, INC.) and catalogs of various optical films. Unknown average refractive indexes can be measured by an Abbe refractometer. The average refractive indexes of major optical film materials are as follows: cellulose acylate (1.48), cycloolefin polymer (1.52), polycarbonate (1.59), polymethyl methacrylate (1.49), polystyrene (1.59). By inputting the assumed average refractive index values and thicknesses, nx, ny, and nz are calculated by KOBRA 21ADH or WR. Nz is calculated from thus obtained nx, ny, and nz by Nz=(nx−nz)/(nx−ny).

For the estimated value of the mean refractive index of films to be analyzed, for example, referred to are *Polymer Handbook* (by John Wiley & Sons, Inc.) and various catalogues of optical films. When the mean refractive index of the sample is unknown, it may be measured with an Abbe's refractiometer.

Data of the mean refractive index of some typical optical films are mentioned below:

Cellulose acylate (1.48), cyclo-olefin polymer (1.52), polycarbonate (1.59), polymethyl methacrylate (1.49), polystyrene (1.59). When the estimated value of mean refractive index and the thickness of the sample are inputted therein, then KOBRA WR computes nx (refractive index in the machine direction), ny (refractive index in the cross direction) and nz (refractive index in the thickness direction).

<<Liquid Crystal Display Device>>

The liquid crystal display device of the invention has a liquid crystal cell, a first polarizer and a second polarizer each disposed on both sides of the liquid crystal cell, a first retardation film disposed between the first polarizer and the liquid crystal cell, and a second retardation film disposed between the second polarizer and the liquid crystal cell, and is characterized in that the absorption axis of the first polarizer and the slow axis of the first retardation film are substantially in parallel to each other, the transmission axis of the second polarizer and the slow axis of the second retardation film are substantially in parallel to each other, the first retardation film satisfies the relation of the following formulae (1) to (6), and the second retardation film satisfies the relation of the following formulae (7) to (12):

$10 \text{ nm} < Re(548) < 100 \text{ nm}$     (1)

$20 \text{ nm} < Rth(548) < 400 \text{ nm}$     (2)

$1.0 < Re(446)/Re(548) < 2.0$     (3)

$0.5 < Re(628)/Re(548) < 1.0$     (4)

$1.0 < Rth(446)/Rth(548) < 2.0$     (5)

$0.5 < Rth(628)/Rth(548) < 1.0$     (6)

$40 \text{ nm} < Re(548) < 300 \text{ nm}$     (7)

$$20\ \text{nm} < Rth(548) < 400\ \text{nm} \tag{8}$$

$$0.5 < Re(446)/Re(548) < 1.5 \tag{9}$$

$$0.5 < Re(628)/Re(548) < 2.0 \tag{10}$$

$$0.5 < Rth(446)/Rth(548) < 2.0 \tag{11}$$

$$0.5 < Rth(628)/Rth(548) < 1.5 \tag{12}$$

The first retardation film and the second retardation film are described in detail hereinunder.

<First Retardation Film>

The first retardation film in the invention satisfies the following relation:

$$10\ \text{nm} < Re(548) < 100\ \text{nm} \tag{1}$$

$$20\ \text{nm} < Rth(548) < 400\ \text{nm} \tag{2}$$

$$1.0 < Re(446)/Re(548) < 2.0 \tag{3}$$

$$0.5 < Re(628)/Re(548) < 1.0 \tag{4}$$

$$1.0 < Rth(446)/Rth(548) < 2.0 \tag{5}$$

$$0.5 < Rth(628)/Rth(548) < 1.0 \tag{6}$$

The formula (1) is more preferably 15 nm<Re(548)<80 nm, most preferably 20 nm<Re(548)<60 nm.

The formula (2) is more preferably 30 nm<Rth(548)<300 nm, most preferably 50 nm<Rth(548)<250 nm.

The formula (3) is more preferably 1.00<Re(446)/Re(548)<1.70, most preferably 1.05<Re(446)/Re(548)<1.50.

The formula (4) is more preferably 0.60<Re(628)/Re(548)<1.00, most preferably 0.70<Re(628)/Re(548)<0.97.

The formula (5) is more preferably 1.00<Rth(446)/Rth(548)<1.70, most preferably 1.05<Rth(446)/Rth(548)<1.50.

The formula (6) is more preferably 0.6<Rth(628)/Rth(548)<1.00, most preferably 0.7<Rth(628)/Rth(548)<0.97.

Using the retardation film of which $Re(\lambda)$ and $Rth(\lambda)$ are defined to fall within the above-mentioned ranges gives a liquid crystal display device of which the viewing angle-dependent color tone change is small.

Preferably, the first retardation film in the invention has a certain absorption within a UV range of from 250 nm to 380 nm, but does not substantially have an absorption within a visible light region of from 400 nm of 700 nm. The wording "has a certain absorption" as referred to herein means that the film has an absorbance of larger than 0.2 at a certain wavelength; and the wording "does not substantially have an absorption" means that the absorbance of the film is not larger than 0.2 at any wavelength.

The absorbance at a wavelength of 250 nm of the first retardation film in the invention is preferably at least 1.0, more preferably at least 2.0. The absorbance of the film within a wavelength range of from 400 nm to 700 nm is preferably at most 0.5, more preferably at most 0.2.

The absorption by the first retardation film in the invention within a UV range of from 250 nm to 380 nm may be the absorption by the polymer itself to constitute the film or the absorption by the dopant added to the polymer, any of which is preferred in the invention.

The polymer having an absorption within a UV range of from 250 nm to 350 nm is preferably polycarbonate or polyimide, as its transparency is high.

In case where a dopant having an absorption within a UV range of from 250 nm to 380 nm is added to the polymer film, then other various polymer films such as norbornene-based polymer films and cellulose acylate films are usable herein in addition to the above-mentioned polycarbonate and polyimide.

Preferably, the first retardation film in the invention serves also as the protective film of the polarizer for reducing the thickness of the liquid crystal display device.

Of the above-mentioned polymer films, a cellulose acylate film is especially preferred as it has good properties for the protective film of polarizers, such as good workability into polarizers and as the starting materials for it are inexpensive.

The cellulose acylate film preferably used for the first retardation film in the invention (this may be hereinafter referred to as a first retardation cellulose acylate film) is described in detail hereinunder.

[Cellulose Acylate]

Cellulose acylate usable for the first retardation cellulose acylate film in the invention is described.

The substitution degree in cellulose acylate means the ratio of acylation of the three hydroxyl groups existing in the constitutive unit (glucose bonding to β1,4-glycoside) of cellulose. The substitution degree (acylation degree) may be calculated by measuring the amount of the bonding fatty acid per the constitutive unit mass of cellulose. The measurement is carried out in accordance with "ASTM-D817-91".

Cellulose acylate in the invention is preferably cellulose acetate having a degree of acylation of from 2.00 to 2.90. The degree of acylation is more preferably from 2.20 to 2.90. The ratio of the degree of 6-acylation to the degree of whole acylation is preferably at least 0.25, more preferably at least 0.3.

Cellulose acylate in the invention preferably has a weight-average degree of polymerization of from 350 to 800, more preferably from 370 to 600. Also preferably, cellulose acylate in the invention has a number-average molecular weight of from 70000 to 230000, more preferably from 75000 to 230000, most preferably from 78000 to 120000.

Cellulose acylate in the invention may be produced, using an acid anhydride or an acid chloride as the acylating agent. In case where the acylating agent is an acid anhydride, then an organic acid (e.g., acetic acid) or methylene chloride may be used as the reaction solvent. For the catalyst, usable is a protic catalyst such as sulfuric acid. In case where the acylating agent is an acid chloride, then a basic compound is used as the catalyst. In a production method that is industrially most general, cellulose is esterified with a mixed organic acid component that contains an organic acid (e.g., acetic acid, propionic acid, butyric acid) or its acid anhydride (e.g., acetic anhydride, propionic anhydride, butyric anhydride) corresponding to an acetyl group and any other acyl group to thereby produce a cellulose acylate. In this method, cellulose such as cotton linter or wood pulp is activated with an organic acid such as acetic acid, and then esterified with a mixed organic acid component liquid as in the above, in the presence of a sulfuric acid catalyst, and this is popular for the cellulose of the type. The organic acid anhydride component is generally used in an excessive amount over the amount of the hydroxyl group existing in cellulose. In this esterification treatment, hydrolysis reaction (depolymerization reaction) of the cellulose main chain (β1→4 glycoside bond) goes on in addition to the esterification reaction. When the hydrolysis of the main chain goes on, then the degree of polymerization of cellulose acylate lowers, and the physical properties of the cellulose acylate film to be produced may worsen. Accordingly, it is desirable that the reaction condition including the reaction temperature is determined in consideration of the degree of polymerization and the molecular weight of the cellulose acylate to be obtained.

For obtaining cellulose acylate having a high degree of polymerization (having a large molecular weight), it is important that the highest temperature in the esterification step is controlled to be at most 50° C. The highest temperature is preferably controlled to be from 35 to 50° C., more preferably from 37 to 47° C. The reaction temperature is controlled to be not lower than 35° C., whereby the esterification reaction may be attained more smoothly. The reaction temperature is controlled to be not higher than 50° C., whereby the reduction in the degree of polymerization of cellulose acylate may be more effectively inhibited. After the esterification, the reaction is stopped while preventing the temperature increase, whereby the reduction in the degree of polymerization may be further inhibited and a cellulose acylate having a high degree of polymerization may be produced. Specifically, when a reaction terminator (e.g., water, acetic acid) is added after the reaction, then the excessive acid anhydride not having participated in the esterification reaction is hydrolyzed to give the corresponding organic acid as a side product. This hydrolysis reaction generates much heat whereby the temperature in the reaction device rises. When the addition speed of the reaction terminator is high, then the heat generation suddenly occurs exceeding the cooling capacity of the reaction device. As a result, hydrolysis of the cellulose main chain goes on extremely, and the degree of polymerization of the resulting cellulose acylate lowers. A part of the catalyst bonds to cellulose during the esterification, and most of it leaves from cellulose during the addition of the reaction terminator. However, when the addition speed of the reaction terminator is too high, then the catalyst could not have a sufficient reaction time enough for its leaving from cellulose, and a part of the catalyst remains while still bonding to cellulose. Cellulose acylate with such a strong acid catalyst partly bonding thereto is extremely unstable, and may be readily decomposed by heat given thereto during drying of products, and its degree of polymerization thereby lowers. For these reasons, it is desirable that, after the esterification, the reaction terminator is added to the reactor taking at least 4 minutes, more preferably taking from 4 to 30 minutes, so as to stop the reaction. From the viewpoint of the industrial producibility, the addition time for the reaction terminator is preferably at most 30 minutes. For the reaction terminator, generally used is water or alcohol having the ability of decomposing acid anhydrides. In the invention, however, in order not to deposit a triester that is poorly soluble in various organic solvents, a mixture of water and an organic acid is preferably used as the reaction terminator. When the esterification is attained under the condition as above, then a high-molecular cellulose acylate having a weight-average degree of polymerization of at least 500 may be readily produced.

[Retarder]

The cellulose acylate film for the first retardation cellulose acylate film in the invention preferably contains a retarder. "Retarder" as referred to herein means a compound capable of expressing a birefringence in the in-plane direction and the thickness-direction of the film.

The retarder in the invention is preferably a compound having an absorption maximum in a wavelength range of from 200 to 380 nm; and in addition to the requirement, the compound for the retarder more preferably has a molar extinction coefficient within a range of from 400 nm to 700 nm of at most 1000 (this is a compound having a large polarization anisotropy). Having the absorption characteristics as above, the compound does not cause any unnecessary coloration of the film, and the film containing the compound may have desired wavelength dispersion characteristics.

For the retarder in the invention, preferred are compounds of the following formula (I):

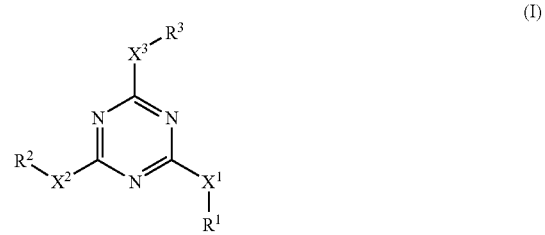

In the formula (I), $X^1$ represents a single bond, —$NR^4$—, —O—, or —S—, $X^2$ represents a single bond, —$NR^5$—, —O—, or —S—, and $X^3$ represents a single bond, —$NR^6$—, —O—, or —S—. $R^1$, $R^2$, and $R^3$ independently represent an alkyl group, an alkenyl group, an aromatic ring group, or a heterocyclic group, and $R^4$, $R^5$, and $R^6$ independently represent a hydrogen atom, an alkyl group, an alkenyl group, an aryl group, or a heterocyclic group.

The compound represented by the formula (I) is described in detail below.

First $R^1$, $R^2$, and $R^3$ are described below.

In the formula (I), $R^1$, $R^2$, and $R^3$ independently represent an alkyl group, an alkenyl group, an aromatic ring group, or a heterocyclic group, and are more preferably an aromatic ring group or a heterocyclic group. The aromatic ring group of $R^1$, $R^2$, or $R^3$ is preferably a phenyl group or naphthyl group, particularly preferably a phenyl group.

$R^1$, $R^2$, and $R^3$ may have a substituent on the aromatic ring or heterocycle. Examples of the substituents include halogen atoms such as a fluorine atom and a chlorine atom, a hydroxyl group, a cyano group, a nitro group, a carboxyl group, alkyl groups, alkenyl groups, aryl groups, alkoxy groups, alkenyloxy groups, aryloxy groups, acyloxy groups, alkoxycarbonyl groups, alkenyloxycarbonyl groups, aryloxycarbonyl groups, sulfamoyl groups, alkyl-substituted sulfamoyl groups, alkenyl-substituted sulfamoyl groups, aryl-substituted sulfamoyl groups, sulfonamide groups, carbamoyl groups, alkyl-substituted carbamoyl groups, alkenyl-substituted carbamoyl groups, aryl-substituted carbamoyl groups, amide groups, alkylthio groups, alkenylthio groups, arylthio groups, and acyl groups.

When $R^1$, $R^2$, or $R^3$ represents a heterocyclic group, its heterocycle preferably has aromaticity. The heterocycle having aromaticity is generally an unsaturated heterocycle, and preferably has double bonds maximally. The heterocycle is preferably a 5-, 6-, or 7-membered ring, more preferably a 5- or 6-membered ring, most preferably a 6-membered ring. A heteroatom of the heterocycle is preferably a nitrogen, sulfur, or oxygen atom, particularly preferably a nitrogen atom. The heterocycle having aromaticity is particularly preferably a pyridine ring to form a 2- or 4-pyridyl group as the heterocyclic group. The heterocyclic group may have a substituent.

In the formula (I), $X^1$ represents a single bond, —$NR^4$—, —O—, or —S—, preferably —$NR^4$—; $X^2$ represents a single bond, —$NR^5$—, —O—, or —S—, preferably —$NR^5$—; and $X^3$ represents a single bond, —$NR^6$—, —, or —S—, preferably —$NR^6$—. $R^4$, $R^5$, and $R^6$ independently represent a hydrogen atom, an alkyl group, an alkenyl group, an aryl group, or a heterocyclic group.

The alkyl group of $R^4$, $R^5$, or $R^6$ may be a cyclic or chain alkyl group. The alkyl group is preferably a chain alkyl group, and more preferably not a branched chain alkyl group but a straight alkyl group. The carbon number of the alkyl group is preferably 1 to 30, more preferably 1 to 20, further preferably 1 to 10, still further preferably 1 to 8, most preferably 1 to 6. The alkyl group may have a substituent, and examples thereof include halogen atoms, alkoxy groups such as methoxy and ethoxy groups, and acyloxy groups such as acryloyloxy and methacryloyloxy groups.

The alkenyl group of $R^4$, $R^5$, or $R^6$ may be a cyclic or chain alkenyl group. The alkenyl group is preferably a chain alkenyl group, and more preferably not a branched chain alkenyl group but a straight alkenyl group. The carbon number of the alkenyl group is preferably 2 to 30, more preferably 2 to 20, further preferably 2 to 10, still further preferably 2 to 8, most preferably 2 to 6. The alkyl group may have a substituent, and examples thereof include those of the substituent on the alkyl group.

The aromatic ring group (aryl group) and heterocyclic group of $R^4$, $R^5$, or $R^6$ have the same meanings and preferred embodiments as that of $R^1$, $R^2$, or $R^3$. The aromatic ring group and the heterocyclic group may further have a substituent, and examples thereof include those on the $R^1$, $R^2$, and $R^3$.

Preferred examples I-(1) to IV-(10) of the compound represented by the formula (I) are illustrated below without intention of restricting the invention.

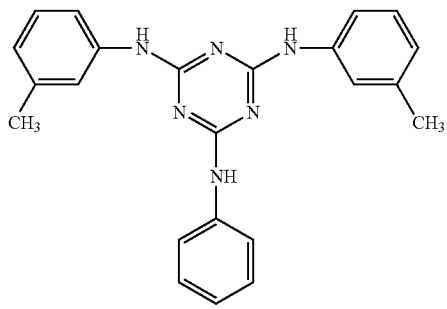
I-(1)

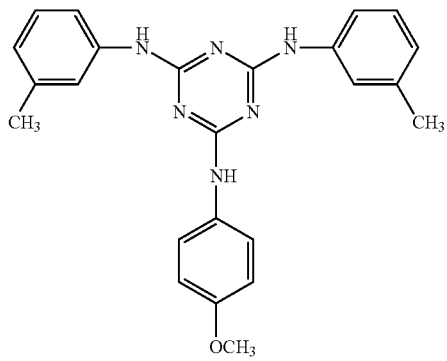
I-(2)

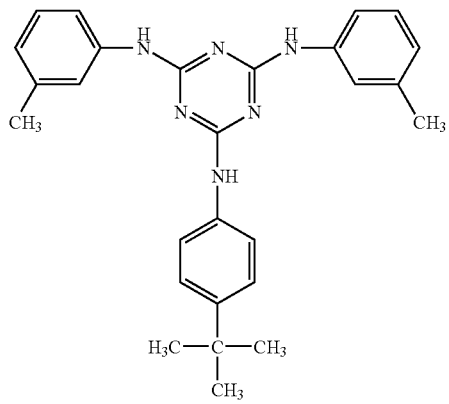
I-(3)

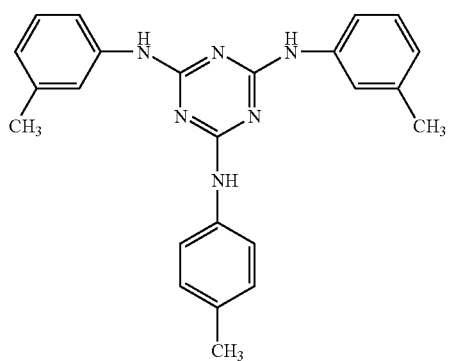
I-(4)

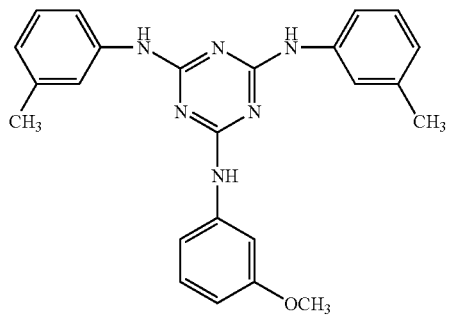
I-(5)

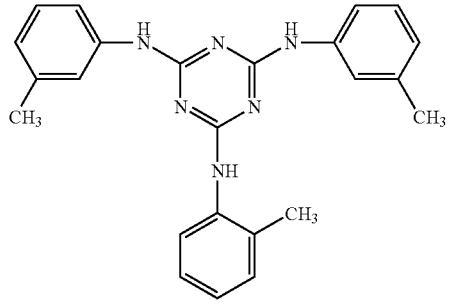
I-(6)

-continued
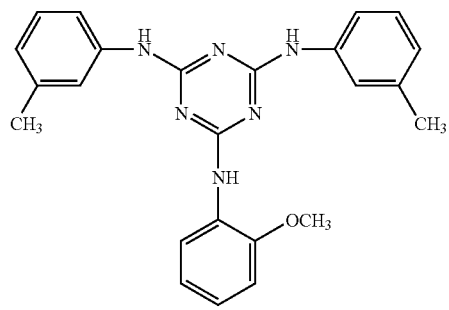
I-(7)
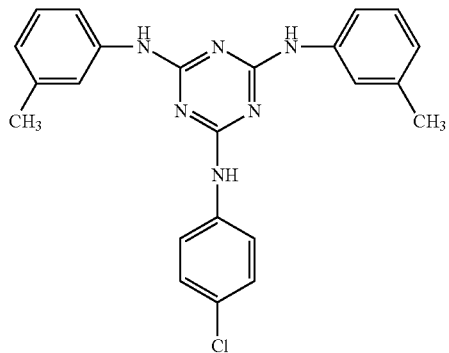
I-(11)
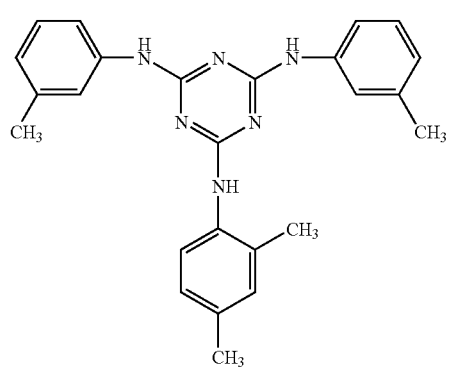
I-(8)
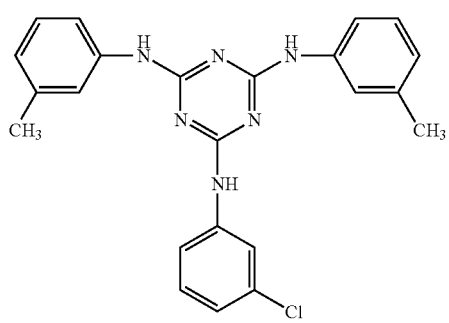
I-(12)
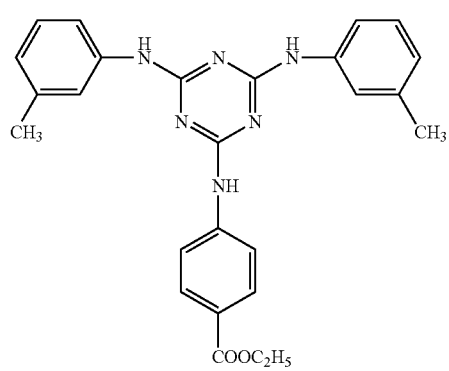
I-(9)
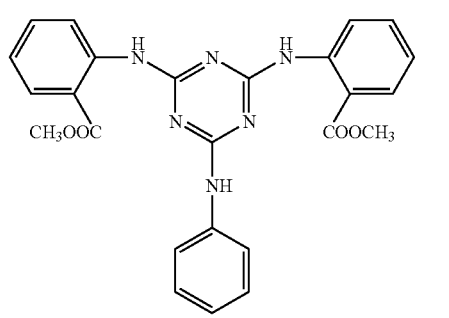
I-(13)
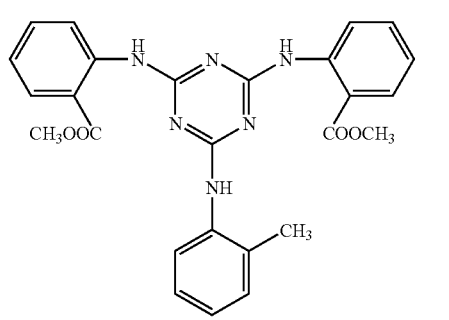
I-(14)
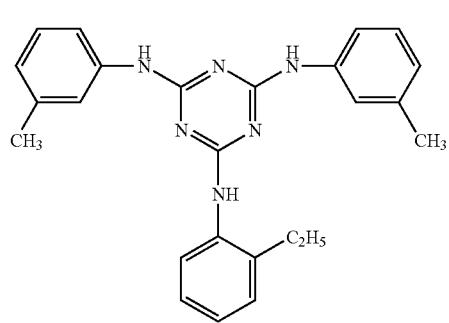
I-(10)
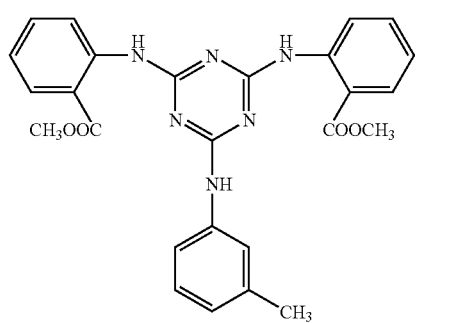
I-(15)

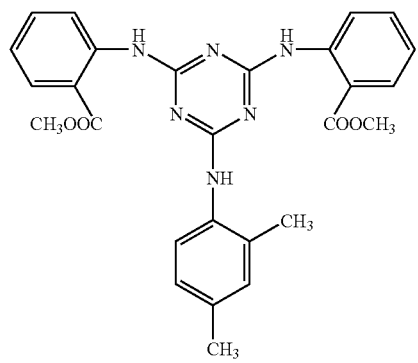
I-(16)
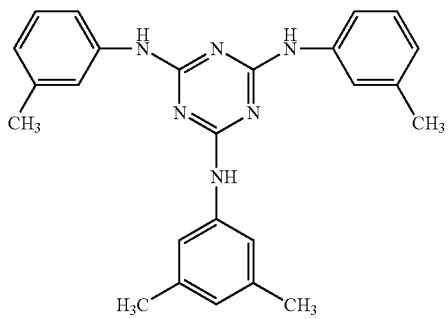
I-(20)
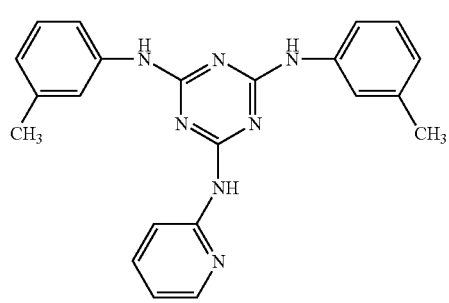
I-(17)
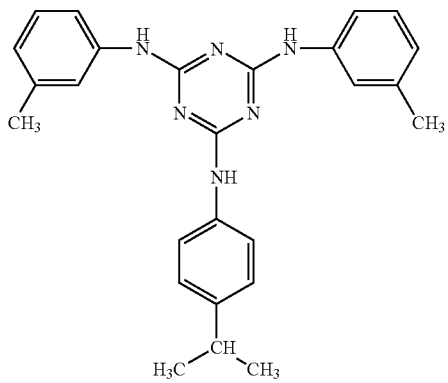
I-(21)
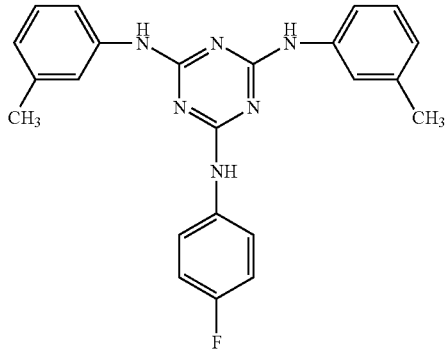
I-(22)
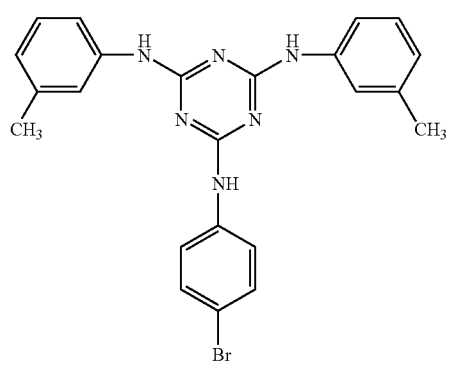
I-(18)
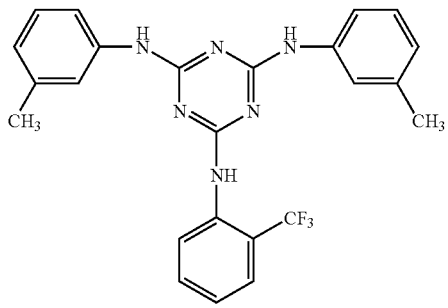
I-(23)
I-(19)

-continued
I-(24)
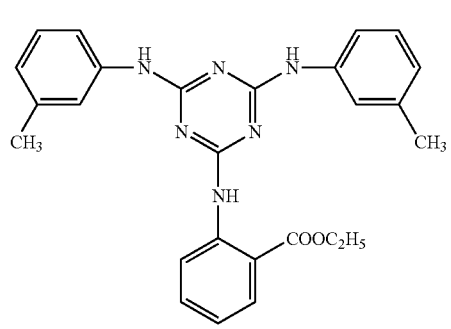
I-(25)
I-(26)
I-(27)
-continued
I-(28)
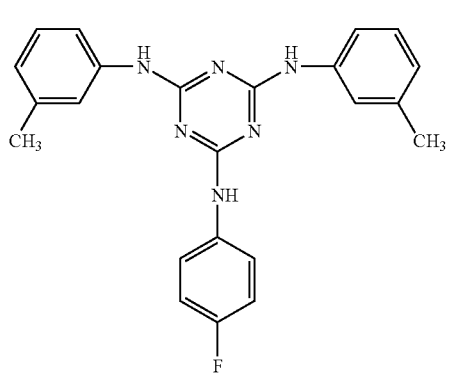
I-(29)
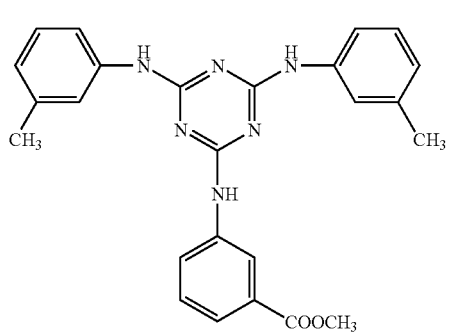
I-(30)
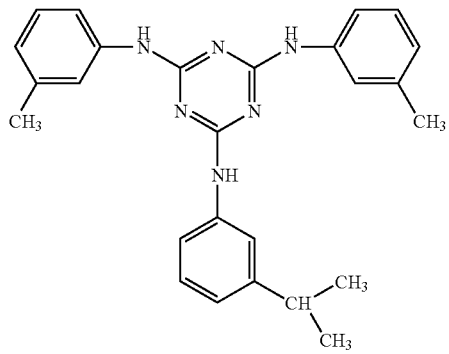
I-(31)
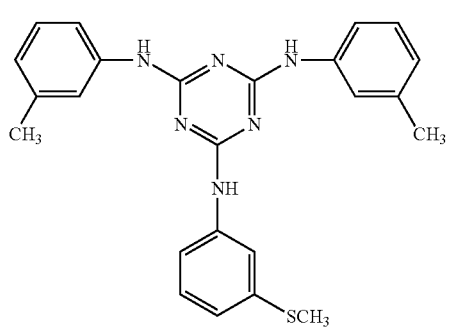

-continued

-continued
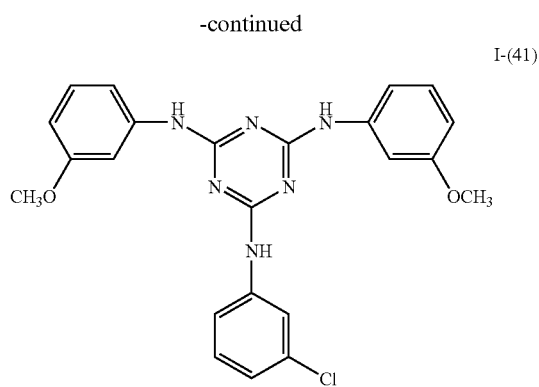 I-(41)
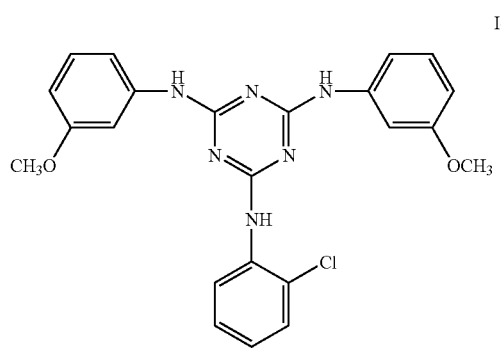 I-(42)
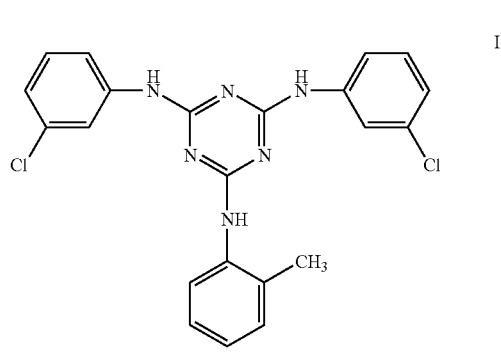 I-(43)
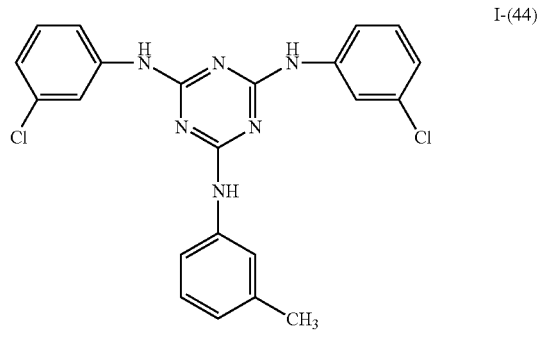 I-(44)
-continued
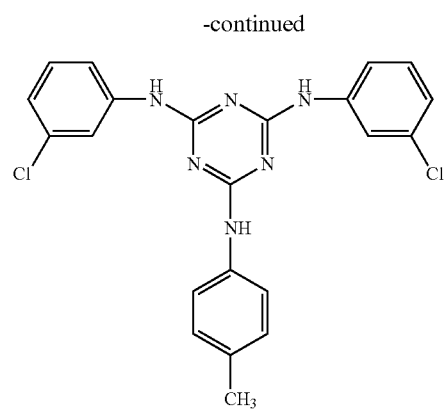 I-(45)
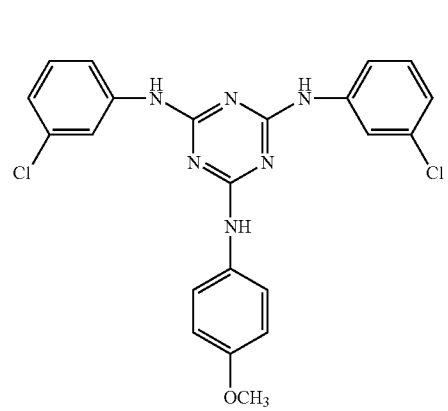 I-(46)
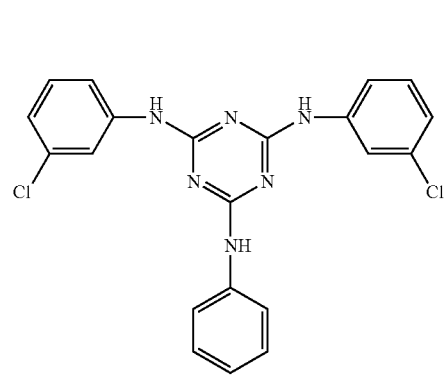 I-(47)
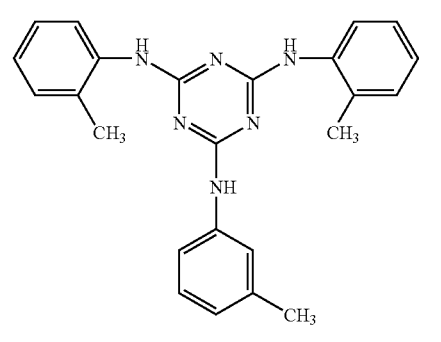 I-(48)

-continued
I-(49)
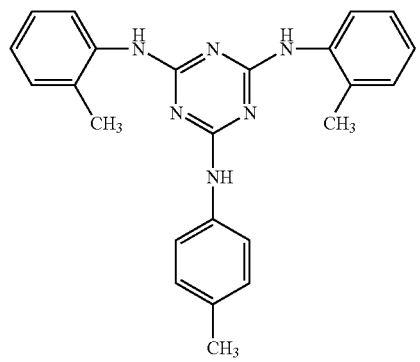
I-(50)
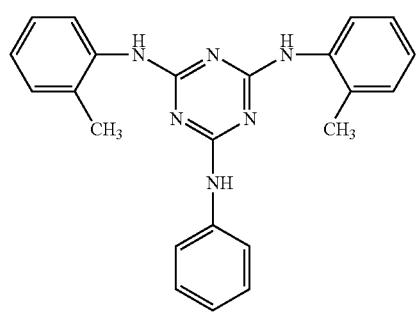
II-(1)
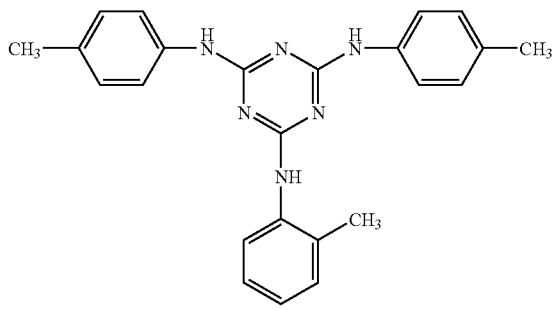
II-(2)
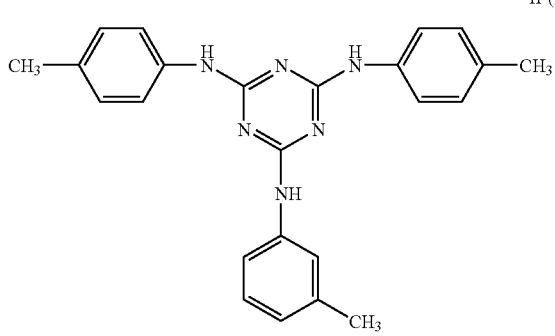
-continued
II-(3)
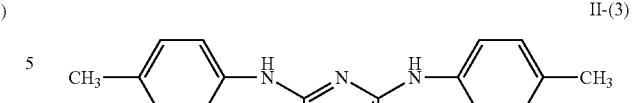
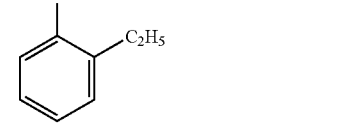
II-(4)
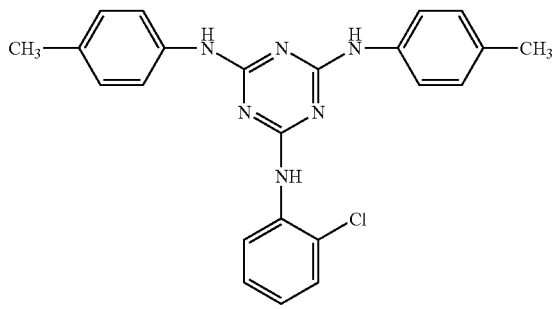
II-(5)
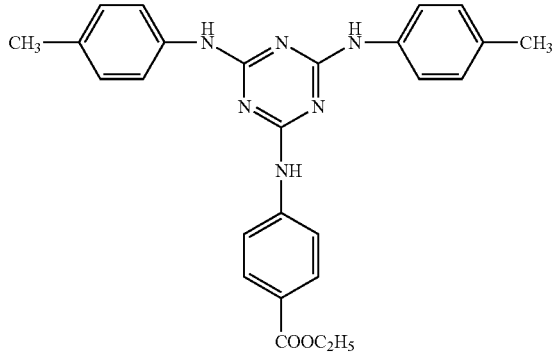
II-(6)
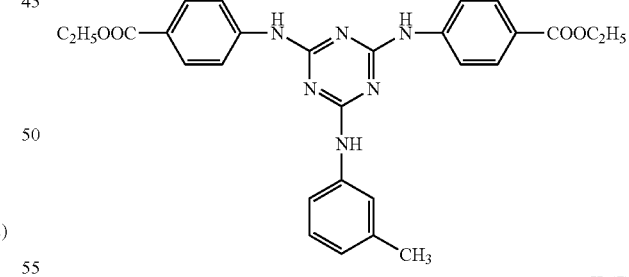
II-(7)
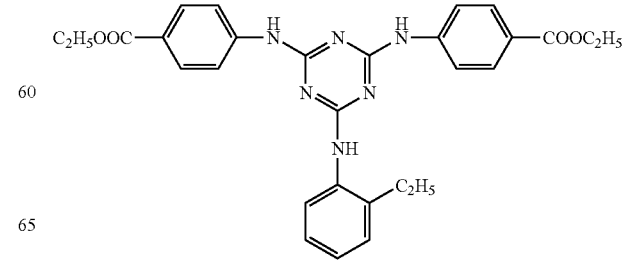

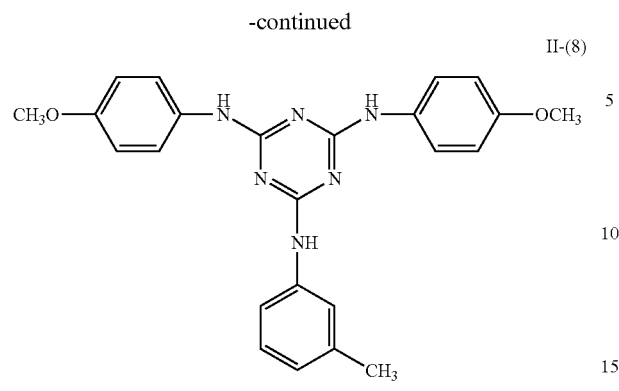
II-(8)
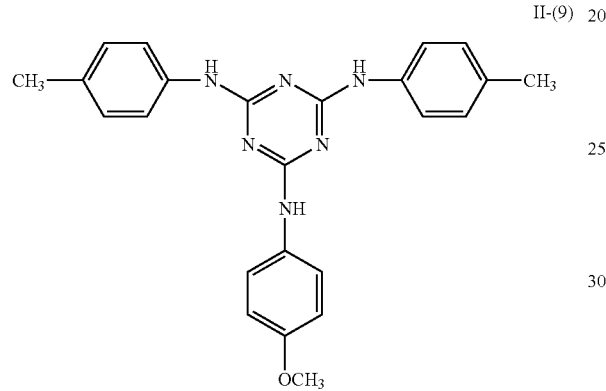
II-(9)
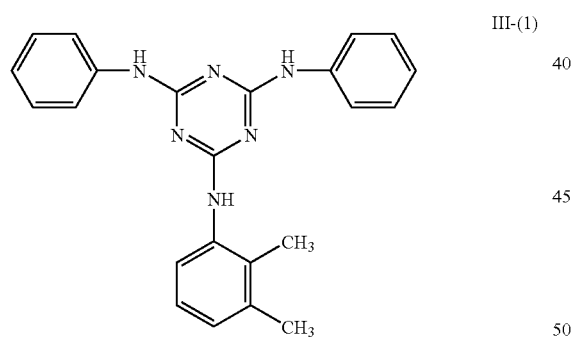
III-(1)
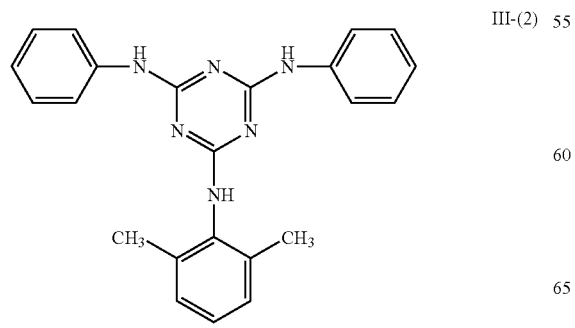
III-(2)
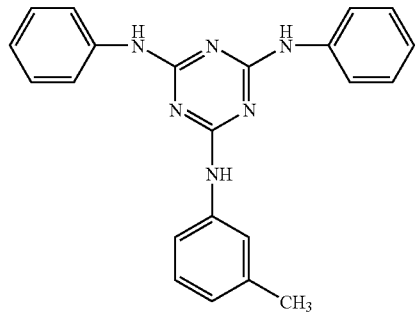
III-(3)
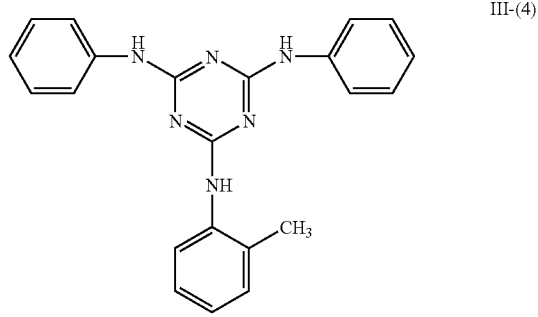
III-(4)
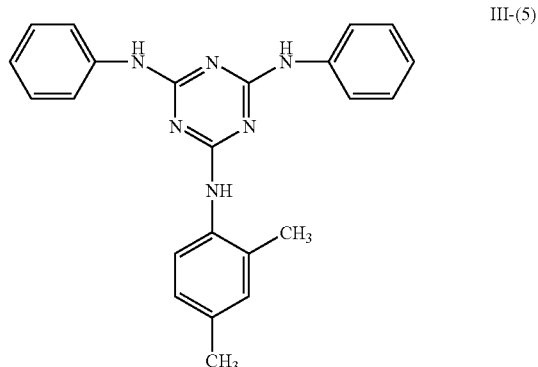
III-(5)
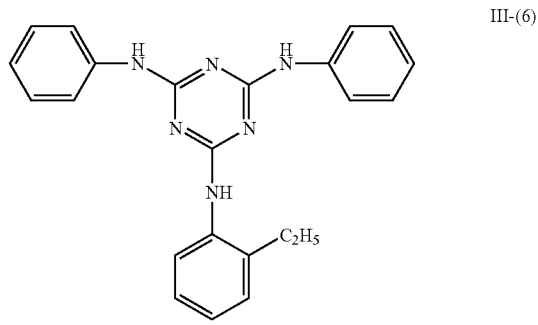
III-(6)
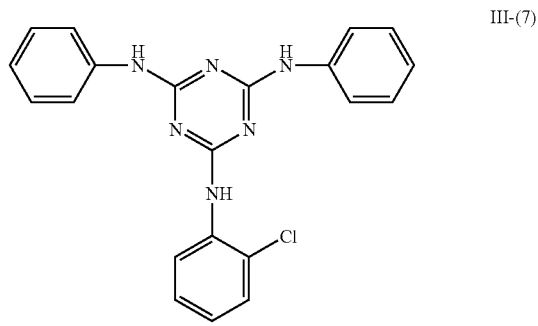
III-(7)

-continued
III-(8)
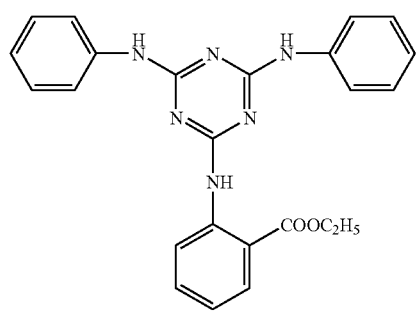
III-(9)
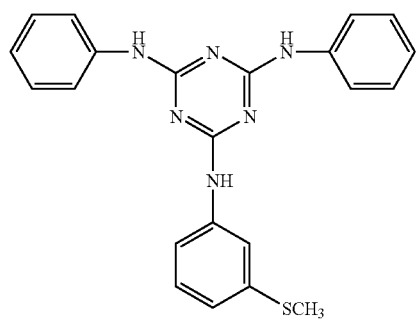
III-(10)
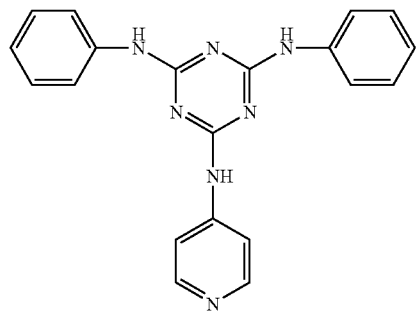
III-(11)
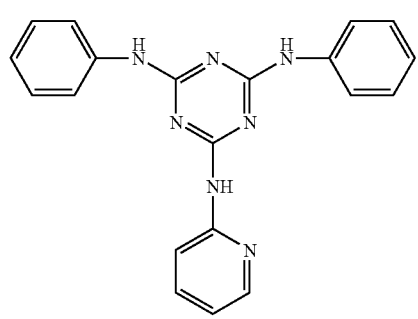
III-(12)
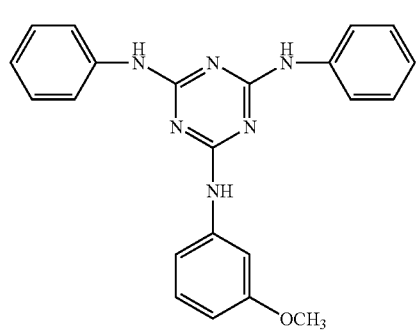
-continued
IV-(1)
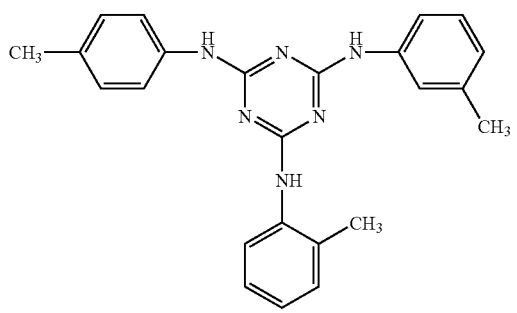
IV-(2)
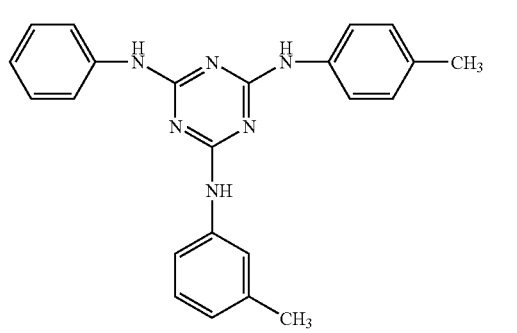
IV-(3)
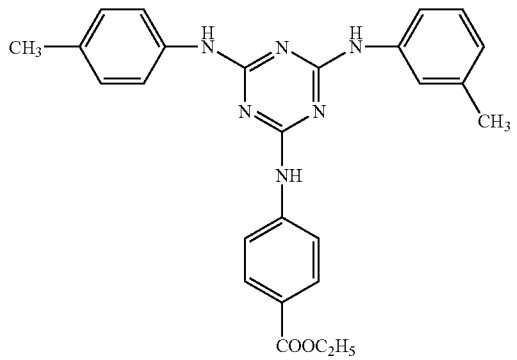
IV-(4)
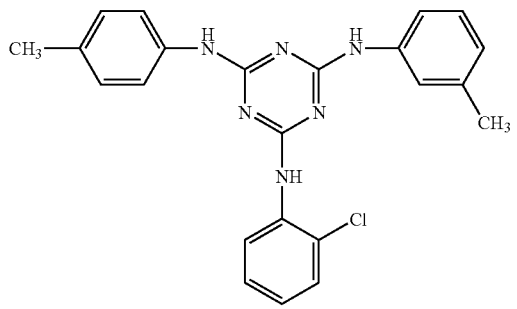

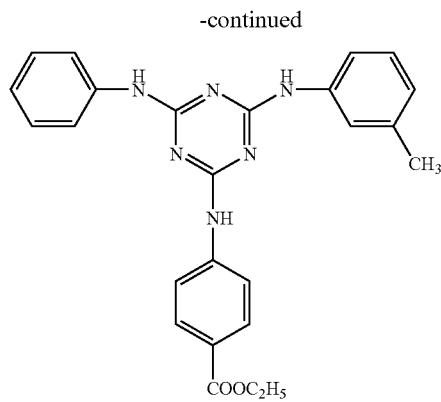

IV-(5)

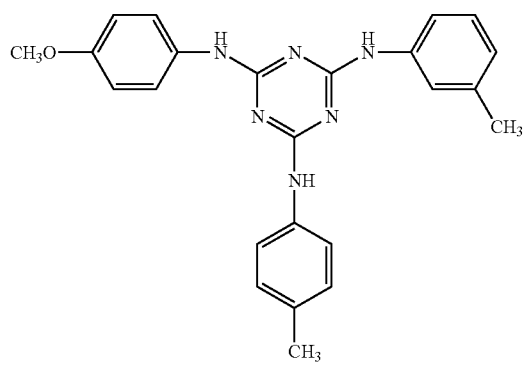

IV-(6)

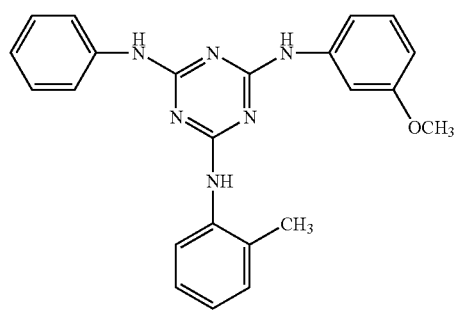

IV-(7)

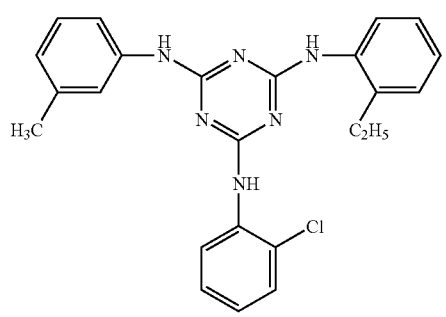

IV-(8)

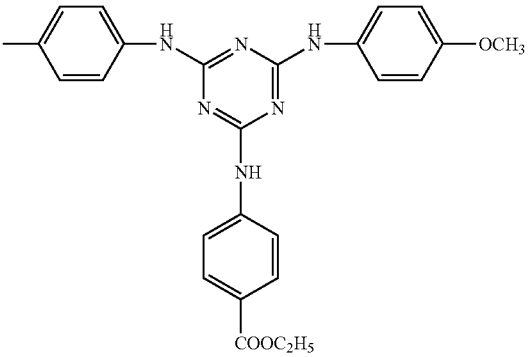

IV-(9)

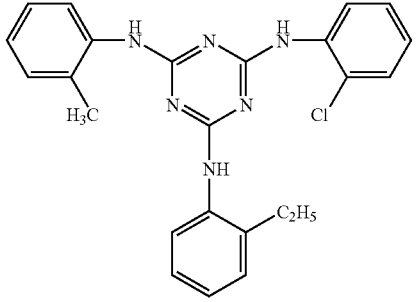

IV-(10)

A compound represented by the following formula (1-1) is also used preferably as the regarder in the invention. The compound of the formula (1-1) is described in detail below.

Formula (1-1)

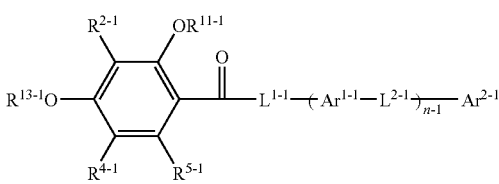

In the formula (1-1), $R^{2-1}$, $R^{4-1}$, and $R^{5-1}$ independently represent a hydrogen atom or a substituent, $R^{11-1}$ and $R^{13-1}$ independently represent a hydrogen atom or an alkyl group, and $L^{1-1}$ and $L^{2-1}$ independently represent a single bond or a divalent linking group. $Ar^{1-1}$ represents an arylene group or an aromatic heterocyclic group, $Ar^{2-1}$ represents an aryl group or an aromatic heterocyclic group, n–1 represents an integer of 3 or more, and $L^{2-1}$'s and $Ar^{1-1}$'s in the n–1 units may be the same or different ones respectively. $R^{11-1}$ and $R^{13-1}$ are different from each other, and the alkyl group of $R^{13-1}$ is free of heteroatoms.

In the formula (1-1), $R^{2-1}$, $R^{4-1}$, and $R^{5-1}$ independently represent a hydrogen atom or a substituent. The substituent may be a substituent T to be hereinafter described.

In the formula (1-1), $R^{2-1}$ is preferably a hydrogen atom, an alkyl group, an alkoxy group, an amino group, or a hydroxyl group, more preferably a hydrogen atom, an alkyl group, or an alkoxy group, further preferably a hydrogen atom, an alkyl group (which preferably has 1 to 4 carbon atoms, and is more preferably a methyl group), or an alkoxy group (which preferably has 1 to 12 carbon atoms, more preferably has 1 to 8 carbon atoms, further preferably has 1 to 6 carbon atoms, particularly preferably 1 to 4 carbon atoms). $R^{2-1}$ is particularly preferably a hydrogen atom, a methyl group, or a methoxy group, most preferably a hydrogen atom.

In the formula (1-1), $R^{4-1}$ is preferably a hydrogen atom or an electron-donating group, more preferably a hydrogen atom, an alkyl group, an alkoxy group, an amino group, or a hydroxyl group, further preferably a hydrogen atom, an alkyl group having 1 to 4 carbon atoms, or an alkoxy group having 1 to 12 carbon atoms (which more preferably has 1 to 8 carbon atoms, further preferably has 1 to 6 carbon atoms, particularly preferably has 1 to 4 carbon atoms), particularly preferably a hydrogen atom, an alkyl group having 1 to 4 carbon atoms, or an alkoxy group having 1 to 4 carbon atoms, most preferably a hydrogen atom or a methoxy group.

In the formula (1-1), $R^{5-1}$ is preferably a hydrogen atom, a halogen atom, an alkyl group, an alkoxy group, an amino group, or a hydroxyl group, more preferably a hydrogen atom, an alkyl group, or an alkoxy group, further preferably a hydrogen atom, an alkyl group (preferably an alkyl group having 1 to 4 carbon atoms, more preferably a methyl group), or an alkoxy group (which preferably has 1 to 12 carbon atoms, more preferably has 1 to 8 carbon atoms, further preferably has 1 to 6 carbon atoms, particularly preferably has 1 to 4 carbon atoms). $R^{5-1}$ is particularly preferably a hydrogen atom, a methyl group, or a methoxy group, most preferably a hydrogen atom.

In the formula (1-1), $R^{11-1}$ and $R^{13-1}$ independently represent a hydrogen atom or an alkyl group. $R^{11-1}$ and $R^{13-1}$ are different from each other, and the alkyl group of $R^{13-1}$ has no heteroatoms. The heteroatoms are atoms other than hydrogen and carbon atoms, and include oxygen, nitrogen, sulfur, phosphorus, silicon, halogen (F, Cl, Br, and I), and boron atoms.

The alkyl group of $R^{11-1}$ or $R^{13-1}$ is a straight, branched, or cyclic, substituted or unsubstituted, alkyl group, preferably a substituted or unsubstituted alkyl group having 1 to 30 carbon atoms, a substituted or unsubstituted cycloalkyl group having 3 to 30 carbon atoms, a substituted or unsubstituted bicycloalkyl group having 5 to 30 carbon atoms (a monovalent group provided by removing one hydrogen atom from a bicycloalkane having 5 to 30 carbon atoms), or a tricyclo structure with more rings.

Preferred examples of the alkyl groups of $R^{11-1}$ and $R^{13-1}$ include a methyl group, ethyl group, n-propyl group, isopropyl group, n-butyl group, sec-butyl group, t-butyl group, n-pentyl group, iso-pentyl group, n-hexyl group, n-heptyl group, n-octyl group, tert-octyl group, 2-ethylhexyl group, n-nonyl group, 1,1,3-trimethylhexyl group, n-decyl group, 2-hexyldecyl group, cyclohexyl group, cycloheptyl group, 2-hexenyl group, oleyl group, linoleyl group, and linolenyl group. Further, the cycloalkyl groups include cyclohexyl, cyclopentyl, and 4-n-dodecylcyclohexyl groups, and the bicycloalkyl groups include bicyclo[1,2,2]heptane-2-yl and bicyclo[2,2,2]octane-3-yl groups.

$R^{11-1}$ is further preferably a hydrogen atom, a methyl group, an ethyl group, an n-propyl group, or an isopropyl group, particularly preferably a hydrogen atom or a methyl group, most preferably a methyl group.

$R^{13-1}$ is particularly preferably an alkyl group having 2 or more carbon atoms, more preferably an alkyl group having 3 or more carbon atoms.

Specific examples of the alkyl group of $R^{13-1}$ are illustrated below without intention of restricting the scope of the invention.

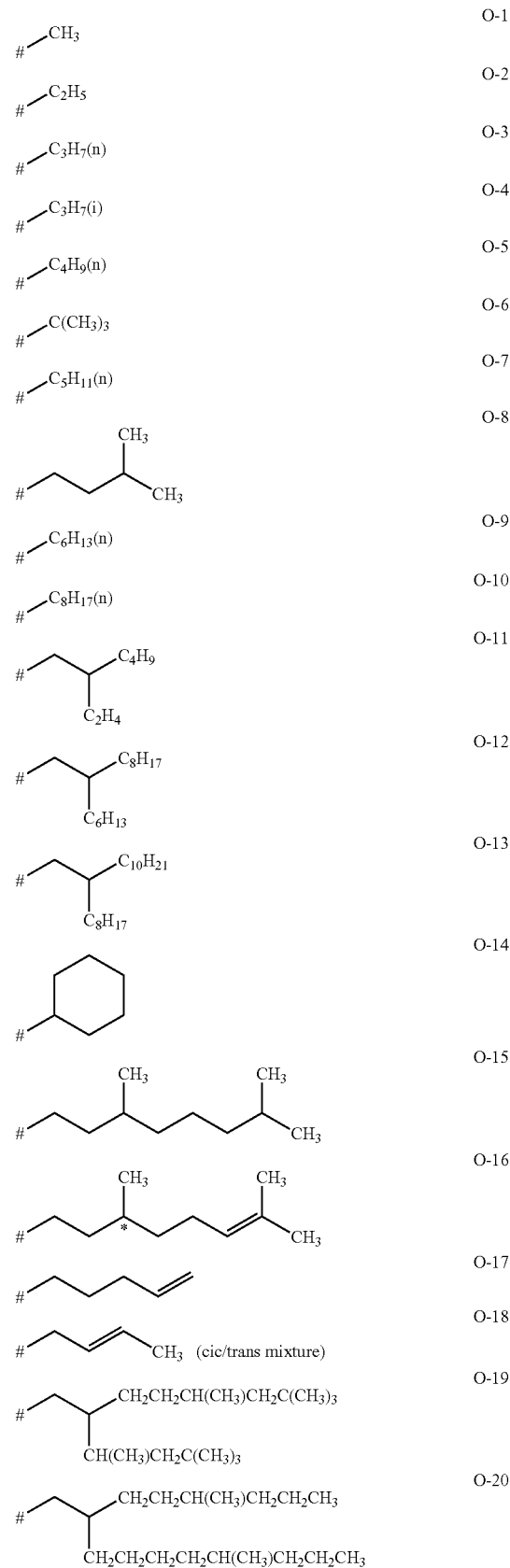

In the above examples, each # means a position connecting to the oxygen atom.

In the formula (1-1), $Ar^{1-1}$ represents an arylene group or an aromatic heterocycle, and $Ar^{1-1}$ is in the repeating units may be the same or different groups. $Ar^{2-1}$ represents an aryl group or an aromatic heterocycle.

In the formula (1-1), the arylene group of $Ar^{1-1}$ is preferably an arylene group having 6 to 30 carbon atoms, may be monocyclic, and may be bonded to another ring to form a condensed ring. The arylene group may have a substituent if possible, and the substituent may be the substituent T to be hereinafter described. The arylene group of $Ar^{1-1}$ more preferably has 6 to 20 carbon atoms, and particularly preferably has 6 to 12 carbon atoms, and examples thereof include a phenylene group, a p-methylphenylene group, and a naphthylene group.

In the formula (1-1), the aryl group of $Ar^{2-1}$ is preferably an aryl group having 6 to 30 carbon atoms, and may be monocyclic, and may be bonded to another ring to form a condensed ring. The aryl group may have a substituent if possible, and the substituent may be the substituent T to be hereinafter described. The aryl group of $Ar^{2-1}$ more preferably has 6 to 20 carbon atoms, and particularly preferably has 6 to 12 carbon atoms, and examples thereof include a phenyl group, a p-methylphenyl group, and a naphthyl group.

In the formula (1-1), the aromatic heterocycles of $Ar^{1-1}$ and $Ar^{2-1}$ may contain at least one of oxygen, nitrogen, and sulfur atoms, and are preferably 5- or 6-membered aromatic heterocycles containing at least one of oxygen, nitrogen, and sulfur atoms. The aromatic heterocycles may have a substituent if possible, and the substituent may be the substituent T to be hereinafter described.

In the formula (1-1), specific examples of the aromatic heterocycles of $Ar^{1-1}$ and $Ar^{2-1}$ include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benzotriazole, tetrazaindene, pyrrolotriazole, and pyrazolotriazole. Preferred aromatic heterocycles include benzimidazole, benzoxazole, benzthiazole, and benzotriazole.

In the formula (1-1), $L^{1-1}$ and $L^{2-1}$ independently represent a single bond or a divalent linking group. $L^{1-1}$ and $L^{2-1}$ may be the same or different ones, and $L^{2-1}$'s in the repeating units may be the same or different ones.

Preferred examples of the divalent linking groups include —O—, —$NR^{1-1}$— (in which $R^{1-1}$ represents a hydrogen atom or an alkyl or aryl group that may have a substituent), —CO—, —$SO_2$—, —S—, alkylene groups, substituted alkylene groups, alkenylene groups, substituted alkenylene groups, alkynylene groups, and combinations of two or more thereof. More preferred divalent linking groups include —O—, —$NR^{1-1}$—, —CO—, —$SO_2NR^{1-1}$—, —$NR^{1-}SO_2$—, —$CONR^{1-1}$—, —$NR^{1-1}CO$—, —COO—, —OCO—, and alkynylene groups. $R^{1-1}$ is preferably a hydrogen atom.

In the invention, in the compound represented by the formula (1-1), $Ar^{1-1}$ is connected to $L^{1-1}$ and $L^{2-1}$. When $Ar^{1-1}$ is a phenylene group, each of $L^{1-1}$—$Ar^{1-1}$—$L^{2-1}$ and $L^{2-1}$—$Ar^{1-1}$—$L^{2-1}$ most preferably has para substitution (1,4-substitution) structure.

In the formula (1-1), n–1 is an integer of 3 or more, preferably 3 to 7, more preferably 3 to 6, further preferably 3 to 5.

Compounds represented by the following formulae (2-1) and (3-1) can be particularly preferably used as the compound represented by the formula (1-1).

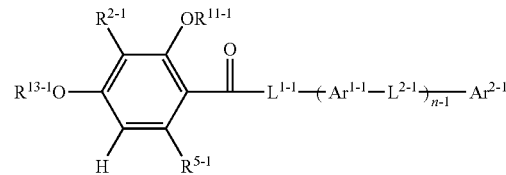

Formula (2-1)

In the formula (2-1), $R^{2-1}$ and $R^{5-1}$ independently represent a hydrogen atom or a substituent, $R^{11-1}$ and $R^{13-1}$ independently represent a hydrogen atom or an alkyl group, and $L^{1-1}$ and $L^{2-1}$ independently represent a single bond or a divalent linking group. $Ar^{1-1}$ represents an arylene group or an aromatic heterocycle, $Ar^{2-1}$ represents an aryl group or an aromatic heterocycle, n–1 represents an integer of 3 or more, and $L^{2-1}$'s and $Ar^{1-1}$'s in the n–1 units may be the same or different ones respectively. $R^{11-1}$ and $R^{13-1}$ are different from each other, and the alkyl group represented by $R^{13-4}$ contains no heteroatoms.

In the formula (2-1), $R^{2-1}$, $R^{5-1}$, $R^{11-1}$, and $R^{13-1}$ have the same meanings and preferred embodiments as those in the formula (2-1). Further, also $L^{1-1}$, $L^{2-1}$, $Ar^{1-1}$, and $Ar^{2-1}$ have the same meanings and preferred embodiments as those in the formula (3-1).

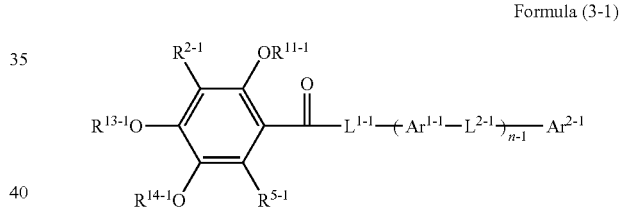

Formula (3-1)

In the formula (3-1), $R^{2-1}$ and $R^{5-1}$ independently represent a hydrogen atom or a substituent, $R^{11-1}$, $R^{13-1}$, and $R^{14-1}$ independently represent a hydrogen atom or an alkyl group, and $L^{1-1}$ and $L^{2-1}$ independently represent a single bond or a divalent linking group. $Ar^{1-1}$ represents an arylene group or an aromatic heterocycle, $Ar^{2-1}$ represents an aryl group or an aromatic heterocycle, n–1 represents an integer of 3 or more, and $L^{2-1}$'s and $Ar^{1-1}$'s in the n–1 units may be the same or different ones respectively. $R^{11-1}$ and $R^{13-1}$ are different from each other, and the alkyl group represented by $R^{13-1}$ contains no heteroatoms.

In the formula (3-1), $R^{2-1}$, $R^{5-1}$, $R^{11-1}$ and $R^{13-1}$ have the same meanings and preferred embodiments as those in the formula (1-1). Further, also $L^{1-1}$, $L^{2-1}$, $Ar^{1-1}$, and $Ar^{2-1}$ have the same meanings and preferred embodiments as those in the formula (1-1).

In the formula (3-1), $R^{14-1}$ represents a hydrogen atom or an alkyl group, and the alkyl group is preferably selected from the above-described preferred examples of the alkyl groups of $R^{11-1}$ and $R^{13-1}$. $R^{14-1}$ is preferably a hydrogen atom or an alkyl group having 1 to 4 carbon atoms, more preferably a hydrogen atom or an alkyl group having 1 to 3 carbon atoms, further preferably a methyl group. $R^{11-1}$ and $R^{14-1}$ may be the same or different ones, and are particularly preferably methyl groups.

Also compounds represented by the following formula (4-A) or (4-B) can be preferably used.

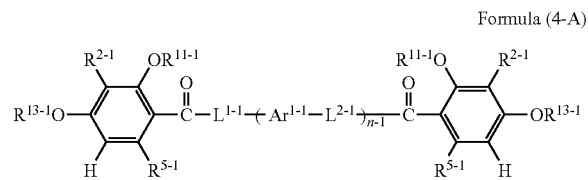

Formula (4-A)

In the formula (4-A), $R^{2-1}$ and $R^{5-1}$ independently represent a hydrogen atom or a substituent, $R^{11-1}$ and $R^{13-1}$ independently represent a hydrogen atom or an alkyl group, and $L^{1-1}$ and $L^{2-1}$ independently represent a single bond or a divalent linking group. $Ar^{1-1}$ represents an arylene group or an aromatic heterocycle, n–1 represents an integer of 3 or more, $L^{1-1}$'s and $Ar^{2-1}$'s in the n–1 units may be the same or different ones respectively. $R^{11-1}$ and $R^{13-1}$ are different from each other, and the alkyl group represented by $R^{13-1}$ contains no heteroatoms.

In the formula (4-A), $R^{2-1}$, $R^{5-1}$, $R^{11-1}$, $R^{13-1}$, $L^{1-1}$, $L^{2-1}$, $Ar^{1-1}$ and n–1 have the same meanings and preferred embodiments as those in the formula (1-1).

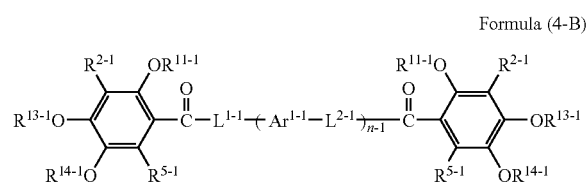

Formula (4-B)

In the formula (4-B), $R^{2-1}$ and $R^{5-1}$ independently represent a hydrogen atom or a substituent, $R^{11-1}$, $R^{13-1}$ and $R^{14-1}$ independently represent a hydrogen atom or an alkyl group, and $L^{1-1}$ and $L^{2-1}$ independently represent a single bond or a divalent linking group. $Ar^{1-1}$ represents an arylene group or an aromatic heterocycle, n–1 represents an integer of 3 or more, and $L^{1-1}$'s and $Ar^{2-1}$'s in the n–1 units may be the same or different ones respectively. $R^{11-1}$ and $R^{13-1}$ are different from each other, and the alkyl group represented by $R^{13-1}$ contains no heteroatoms.

In the formula (4-B), $R^{2-1}$, $R^{5-1}$, $R^{11-1}$, $R^{13-1}$, $R^{14-1}$, $L^{1-1}$, $L^{1-1}$, $Ar^{1-1}$, and n–1 have the same meanings and preferred embodiments as those in the formulae (1-1) and (3-1).

The above-mentioned substituent T is described below.

Preferred examples of the substituents T include halogen atoms such as a fluorine atom, chlorine atom, bromine atom, and iodine atom; alkyl groups, the carbon number thereof being preferably 1 to 30, such as a methyl group, ethyl group, n-propyl group, isopropyl group, t-butyl group, n-octyl group, and 2-ethylhexyl group; cycloalkyl groups, preferably substituted or unsubstituted cycloalkyl groups having a carbon number of 3 to 30, such as a cyclohexyl group, cyclopentyl group, 4-n-dodecylcyclohexyl group; bicycloalkyl groups, preferably substituted or unsubstituted bicycloalkyl groups having a carbon number of 5 to 30, i.e. monovalent groups provided by removing one hydrogen atom from bicycloalkanes having a carbon number of 5 to 30, such as a bicyclo[1,2,2]heptane-2-yl group and bicyclo[2,2,2]octane-3-yl group; alkenyl groups, preferably substituted or unsubstituted alkenyl groups having a carbon number of 2 to 30, such as a vinyl group and allyl group; cycloalkenyl groups, preferably substituted or unsubstituted cycloalkenyl groups having a carbon number of 3 to 30, i.e. monovalent groups provided by removing one hydrogen atom from cycloalkenes having a carbon number of 3 to 30, such as a 2-cyclopentene-1-yl group and 2-cyclohexene-1-yl; substituted or unsubstituted bicycloalkenyl groups, preferably substituted or unsubstituted bicycloalkenyl groups having a carbon number of 5 to 30, i.e. monovalent groups provided by removing one hydrogen atom from bicycloalkenes having one double bond, such as a bicyclo[2,2,1]hepto-2-ene-1-yl group and bicyclo[2,2,2]octo-2-ene-4-yl; alkynyl groups, preferably substituted or unsubstituted alkynyl groups having a carbon number of 2 to 30, such as an ethynyl group and propargyl group; aryl groups, preferably substituted or unsubstituted aryl groups having a carbon number of 6 to 30, such as a phenyl group, p-tolyl group, and naphtyl group; heterocyclic groups, preferably monovalent groups provided by removing one hydrogen atom from 5 or 6-membered, substituted or unsubstituted, aromatic or nonaromatic heterocycle compounds, more preferably 5 or 6-membered, aromatic heterocyclic groups having a carbon number of 3 to 30, such as a 2-furyl group, 2-thienyl group, 2-pyrimidinyl group, and 2-benzothiazolyl group; a cyano group; a hydroxyl group; a nitro group; a carboxyl group; alkoxy groups, preferably substituted or unsubstituted alkoxy groups having a carbon number of 1 to 30, such as a methoxy group, ethoxy group, isopropoxy group, t-butoxy group, n-octyloxy group, and 2-methoxyethoxy group; aryloxy groups, preferably substituted or unsubstituted aryloxy groups having a carbon number of 6 to 30, such as a phenoxy group, 2-methylphenoxy group, 4-tert-butylphenoxy group, 3-nitrophenoxy group, and 2-tetradecanoylaminophenoxy group; silyloxy groups, the carbon number thereof being preferably 3 to 20, such as a trimethylsilyloxy group and tert-butyldimethylsilyloxy group; heterocyclyloxy groups, preferably substituted or unsubstituted heterocyclyloxy groups having a carbon number of 2 to 30, such as a 1-phenyltetrazole-5-oxy group and 2-tetrahydropyranyloxy group; acyloxy groups, preferably a formyloxy group, substituted or unsubstituted alkylcarbonyloxy groups having a carbon number of 2 to 30, and substituted or unsubstituted arylcarbonyloxy groups having a carbon number of 6 to 30, such as a formyloxy group, acetyloxy group, pivaloyloxy group, stearoyloxy group, benzoyloxy group, and p-methoxyphenylcarbonyloxy group; carbamoyloxy groups, preferably substituted or unsubstituted carbamoyloxy groups having a carbon number of 1 to 30, such as an N,N-dimethylcarbamoyloxy group, N,N-diethylcarbamoyloxy group, morpholinocarbonyloxy group, N,N-di-n-octylaminocarbonyloxy group, and N-n-octylcarbamoyloxy group; alkoxycarbonyloxy groups, preferably substituted or unsubstituted alkoxycarbonyloxy groups having a carbon number of 2 to 30, such as a methoxycarbonyloxy group, ethoxycarbonyloxy group, tert-butoxycarbonyloxy group, and n-octylcarbonyloxy group; aryloxycarbonyloxy groups, preferably substituted or unsubstituted aryloxycarbonyloxy groups having a carbon number of 7 to 30, such as a phenoxycarbonyloxy group, p-methoxyphenoxycarbonyloxy group, and p-n-hexadecyloxyphenoxycarbonyloxy group; amino groups, preferably an amino group, substituted or unsubstituted alkylamino groups having a carbon number of 1 to 30, and substituted or unsubstituted anilino groups having a carbon number of 6 to 30, such as an amino group, methylamino group, dimethylamino group, anilino group, N-methylanilino group, and diphenylamino group; acylamino groups, preferably a formylamino group, substituted or unsubstituted alkylcarbonylamino groups having a carbon number of 1 to 30, and substituted or unsubstituted arylcarbonylamino groups having a carbon number of 6 to 30, such as a formylamino group, acetylamino group, pivaloylamino group, lauroylamino group, and benzoylamino group; aminocarbonylamino groups, preferably substituted or unsubstituted aminocarbonylamino groups having a carbon number of 1 to 30, such as a carbamoylamino group, N,N-dimethylaminocarbonylamino group, N,N-diethylaminocarbonylamino group, and morpholinocarbonylamino group; alkoxycarbonylamino groups, preferably substituted or unsubstituted alkoxycarbonylamino groups having a carbon number of 2 to 30, such as a methoxycarbonylamino group, ethoxycarbonylamino group, tert-butoxycarbonylamino group, n-octadecyloxycarbonylamino group, and N-methyl-methoxycarbonylamino group; aryloxycarbonylamino groups, preferably substituted or unsubstituted aryloxycarbonylamino groups having a carbon number of 7 to 30, such as a phenoxycarbonylamino group, p-chlorophenoxycarbonylamino group, and m-n-octyloxyphenoxycarbonylamino group; sulfamoylamino groups, preferably substituted or unsubstituted sulfamoylamino groups having a carbon number of 0 to 30, such as a sulfamoylamino group, N,N-dimethylaminosulfonylamino group, and N-n-octylaminosulfonylamino group; alkyl- or aryl-sulfonylamino groups, preferably substituted or unsubstituted alkylsulfonylamino groups having a carbon number of 1 to 30 and substituted or unsubstituted arylsulfonylamino groups having a carbon number of 6 to 30, such as a methylsulfonylamino group, butylsulfonylamino group, phenylsulfonylamino group, 2,3,5-trichlorophenylsulfonylamino group, and p-methylphenylsulfonylamino group; a mercapto group; alkylthio groups, preferably substituted or unsubstituted alkylthio groups having a carbon number of 1 to 30, such as a methylthio group, ethylthio group, and n-hexadecylthio group; arylthio groups, preferably substituted or unsubstituted arylthio groups having a carbon number of 6 to 30, such as a phenylthio group, p-chlorophenylthio group, and m-methoxyphenylthio group; heterocyclylthio groups, preferably substituted or unsubstituted heterocyclylthio group having a carbon number of 2 to 30, such as a 2-benzothiazolylthio group and 1-phenyltetrazole-5-yl thio group; sulfamoyl groups, preferably substituted or unsubstituted sulfamoyl groups having a carbon number of 0 to 30, such as an N-ethylsulfamoyl group, N-(3-dodecyloxypropyl) sulfamoyl group, N,N-dimethylsulfamoyl group, N-acetylsulfamoyl group, N-benzoylsulfamoyl group, and N—(N'-phenylcarbamoyl)sulfamoyl group; a sulfo group; alkyl- or aryl-sulfinyl groups, preferably substituted or unsubstituted alkylsulfinyl groups having a carbon number of 1 to 30 and substituted or unsubstituted arylsulfinyl groups having a carbon number of 6 to 30, such as a methylsulfinyl group, ethylsulfinyl group, phenylsulfinyl group, and p-methylphenylsulfinyl group; alkyl- or aryl-sulfonyl groups, preferably substituted or unsubstituted alkylsulfonyl groups having a carbon number of 1 to 30 and substituted or unsubstituted arylsulfonyl groups having a carbon number of 6 to 30, such as a methylsulfonyl group, ethylsulfonyl group, phenylsulfonyl group, and p-methylphenylsulfonyl group; acyl groups, preferably a formyl group, substituted or unsubstituted alkylcarbonyl groups having a carbon number of 2 to 30, substituted or unsubstituted arylcarbonyl groups having a carbon number of 7 to 30, such as an acetyl group and pivaloylbenzoyl group; aryloxycarbonyl groups, preferably substituted or unsubstituted aryloxycarbonyl groups having a carbon number of 7 to 30, such as a phenoxycarbonyl group, o-chlorophenoxycarbonyl group, m-nitrophenoxycarbonyl group, and p-tert-butylphenoxycarbonyl group; alkoxycarbonyl groups, preferably substituted or unsubstituted alkoxycarbonyl groups having a carbon number of 2 to 30, such as a methoxycarbonyl group, ethoxycarbonyl group, tert-butoxycarbonyl group, and n-octadecyloxycarbonyl group; carbamoyl groups, preferably substituted or unsubstituted carbamoyl groups having a carbon number of 1 to 30, such as a carbamoyl group, N-methylcarbamoyl group, N,N-dimethylcarbamoyl group, N,N-di-n-octylcarbamoyl group, and N-(methylsulfonyl)carbamoyl group; aryl- and heterocyclyl-azo groups, preferably substituted or unsubstituted arylazo groups having a carbon number of 6 to 30 and substituted or unsubstituted heterocyclylazo groups having a carbon number of 3 to 30, such as a phenylazo group, p-chlorophenylazo group, and 5-ethylthio-1,3,4-thiadiazole-2-yl azo group; imide groups, preferably an N-succinimido group and N-phthalimido group; phosphino groups, preferably substituted or unsubstituted phosphino groups having a carbon number of 2 to 30, such as a dimethylphosphino group, diphenylphosphino group, and methylphenoxyphosphino group; phosphinyl groups, preferably substituted or unsubstituted phosphinyl groups having a carbon number of 2 to 30, such as a phosphinyl group, dioctyloxyphosphinyl group, and diethoxyphosphinyl group; phosphinyloxy groups, preferably substituted or unsubstituted phosphinyloxy groups having a carbon number of 2 to 30, such as a diphenoxyphosphinyloxy group and dioctyloxyphosphinyloxy group; phosphinylamino groups, preferably substituted or unsubstituted phosphinylamino groups having a carbon number of 2 to 30, such as a dimethoxyphosphinylamino group and dimethylaminophosphinylamino group; and silyl groups, preferably substituted or unsubstituted silyl groups having a carbon number of 3 to 30, such as a trimethylsilyl group, tert-butyldimethylsilyl group, and phenyldimethylsilyl group.

In the above substituents having a hydrogen atom, the hydrogen atom may be removed and further replaced by the above substituent. Examples of such functional groups include alkylcarbonylaminosulfonyl groups, arylcarbonylaminosulfonyl groups, alkylsulfonylaminocarbonyl groups, and arylsulfonylaminocarbonyl groups, and specific examples thereof include a methylsulfonylaminocarbonyl group, p-methylphenylsulfonylaminocarbonyl group, acetylaminosulfonyl group, and benzoylaminosulfonyl group.

Further, when a compound has two or more substituents, the substituents may be the same or different ones, and may be connected to each other to form a ring if possible.

The compound represented by the formula (4-A) is preferably such that $R^{11-1}$'s are methyl groups, $R^{2-1}$'s and $R^{5-1}$'s are hydrogen atoms, $R^{13-1}$ is an alkyl group having 3 or more carbon atoms, $L^{1-1}$ and $L^{2-1}$ are a single bond, —O—, —CO—, —NR—, —SO$_2$NR—, —NRSO$_2$—, —CONR—, —NRCO—, —COO—, —OCO—, or an alkynylene group (in which R is a hydrogen atom, or an alkyl or aryl group that may have a substituent, preferably a hydrogen atom), $Ar^{1-1}$ is an arylene group, and n–1 is 3 to 6.

The compounds represented by the formulae (1-1) are illustrated in detail below with reference to specific examples without intention of restricting the scope of the invention.

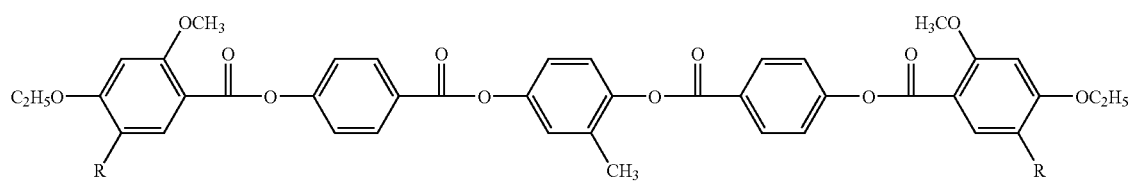

A-101; R = H
B-101; R = OCH$_3$

-continued
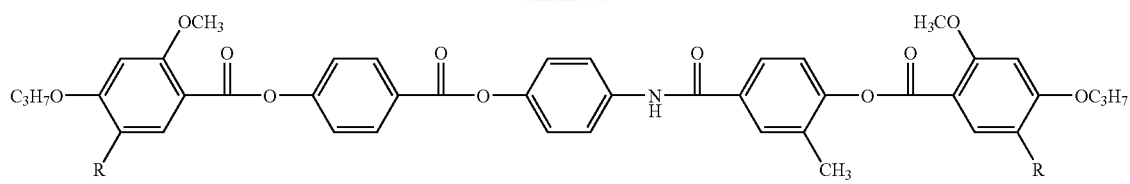
A-102; R = H
B-102; R = OCH₃
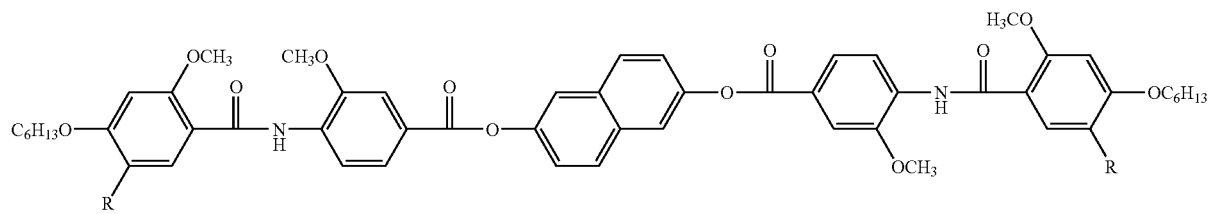
A-103; R = H
B-103; R = OCH₃
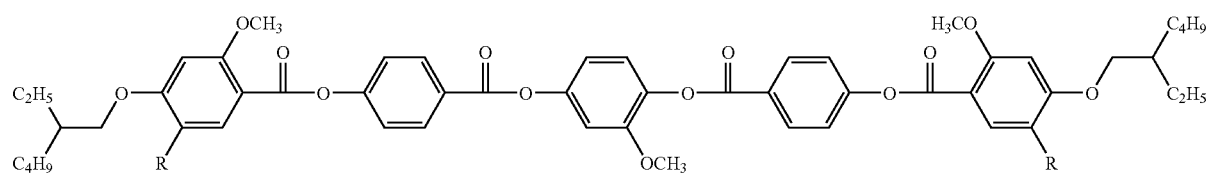
A-104; R = H
B-104; R = OCH₃
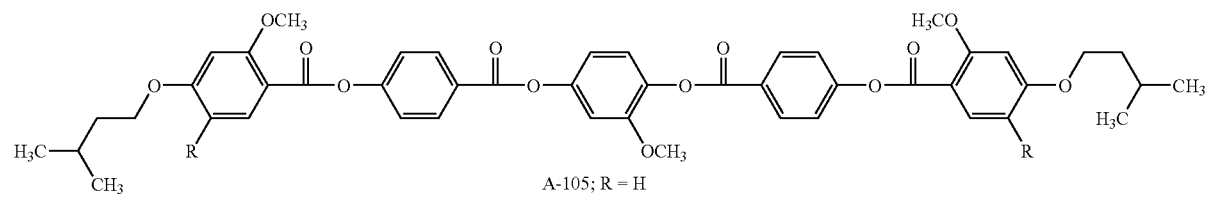
A-105; R = H
B-105; R = OCH₃
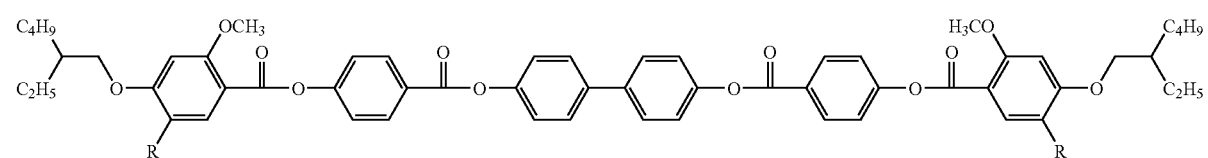
A-106; R = H
B-106; R = OCH₃
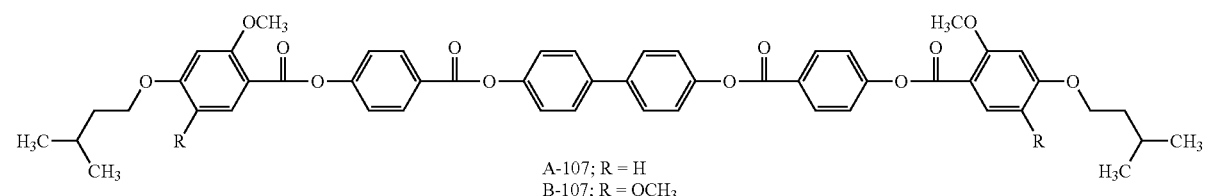
A-107; R = H
B-107; R = OCH₃
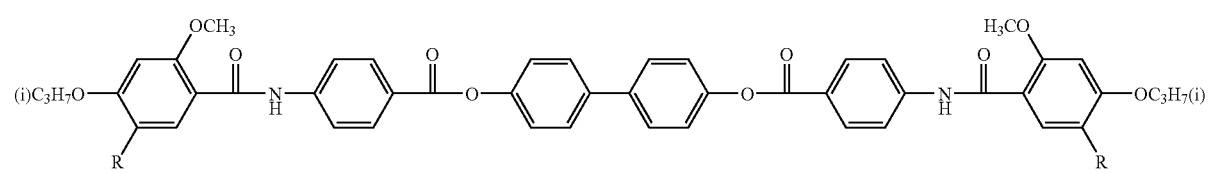
A-108; R = H
B-108; R = OCH₃

-continued
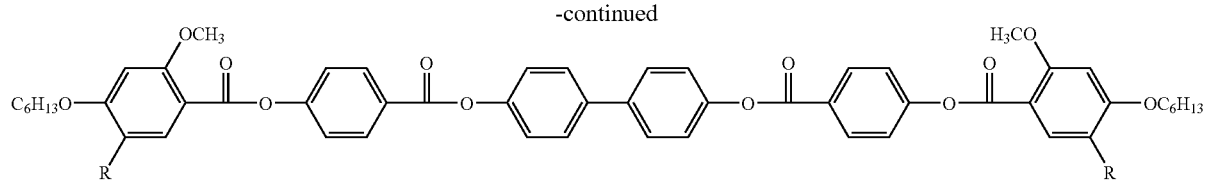
A-109; R = H
B-109; R = OCH$_3$
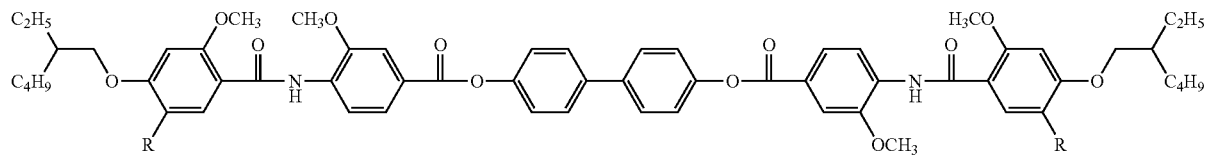
A-110; R = H
B-110; R = OCH$_3$
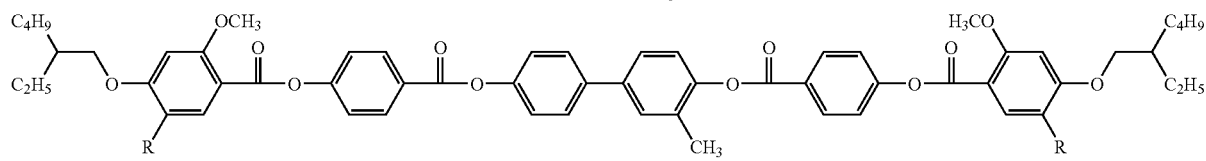
A-111; R = H
B-111; R = OCH$_3$
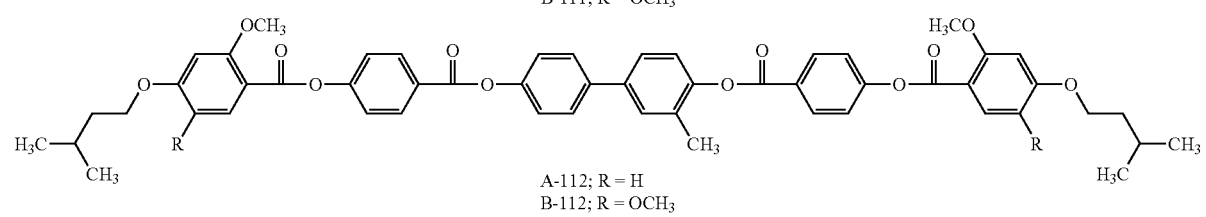
A-112; R = H
B-112; R = OCH$_3$
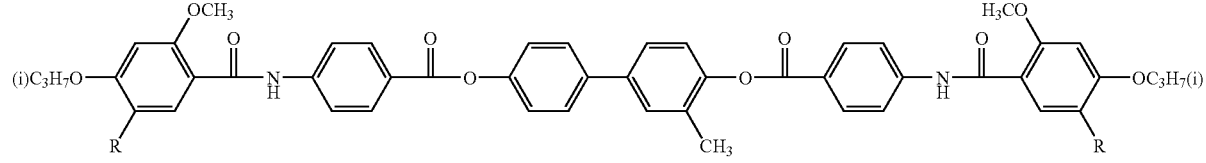
A-113; R = H
B-113; R = OCH$_3$
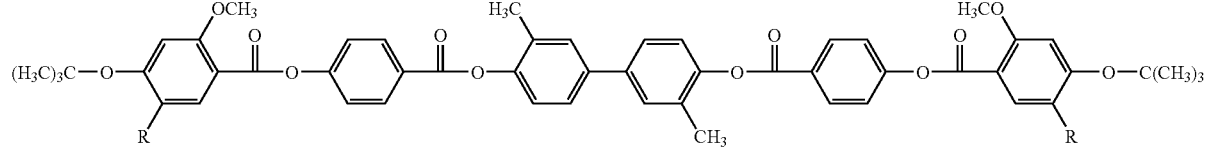
A-114; R = H
B-114; R = OCH$_3$
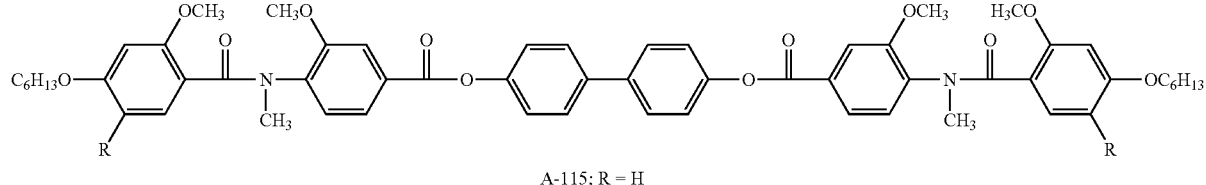
A-115; R = H
B-115; R = OCH$_3$
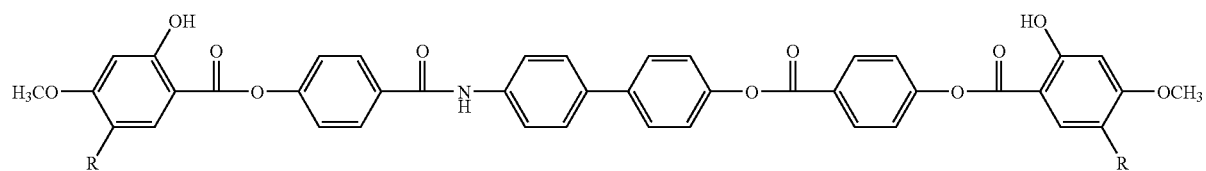
A-116; R = H
B-116; R = OCH$_3$ -continued
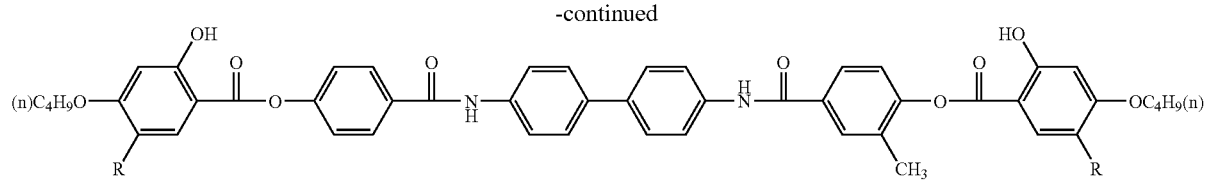
A-117; R = H
B-117; R = OCH₃
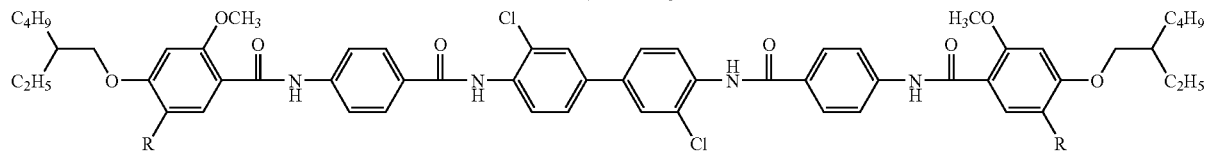
A-118; R = H
B-118; R = OCH₃
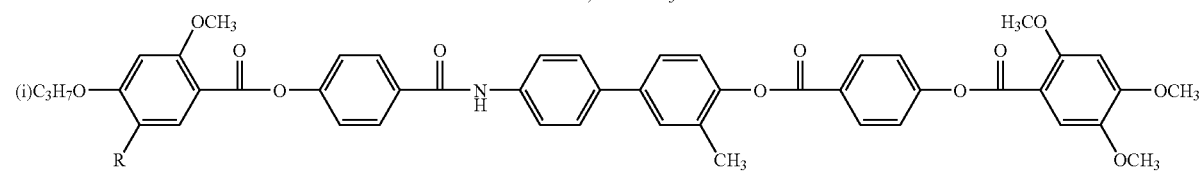
A-119; R = H
B-119; R = OCH₃
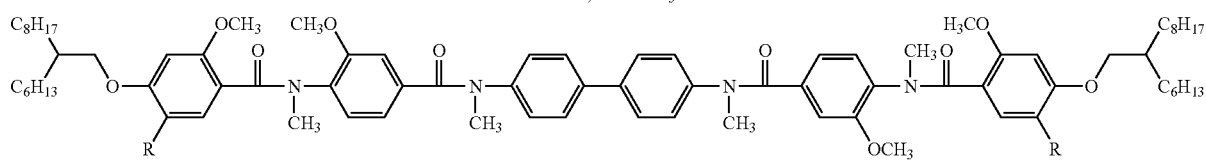
A-120; R = H
B-120; R = OCH₃
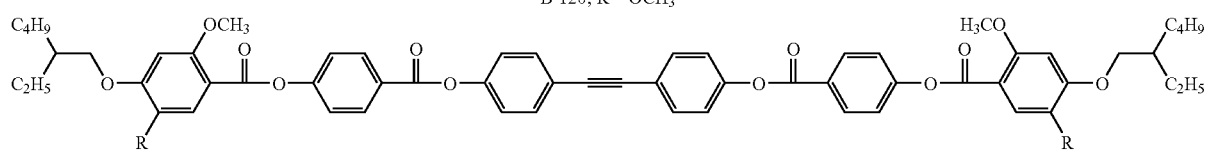
A-121; R = H
B-121; R = OCH₃
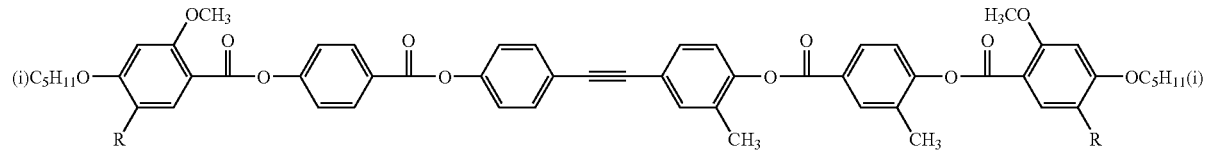
A-122; R = H
B-122; R = OCH₃
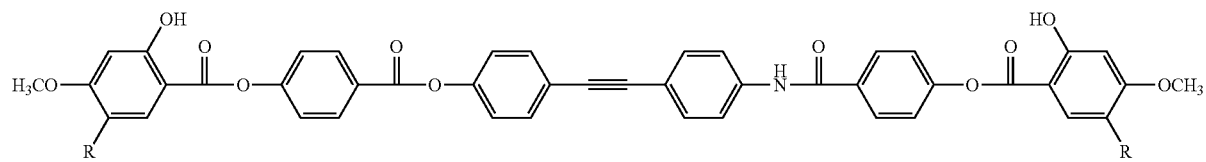
A-123; R = H
B-123; R = OCH₃
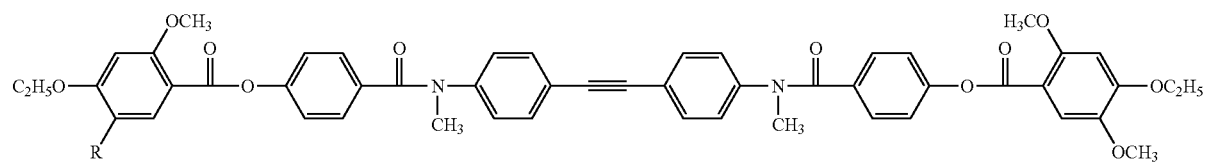
A-124; R = H
B-124; R = OCH₃

-continued
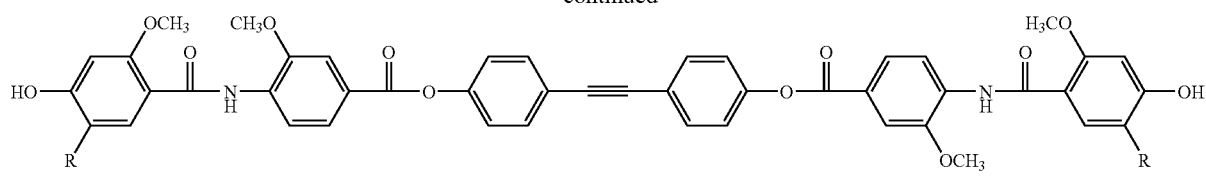
A-125; R = H
B-125; R = OCH₃
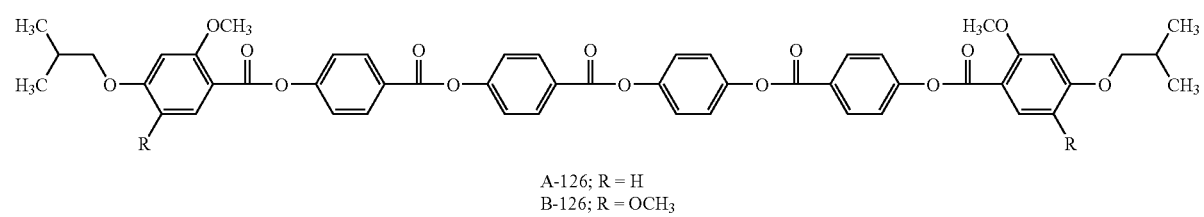
A-126; R = H
B-126; R = OCH₃
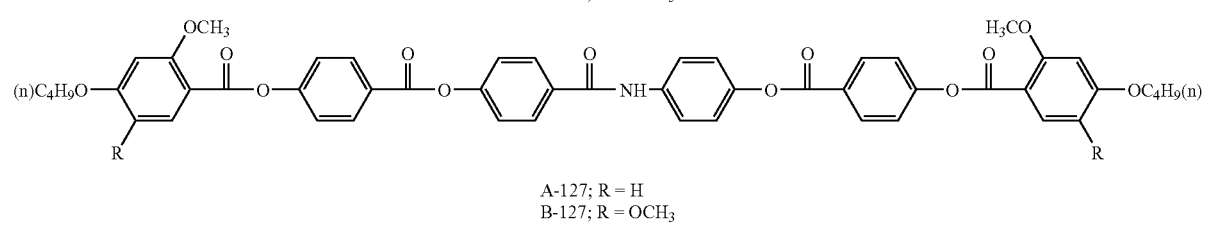
A-127; R = H
B-127; R = OCH₃
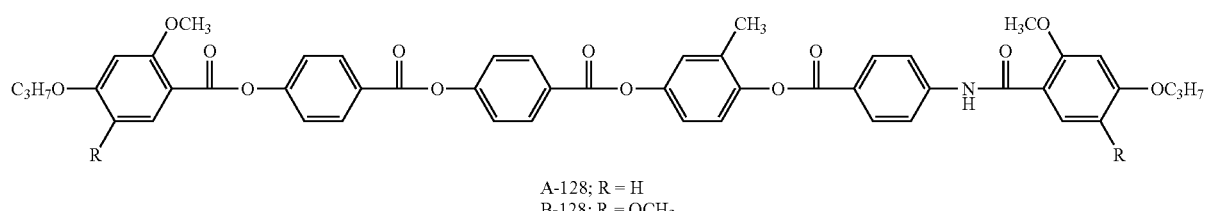
A-128; R = H
B-128; R = OCH₃
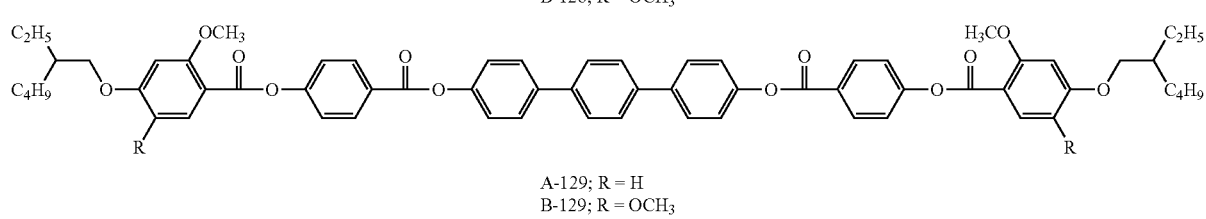
A-129; R = H
B-129; R = OCH₃
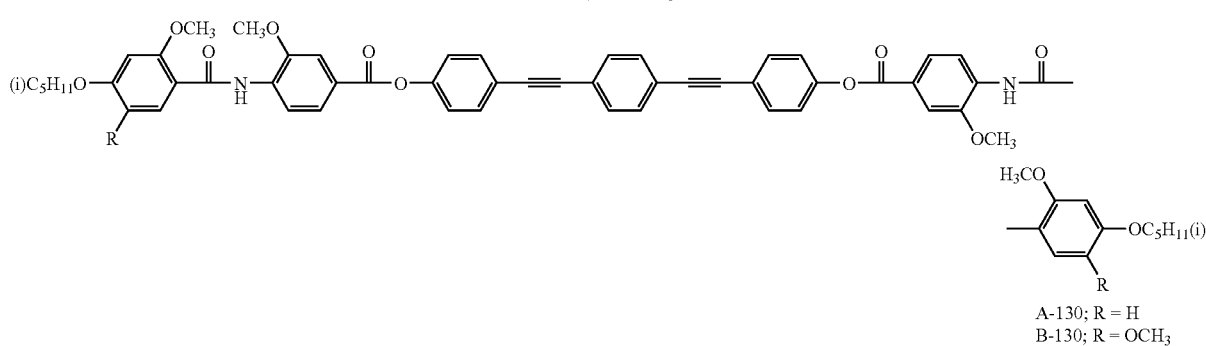
A-130; R = H
B-130; R = OCH₃
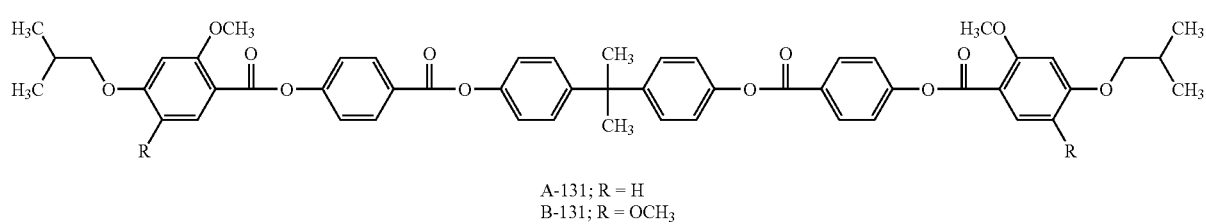
A-131; R = H
B-131; R = OCH₃

-continued

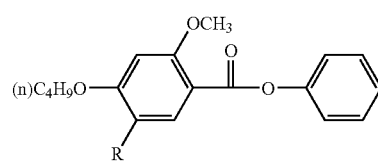
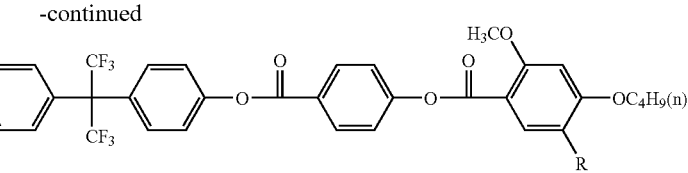

A-132; R = H
B-132; R = OCH3

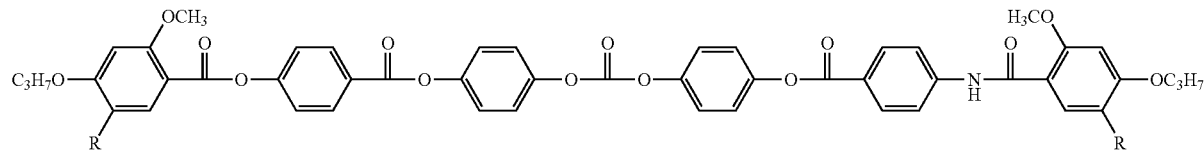

A-133; R = H
B-133; R = OCH3

C-101

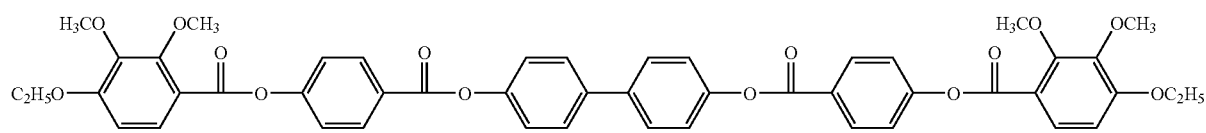

C-102

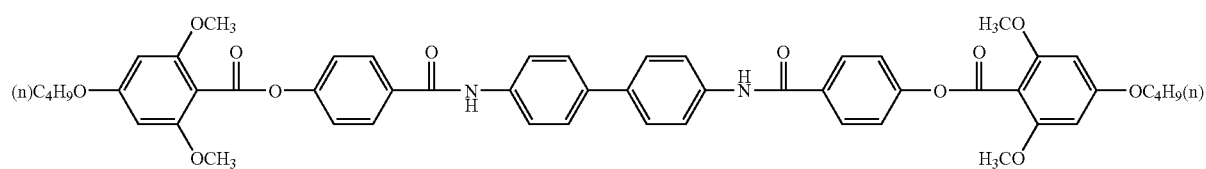

C-103

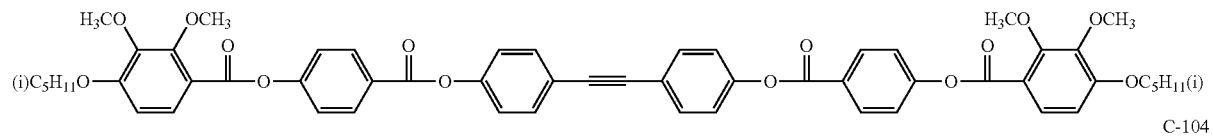

C-104

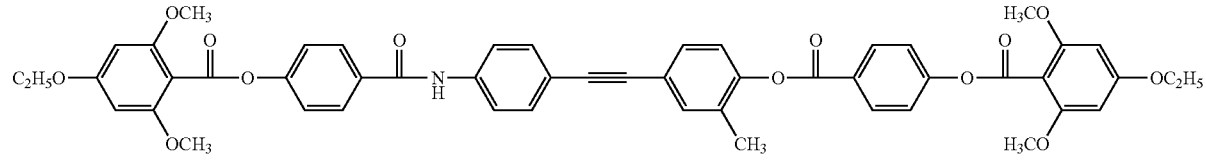

C-105

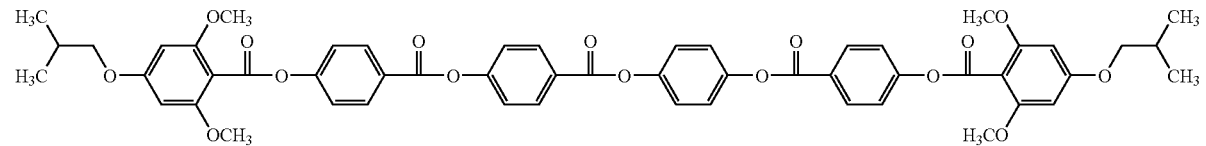

The compound represented by the formula (1-1) can be synthesized by preparing a substituted benzoic acid and by carrying out a common esterification or amidation reaction between the substituted benzoic acid and a phenol or aniline derivative. The reaction may be any one as long as it can generate an ester or amide bond. Examples of the reaction methods include methods containing converting the substituted benzoic acid to an acyl halide and condensing the acyl halide with the phenol or aniline derivative, and methods containing dehydration condensation of the substituted benzoic acid and the phenol or aniline derivative using a condensing agent or a catalyst.

It is preferred that the compound represented by the formula (1-1) is produced by the method containing converting the substituted benzoic acid to the acyl halide and condensing the acyl halide with the phenol or aniline derivative from the viewpoint of the production process.

A reaction solvent used in the production of the compound represented by the formula (1-1) may be selected from hydrocarbon solvents (preferably toluene and xylene), ether solvents (preferably dimethyl ether, tetrahydrofuran, and dioxane), ketone solvents, ester solvents, acetonitrile, dimethylformamide, and dimethylacetamide. These solvents may be used singly or as a mixed solvent thereof. The solvent is preferably toluene, acetonitrile, dimethylformamide, and dimethylacetamide.

The reaction temperature is preferably 0 to 150° C., more preferably 0 to 100° C., further preferably 0 to 90° C., particularly preferably 20 to 90° C.

It is preferred that a base is not used in the reaction. In the case of using a base, it may be an organic or inorganic base, preferably an organic base, and examples thereof include pyridine and tertiary alkylamine (preferably triethylamine and ethyldiisopropyl amine).

The compounds represented by the formulae (4-A) and (4-B) can be synthesized by known methods. For example, when n−1 is 4, the compounds may be obtained by reacting a starting material having the following structure A with a derivative having a reactive moiety such as a hydroxyl group or an amino group, and by connecting 2 molecules of thus-obtained following intermediate B by 1 molecule of the following compound C. It should be noted that the methods for synthesizing the compounds represented by formulae (4-A) and (4-B) are not limiter to this example.

Structure A

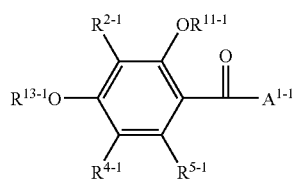

wherein A represents a reactive moiety such as a hydroxyl group and a halogen atom, $R^{11-1}$, $R^{2-1}$, $R^{13-1}$, and $R^{5-1}$ are the same as above, and $R^{4-1}$ is a hydrogen atom or the above substituent represented by $OR^{14-1}$.

Intermediate B

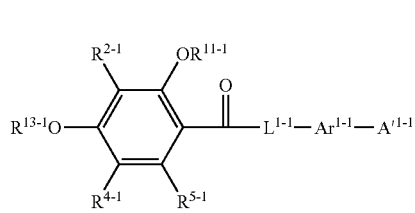

wherein $A^{1-1}$ represents a reactive group such as a carboxyl group, and $R^{11-1}$, $R^{2-1}$, $R^{13-1}$, $R^{4-1}$, $R^{5-1}$, $Ar^{1-1}$, and $L^{1-1}$ are the same as above.

Compound C

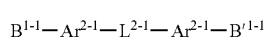

wherein $B^{1-1}$ and $B'^{1-1}$ each represent a reactive moiety such as a hydroxyl group and an amino group, and $Ar^{2-1}$ and $L^{2-1}$ have the same meanings as above $Ar^{1-1}$ and $L^{1-1}$, respectively.

Compounds of formulae (1-1) to (4-B) are preferred as a retarder especially in producing biaxial films having a good Re-generating ability by stretching.

One or more retarders may be used in the invention either singly or as combined. The amount of the retarder to be added to the film in the invention is, for example, preferably from 1% to 30% by weight, more preferably from 2% to 25% by weight relative to 100% by weight of cellulose acylate. When two or more retarders are combined and used herein, it is desirable that their total amount falls within the above-mentioned range.

Regarding the method of adding the retarder to the film in the invention, it may be dissolved in an organic solvent such as alcohol, methylene chloride or dioxolane, and then the resulting solution may be added to a cellulose acylate solution (dope); or it may be directly added to the dope composition.

One or more different types of the retarders may be used herein either singly or as combined.

(UV Absorbent)

In the first cellulose acylate retardation film of the invention, a UV absorbent can be used to also act as a retarder.

Examples of the UV absorbents used in the invention include oxybenzophenone compounds, benzotriazole compounds, salicylic ester compounds, benzophenone compounds, cyanoacrylate compounds, and nickel complex salts, and preferred are benzotriazole compounds with small coloration. Further, also UV absorbents described in JP-A-10-182621 and JP-A-8-337574, and high-molecular UV absorbents described in JP-A-6-148430 may be preferably used. In a case of using the cellulose acylate film as a protective film of a polarizer in the invention, the UV absorbent is preferably excellent in absorptivity for ultraviolet rays with wavelengths of 370 nm or less in view of preventing deterioration of the polarizer and liquid crystal, and has preferably small absorption of visible lights with wavelengths of 400 nm or more in view of liquid crystal display properties.

Specific examples of the benzotriazole UV absorbents useful in the invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2-methylene bis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazole-2-yl)-6-(straight or branched dodecyl)-4-methylphenols, and mixtures of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzo triazole-2-yl)phenyl]propionate, though the UV absorbent is not limited to the specific examples. Further, commercially available, TINUVIN 109, TINUVIN 171, and TINUVIN 326 (available from Ciba Specialty Chemicals) can be preferably used.

[Production of First Retardation Cellulose Acylate Film]

A method for producing the first retardation cellulose acylate film for use in the invention is described in detail.

The first retardation cellulose acylate film in the invention may be produced according to a solution casting method. In the solution casting method, a solution (dope) prepared by dissolving cellulose acylate in an organic solvent is used to produce films.

The organic solvent preferably contains a solvent selected from ethers having from 3 to 12 carbon atoms, ketones having from 3 to 12 carbon atoms, esters having from 3 to 12 carbon atoms, and halogenohydrocarbons having from 1 to 6 carbon atoms.

The ethers, ketones and esters may have acyclic structure. In addition, compounds having two or more functional groups (e.g., —O—, —CO— and —COO—) of the ethers, ketones and esters may also be used as the organic solvent.

The organic solvent may have any other functional group such as an alcoholic hydroxyl group. When the organic solvent has two or more functional groups, then it is desirable that the number of the carbon atoms constituting the solvent is within the above-mentioned preferred range of the solvent having either one of the functional groups.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetole.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvents having two or more functional groups include 2-ethoxyethyl acetate, 2-methoxyethanol and 2-butoxyethanol.

The number of the carbon atoms constituting the halogenohydrocarbon having from 1 to 6 carbon atoms is preferably 1 or 2, more preferably 1. The halogen of the halogenohydrocarbon is preferably chlorine. The ratio in which the hydrogen atom of the halogenohydrocarbon is substituted with halogen is preferably from 25 to 75 mol %, more preferably from 30 to 70 mol %, even more preferably 35 to 65 mol %, most preferably from 40 to 60 mol %. Methylene chloride is the most typical halogenohydrocarbon for use herein.

Two or more organic solvents may be combined for use herein.

The cellulose acylate solution (dope) may be prepared in an ordinary method where it is processed at a temperature not lower than 0° C. (room temperature or high temperature). For preparing the cellulose acylate solution, herein employable are a method and an apparatus for dope preparation in an ordinary solution casting method. In such an ordinary process, a halogenohydrocarbon (especially methylene chloride) is preferably used for the organic solvent.

The amount of cellulose acylate in the cellulose acylate solution (composition) is so controlled that it is in an amount of from 10% to 40% by mass of the solution obtained. More preferably, the amount of cellulose acylate is from 10% to 30% by mass. To the organic solvent (main solvent), optional additives to be mentioned below may be added.

The cellulose acylate solution may be prepared by stirring cellulose acylate and an organic solvent at room temperature (e.g., 0 to 40° C.). A high-concentration solution may be stirred under pressure and under heat. Concretely, cellulose acylate and an organic solvent are put into a pressure chamber, sealed up, and heated with stirring under pressure at a temperature not lower than the boiling point of the solvent at atmospheric pressure but up to a temperature at which the solvent does not boil. The heating temperature is preferably 40° C. or higher, more preferably from 60 to 200° C., even more preferably from 80 to 110° C.

The constitutive components may be previously roughly mixed before put into a chamber. They may be put thereinto one after another. The chamber must be so designed that it allows stirring therein. An inert gas such as nitrogen gas may be introduced into the chamber for pressure application thereto. If desired, the solvent in the chamber may be heated so as to increase the vapor pressure therein for pressure application. After the chamber has been sealed up, the constitutive components may be introduced thereinto under pressure.

When it is heated, the chamber is preferably heated from the outside. For example, a jacket-type heater may be used. A plate heater may be disposed outside the chamber, and a liquid may be circulated through a pipe line around it so as to heat the whole of the chamber.

Preferably, a stirring blade is provided inside the chamber, with which the stirring may be attained. Regarding the length thereof, it is desirable that the stirring blade may reach around the wall of the chamber. Also preferably, a scraper is fitted to the tip of the stirring blade, for the purpose of renewing the liquid film on the wall of the chamber.

The chamber may be equipped with instruments such as a pressure gauge and a thermometer. In the chamber, the constitutive components are dissolved in a solvent. The thus-prepared dope is taken out of the chamber after cooled, or after taken out, it is cooled with a heat exchanger or the like.

The cellulose acylate solution may also be prepared according to a cooling dissolution method. In a cooling dissolution method, cellulose acylate may be dissolved in an organic solvent, in which, however, cellulose acylate is difficult to dissolve in an ordinary dissolution method. Even in a solvent in which cellulose acylate can be dissolved in an ordinary dissolution method, the cooling dissolution method is effective in that it may rapidly give a uniform solution.

In a cooling dissolution method, cellulose acylate is first gradually added to an organic solvent with stirring at room temperature. The amount of cellulose acylate is preferably so controlled that it may be in the resulting mixture in an amount of from 10% to 40% by mass. More preferably, the amount of cellulose acylate is from 10% to 30% by mass. Further, additives to be mentioned below may be previously added to the mixture.

Next, the mixture is cooled preferably to −100 to −10° C. (more preferably −80 to −10° C., even more preferably −50 to −2° C., most preferably −50 to −30° C.). Cooling it may be attained in a dry ice/methanol bath (−75° C.) or in a cooled diethylene glycol solution (−30 to −20° C.). Thus cooled, the mixture of cellulose acylate and organic solvent is solidified.

Preferably, the cooling speed is 4° C./min or higher, more preferably 8° C./min or higher, most preferably 12° C./min or higher. The cooling speed is preferably higher, but the theoretical uppermost limit thereof is about 10000° C./sec, the technical uppermost limit thereof is about 1000° C./sec, and the practicable uppermost limit thereof is about 100° C./sec. The cooling speed is a value obtained by dividing the difference between the temperature at the start of the cooling and the temperature at the end thereof, by the time taken from the start of the cooling to the end having the final cooling temperature.

Then, when the cooled mixture is heated preferably at 0 to 200° C. (more preferably at 0 to 150° C., even more preferably at 0 to 120° C., most preferably at 0 to 50° C.), then cellulose acylate dissolves in the organic solvent. Heating it may be attained merely by leaving the mixture at room temperature, but the mixture may be heated in a warm bath. Preferably, the heating speed is 4° C./min or higher, more preferably 8° C./min or higher, most preferably 12° C./min or higher. The heating speed is preferably higher, but the theoretical uppermost limit thereof is about 10000° C./sec, the technical uppermost limit thereof is about 1000° C./sec, and the practicable uppermost limit thereof is about 100° C./sec. The heating speed is a value obtained by dividing the difference between the temperature at the start of the heating and the temperature at the end thereof, by the time taken from the start of the heating to the end having the final heating temperature.

In the manner as above, a uniform cellulose acylate solution is obtained. When the dissolution is insufficient, then the operation of cooling and heating may be repeated. The matter as to whether the dissolution is sufficient or not may be judged merely by visually observing the outward condition of the solution.

In the cooling dissolution method, a closed container is preferably used for the purpose of preventing the solution from being contaminated with water owing to dew formation during cooling. In the cooling and heating operation, when the cooling is attained under pressure and the heating is attained under reduced pressure, then the dissolution time may be shortened. For such pressure cooling and reduced pressure heating, a pressure container is preferably used.

When cellulose acetate (substitution degree for acetyl group: 60.9%, viscosity-average degree of polymerization: 299) is dissolved in methyl acetate according to a cooling dissolution method and when the resulting 20% by mass solution is analyzed with a differential scanning calorimeter (DSC), then a pseudo-phase transition point between a sol state and a gel state is seen at around 33° C., and the solution is in a uniform gel state at a temperature lower than it. Accordingly, it is desirable that the solution is kept at a temperature not lower than the pseudo-phase transition temperature, preferably at a temperature higher by about 10° C. than the gel phase transition temperature. However, the pseudo-phase transition temperature varies depending on the substitution degree for acetyl group and the viscosity-average degree of polymerization of cellulose acetate, the solution concentration and the organic solvent used.

From the thus-prepared cellulose acylate solution (dope), produced is a first retardation cellulose acylate film in a solution casting method. Preferably, a retarder is added to the dope. The dope is cast onto a drum or a band, on which the solvent is evaporated away to form a film thereon. Before cast, the concentration of the dope is preferably so controlled that the solid content of the dope could be from 18% to 35%. Preferably, the surface of the drum or the band is mirror-finished. Also preferably, the dope is cast onto the drum or the band having a surface temperature not higher than 10° C.

A mode of drying in the solution casting method is described, for example, in U.S. Pat. No. 2,336,310, U.S. Pat. No. 2,367,603, U.S. Pat. No. 2,492,078, U.S. Pat. No. 2,492, 977, U.S. Pat. No. 2,492,978, U.S. Pat. No. 2,607,704, U.S. Pat. No. 2,739,069, U.S. Pat. No. 2,739,070, BP 640731 and BP 736892; JP-B-45-4554, JP-B-49-5614, JP-A-60-176834, JP-A-60-203430 and JP-A-62-115035. Drying on a band or a drum may be attained by applying thereto a blow of an inert gas such as air or nitrogen.

The obtained film may be peeled off from the drum or the band, and may be dried with hot air having a varying temperature of from 100° C. to 160° C., whereby the residual solvent may be evaporated away. The method is described in JP-B-5-17844. According to the method, the time from the casting to the peeling may be shortened. For carrying out the method, the dope must be gelled at the surface temperature of the drum or the band on which the dope is cast.

The prepared cellulose acylate solution (dope) may be cast in two or more layers for film formation. In this case, it is desirable that the first retardation cellulose acylate film is formed according to a solution casting method. The dope is cast onto a drum or a band, and then the solvent is evaporated away to form a film thereon. Before cast, the dope concentration is preferably so controlled that the solid content of the dope could be from 10% to 40% by mass. Also preferably, the surface of the drum or the band is mirror-finished.

When two or more layers of plural cellulose acylate solutions are formed by casting, then plural cellulose acylate solutions may be cast. Through plural casting ports spaced from each other in the machine direction of the support, cellulose acylate-containing solutions are separately cast onto the support and laminated thereon to form a film. For this, for example, methods described in JP-A-61-158414, JP-A-1-122419 and JP-A-11-198285 may be referred to. When cellulose acylate solutions are cast through two casting ports, then a film may also be produced. For this, for example, methods described in JP-B-60-27562, JP-A-61-94724, JP-A-61-947245, JP-A-61-104813, JP-A-61-158413 and JP-A-6-134933 may be referred to. Also employable herein is a casting method described in JP-A-56-162617, in which a high-viscosity cellulose acylate solution flow is enveloped with a low-viscosity cellulose acylate solution, and the high-viscosity and low-viscosity cellulose acylate solutions are co-extruded simultaneously to give a film.

Two casting ports may be used as follows: A film is formed on a support through the first casting port, and this is peeled off. On the surface of the film having been in contact with the support, a second dope is cast via a second casting port to form a second film thereon. For this, for example, referred to is a method described in JP-B-44-20235.

The same cellulose acylate solution may be cast, or two or more different cellulose acylate solutions may be cast. In order to make plural cellulose acylate layers have different functions, different cellulose acylate solutions corresponding to the intended functions may be extruded out via the respective casting ports. In addition, the cellulose acylate solution in the invention may be co-cast with any other functional layers (e.g., adhesive layer, dye layer, antistatic layer, antihalation layer, UV absorbent layer, polarizing layer).

In a conventional method of forming a single layer using a single cellulose acylate solution, heretofore it is often necessary to extrude a high-concentration and high-viscosity cellulose acylate solution in order to form a single layer having a necessary thickness. In this case, the cellulose acylate solution is poorly stable and may often give solids, therefore causing some problems of unfavorable fish dyes and surface roughness. To solve the problems, plural cellulose acylate solutions may be cast via different casting ports, whereby high-viscosity solutions may be co-extruded onto a support. As a result, films of better surface smoothness and better surface profile can be obtained, and in addition, drying load may be reduced since such thick cellulose acylate solutions are used, and the production speed of films may be more increased.

Degradation inhibitors (e.g., antioxidant, peroxide decomposer, radical inhibitor, metal inactivator, acid scavenger, amine) may be added to the first retardation cellulose acylate film. The degradation inhibitors are described, for example, in JP-A-3-199201, JP-A-5-1907073, JP-A-5-194789, JP-A-5-271471, JP-A-6-107854. Preferably, the amount of the degradation inhibitor to be added is from 0.01% to 1% by mass, more preferably from 0.01% to 0.2% by mass of the solution (dope). When the amount thereof is 0.01% by mass or more, then the degradation inhibitor may favorably exhibit a sufficient effect; and when it is 1% by mass or less, then there may hardly occur a problem of bleeding out of the degradation inhibitor onto the film surface. Especially preferred examples of the degradation inhibitor are butylated hydroxytoluene (BHT) and tribenzylamine (TBA).

The process from casting to drying may be attained in air or in an inert gas atmosphere such as nitrogen gas. The winder to be used in producing the first retardation cellulose acylate film in the invention may be any one generally used in the art. For example, the film may be wound up in various winding methods of, for example, a constant-tension method, a constant-torque method, a taper-tension method or a programmed-tension control method in which the internal stress is kept constant.

[Stretching Treatment]

For the first retardation film, especially preferably used is a cellulose acylate film subjected to stretching treatment (stretched cellulose acylate film). The stretched cellulose acylate film may have a desired retardation given thereto through the stretching treatment. Preferably, the first retardation cellulose acylate film is stretched in the machine direction. After stretched in the machine direction, the cellulose acylate film may have a retardation expressed in the machine direction thereof. Using the film makes it possible to produce a polarizing plate (hereinafter referred to as a first polarizing plate) in a roll-to-roll process where the polarizer (hereinafter referred to as a first polarizer) and the first retardation film are stuck together in such a manner that the absorption axis of the polarizer could be in parallel to the slow axis of the first retardation film. This is favorable for increasing the producibility of polarizing plates and for reducing the cost thereof.

The film may be stretched at room temperature or under heat. The film may be stretched in dry, and this is effective especially when a solvent remains in the film. In case where the film is stretched in the machine direction, for example, the speed of the film-conveying rollers is so controlled that the film-winding speed could be higher than the film-peeling speed whereby the film is stretched.

The film draw ratio (elongation of the stretched film relative to the unstretched film) is preferably from 1% to 50%, more preferably from 2% to 30%.

[Thickness of Cellulose Acylate Film]

The thickness of the first retardation cellulose acylate film in the invention is preferably from 10 μm to 200 μm, more preferably from 20 μm to 150 μm, most preferably from 30 μm to 100 μm.

<Second Retardation Film>

The second retardation film in the invention is described in detail.

The second retardation film in the invention is characterized by satisfying the relation of the following formulae (7) to (12):

$$40 \text{ nm} < Re(548) < 300 \text{ nm} \tag{7}$$

$$20 \text{ nm} < Rth(548) < 400 \text{ nm} \tag{8}$$

$$0.5 < Re(446)/Re(548) < 1.5 \tag{9}$$

$$0.5 < Re(628)/Re(548) < 2.0 \tag{10}$$

$$0.5 < Rth(446)/Rth(548) < 2.0 \tag{11}$$

$$0.5 < Rth(628)/Rth(548) < 1.5 \tag{12}$$

The formula (7) is more preferably 50 nm<Re(548)<250 nm, most preferably 60 nm<Re(548)<200 nm.

The formula (8) is more preferably 30 nm<Rth(548)<300 nm, most preferably 40 nm<Rth(548)<250 nm.

The formula (9) is more preferably 0.5<Re(446)/Re(548)<1.2, most preferably 0.5<Re(446)/Re(548)<1.1.

The formula (10) is more preferably 0.8<Re(628)/Re(548)<1.8, most preferably 1.0<Re(628)/Re(548)<1.5.

The formula (11) is more preferably 0.7<Rth(446)/Rth(548)<1.7, most preferably 0.8<Rth(446)/Rth(548)<1.5.

The formula (12) is more preferably 0.6<Rth(628)/Rth(548)<1.4, most preferably 0.7<Rth(628)/Rth(548)<1.2.

Defining $Re(\lambda)$ and $Rth(\lambda)$ of the retardation film to fall within the above-mentioned ranges is favorable since the effect of the film to reduce the viewing angle-dependent color tone change in display devices is greater. The film of the type is more preferred for a protective film of polarizers.

Preferably, the absorption of the second retardation film in the invention satisfies the following relation (A) relative to the absorption of the first retardation film.

$$\lambda 1.0(1st) - \lambda 1.0(2nd) > 0 \tag{A}$$

(wherein λ1.0(1st) indicates a wavelength at which the absorbance of the first retardation film is 1.0, as calculated in terms of the film having a thickness of 80 μm, within a wavelength range of from 200 nm to 700 nm; λ1.0 (2nd) indicates a wavelength at which the absorbance of the second retardation film is 1.0, as calculated in terms of the film having a thickness of 80 μm, within a wavelength range of from 200 nm to 700 nm).

The absorbance as calculated in terms of the film having a thickness of 80 μm, as referred to herein, is a value calculated according to the following formula:

(Absorbance as calculated in terms of the film having a thickness of 80 μm)=(Absorbance of the film)/(Thickness (μm) of the film)×80.

The formula (A) is more preferably $\lambda(1st) - \lambda(2nd) > 10$, most preferably $\lambda(1st) - \lambda(2nd) > 20$.

When the films satisfy the relation of formula (A), then the effect of the first retardation film to reduce the viewing angle-dependent color tone change and the effect of the second retardation film to reduce the viewing angle-dependent color tone change are synergistically augmented, therefore more effectively resulting in the reduction in viewing angle-dependent color change in liquid crystal display devices.

For reducing the thickness of liquid crystal display devices comprising it, the second retardation film in the invention preferably functions also as the protective film of the polarizer in the devices.

Various polymers may be sued fro the second retardation film in the invention, and more preferred are those having both a positive intrinsic birefringent component and a negative intrinsic birefringent component. Concretely preferred are modified polycarbonate films such as Teijin's Pure-Ace; norbornene-based films disclosed in JP-A-2003-292639 and JP-A-2003-321535; and cellulose acylate films. Of those, especially preferred is cellulose acylate in view of its workability into polarizers.

[Cellulose Acylate]

Cellulose acylate usable for the second retardation cellulose acylate film in the invention is described.

The substitution degree in cellulose acylate means the ratio of acylation of the three hydroxyl groups existing in the constitutive unit (glucose bonding to (β) 1,4-glycoside) of cellulose. The substitution degree (acylation degree) may be calculated by measuring the amount of the bonding fatty acid per the constitutive unit mass of cellulose. The measurement may be attained according to the method of "ASTM D817-91".

Preferably, the cellulose acylate to be used for the second retardation film in the invention has a degree of acylation of from 2.00 to 2.90, more preferably from 2.2 to 2.8. The ratio of the degree of 6-acylation to the degree of whole acylation is preferably at least 0.25, more preferably at least 0.3. Preferably, the cellulose acylate for the second retardation film in the invention contains two or more different types of acyl groups.

Another preferred cellulose acylate for the second retardation film in the invention is a mixed fatty acid ester having a degree of acylation of from 2 to 2.9 and having an acetyl group and a $C_{3-4}$ acyl group. More preferably, the degree of acylation of the mixed fatty acid ester is from 2.20 to 2.85, most preferably from 2.4 to 2.8. Preferably, the substitution degree for acetyl group of the ester is less than 2.5, more preferably less than 1.9.

Still another preferred cellulose acylate for the second retardation film in the invention is a mixed acid ester having a fatty acid-derived acyl group and a substituted or unsubstituted aromatic acyl group. The substituted or unsubstituted acyl group is preferably a group represented by the following formula (A):

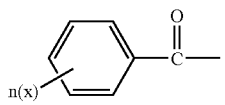

Formula (A)

The formula (A) is described. In formula (A), X represents a substituent. Examples of the substituent include a halogen atom, a cyano group, an alkyl group, an alkoxy group, an aryl group, an aryloxy group, an acyl group, a carbonamido group, a sulfonamido group, an ureido group, an aralkyl group, a nitro group, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulfonyl group, an aryloxysulfonyl group, an alkylsulfonyloxy group, an aryloxysulfonyl group, —S—R, —NH—CO—OR, —PH—R, —P(—R)$_2$, —PH—O—R, —P(—R) (—O—R), —P(—O—R)$_2$, —PH(=O)—R—P (=O) (—R)$_2$, —PH(=O)—O—R, —P(=O)(—R)(—O—R), —P(=O) (—O—R)$_2$, —O—PH(=O)—R, —O—P (=O) (—R)$_2$—O—P—H(=O)—O—R, —O—P(=O) (—R)(—O—R), —O—P(=O)(—O—R)$_2$, —NH—PH (=O)—R, —NH—P(=O)(—R)(—O—R), —NH—P (=O) (—O—R)$_2$, —SiH$_2$—R, —SiH(—R)$_2$, —Si (—R)$_3$, —O—SiH$_2$—R, —O—SiH(—R)$_2$ and —O—Si (—R)$_3$. In these, R represents an aliphatic group, an aromatic group or a heterocyclic group.

In formula (A), n means the number of the substituents, indicating an integer of from 0 to 5. Preferably, the number of the substituents (n) is from 1 to 5, more preferably from 1 to 4, even more preferably from 1 to 3, most preferably 1 or 2. The substituents are preferably a halogen atom, a cyano group, an alkyl group, an alkoxy group, an aryl group, an aryloxy group, an acyl group, a carbonamido group, a sulfonamido group and an ureido group, more preferably a halogen atom, a cyano group, an alkyl group, an alkoxy group, an aryloxy group, an acyl group and a carbonamido group, even more preferably a halogen atom, a cyano group, an alkyl group, an alkoxy group and an aryloxy group, most preferably a halogen atom, an alkyl group and an alkoxy group.

The halogen atom includes a fluorine atom, a chlorine atom, a bromine atom and an iodine atom. The alkyl group may have a cyclic structure or may be branched. Preferably, the number of the carbon atoms constituting the alkyl group is from 1 to 20, more preferably from 1 to 12, even more preferably from 1 to 6, most preferably from 1 to 4. Examples of the alkyl group include a methyl group, an ethyl group, a propyl group, an isopropyl group, a butyl group, a tert-butyl group, a hexyl group, a cyclohexyl group, an octyl group and a 2-ethylhexyl group. The alkoxy group may have a cyclic structure or may be branched. The number of the carbon atoms constituting the alkoxy group is preferably from 1 to 20, more preferably from 1 to 12, even more preferably from 1 to 6, most preferably from 1 to 4. The alkoxy group may be substituted with another alkoxy group. Examples of the alkoxy group include a methoxy group, an ethoxy group, a 2-methoxyethoxy group, a 2-methoxy-2-ethoxyethoxy group, a butyloxy group, a hexyloxy group and an octyloxy group.

The number of the carbon atoms constituting the aryl group is preferably from 6 to 20, more preferably from 6 to 12. Examples of the aryl group include a phenyl group and a naphthyl group. The number of the carbon atoms constituting the aryloxy group is preferably from 6 to 20, more preferably from 6 to 12. Examples of the aryl group include a phenoxy group and a naphthoxy group. The number of the carbon atoms constituting the acyl group is preferably from 1 to 20, more preferably from 1 to 12. Examples of the acyl group include a formyl group, an acetyl group and a benzoyl group. The number of the carbon atoms constituting the carbonamido group is preferably from 1 to 20, more preferably from 1 to 12. Examples of the carbonamido group include an acetamido group and a benzamido group. The number of the carbon atoms constituting the sulfonamido group is preferably from 1 to 20, more preferably from 1 to 12. Examples of the sulfonamido group include a methanesulfonamido group, a benzenesulfonamido group and a p-toluenesulfonamido group. The number of the carbon atoms constituting the ureido group is preferably from 1 to 20, more preferably from 1 to 12. Examples of the ureido group include an (unsubstituted) ureido group.

The number of the carbon atoms constituting the aralkyl group is preferably from 7 to 20, more preferably from 7 to 12. Examples of the aralkyl group include a benzyl group, a phenethyl group and a naphthylmethyl group. The number of the carbon atoms constituting the alkoxycarbonyl group is preferably from 2 to 20, more preferably from 2 to 12. Examples of the alkoxycarbonyl group include a methoxycarbonyl group. The number of the carbon atoms constituting the aryloxycarbonyl group is preferably from 7 to 20, more preferably from 7 to 12. Examples of the aryloxycarbonyl group include a phenoxycarbonyl group. The number of the carbon atoms constituting the aralkyloxycarbonyl group is preferably from 8 to 20, more preferably from 8 to 12. Examples of the aralkyloxycarbonyl group include a benzyloxycarbonyl group. The number of the carbon atoms constituting the carbamoyl group is preferably from 1 to 20, more preferably from 1 to 12. Examples of the carbamoyl group include an (unsubstituted) carbamoyl group and an N-methylcarbamoyl group. The number of the carbon atoms constituting the sulfamoyl group is preferably at most 20, more preferably at most 12. Examples of the sulfamoyl group include an (unsubstituted) sulfamoyl group and an N-methylsulfamoyl group. The number of the carbon atoms constituting the acyloxy group is preferably from 1 to 20, more preferably from 2 to 12. Examples of the acyloxy group include an acetoxy group and a benzoyloxy group.

The number of the carbon atoms constituting the alkenyl group is preferably from 2 to 20, more preferably from 2 to 12. Examples of the alkenyl group include a vinyl group, an allyl group and an isopropenyl group. The number of the carbon atoms constituting the alkynyl group is preferably from 2 to 20, more preferably from 2 to 12. Examples of the alkynyl group include an ethynyl group. The number of the carbon atoms constituting the alkylsulfonyl group is preferably from 1 to 20, more preferably from 1 to 12. The number of the carbon atoms constituting the arylsulfonyl group is preferably from 6 to 20, more preferably from 6 to 12. The number of the carbon atoms constituting the alkyloxysulfonyl group is preferably from 1 to 20, more preferably from 1 to 12. The number of the carbon atoms constituting the aryloxysulfonyl group is preferably from 6 to 20, more preferably from 6 to 12. The number of the carbon atoms constituting the alkylsulfonyloxy group is preferably from 1 to 20, more preferably from 1 to 12. The number of the carbon atoms constituting the aryloxysulfonyl group is preferably from 6 to 20, more preferably from 6 to 12.

The fatty acid ester residue in the mixed acid ester of cellulose, which is one example of cellulose acylate for the second retardation film in the invention, is described. In the fatty acid ester residue of the mixed acid ester of cellulose, the aliphatic acyl group preferably has from 2 to 20 carbon atoms. Concretely, it includes an acetyl group, a propionyl group, a butyryl group, an isobutyryl group, a valeryl group, a pivaloyl group, a hexanoyl group, an octanoyl group, a lauroyl group, a stearoyl group. Preferred are an acetyl group, a propionyl group and a butyryl group; and more preferred is an acetyl group. The aliphatic acyl group in the invention is meant to include substituted groups. The substituents for them are, for example, those mentioned hereinabove for X in formula (A).

In formula (A), the number (n) of the substituents X in the aromatic ring is 0 or from 1 to 5, preferably from 1 to 3, more preferably 1 or 2.

In case where the number of the substituents in the aromatic ring is 2 or more, then the substituents may be the same or different, or may bond to each other to form a condensed polycyclic compound (e.g., naphthalene group, indene group, indane group, phenanthrene group, quinoline group, isoquinoline group, chromene group, chroman group, phthalazine group, acridine group, indole group, indoline group). Examples of the aromatic acyl group of formula (A) are mentioned below. Preferred are Nos. 1, 3, 5, 6, 8, 13, 18 and 28; and more preferred are Nos. 1, 3, 6 and 13.

Substitution of the hydroxyl group in cellulose into an aromatic acyl group may be generally effected according to a method of using an aromatic carboxylic acid, or a symmetric acid anhydride or a mixed acid anhydride derived from an aromatic carboxylic acid. More preferred is a method of using an acid anhydride derived from an aromatic carboxylic acid (described in *Journal of Applied Polymer Science*, Vol. 29, 3981-3990 (1984)). The method for producing a mixed acid ester of cellulose, cellulose acylate for use in the invention includes (i) a method of once preparing a fatty acid monoester or diester of cellulose and then introducing an aromatic acyl group of formula (A) into the residual hydroxyl group; and (ii) a method of directly reacting cellulose with a mixed acid anhydride of an aliphatic carboxylic acid and an aromatic carboxylic acid. In (i), the step itself of producing a fatty acid ester or diester of cellulose is per-se known, but the latter step of introducing an aromatic acyl group into it may vary depending on the type of the aromatic acyl group. In this method, the reaction temperature is preferably from 0 to 100° C., more preferably from 20 to 50° C.; and the reaction time is preferably at least 30 minutes, more preferably from 30 to 300 min. Also in the method (ii) of using a mixed acid anhydride, the reaction condition varies depending on the type of the mixed acid anhydride used. In this method, the reaction temperature is preferably from 0 to 100° C., more preferably from 20 to 50° C.; and the reaction time is preferably from 30 to 300 minutes, more preferably from 60 to 200 minutes. In these methods, the reaction may be effected in the absence or presence of a solvent, but is preferably in the presence of a solvent. The solvent includes, for example, dichloromethane, chloroform, dioxane.

In the fatty acid monoester of cellulose, the degree of substitution with the aromatic acyl group is preferably at most 2.0, more preferably from 0.1 to 2.0 relative to the remaining hydroxyl group in the ester. In the fatty acid diester of cellulose (cellulose diacetate), the substitution degree for the aromatic acyl group is preferably at most 1.0, more preferably from 0.1 to 1.0 relative to the remaining hydroxyl group in the diester. Examples (Nos. 1 to 43) of the aromatic acyl group of formula (A) are mentioned below, to which, however, the invention should not be limited. The aromatic acyl group of formula (A) is preferably Nos. 1, 3, 5, 6, 8, 13, 18 and 28, more preferably Nos. 1, 3, 6 and 13.

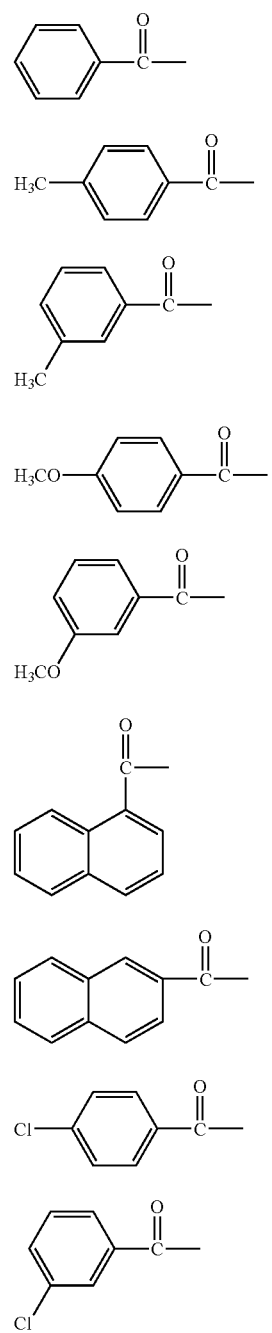

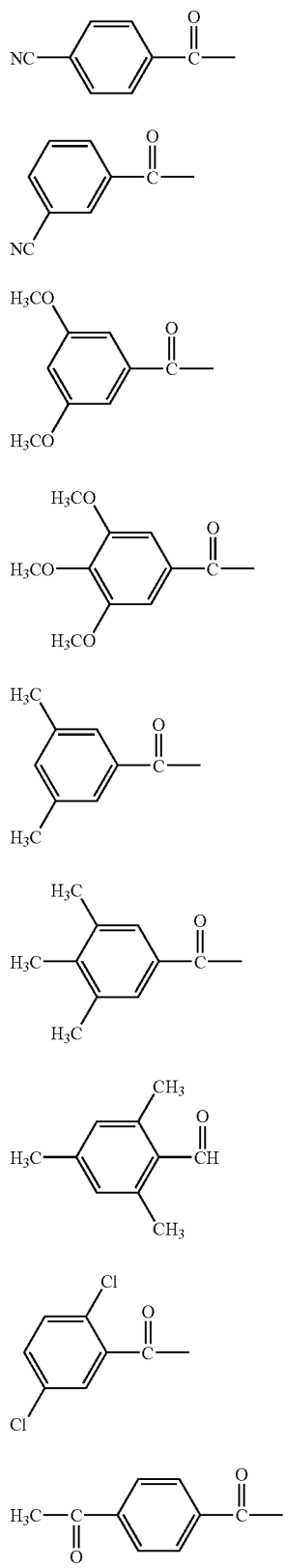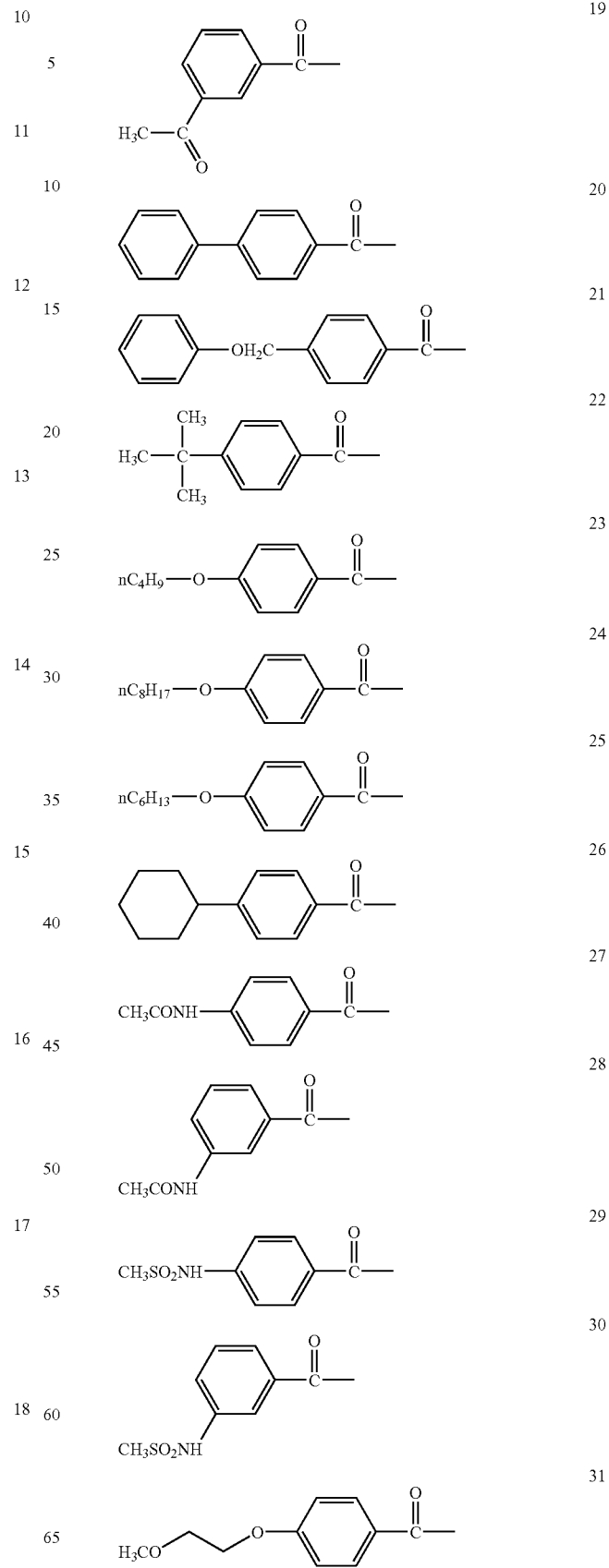

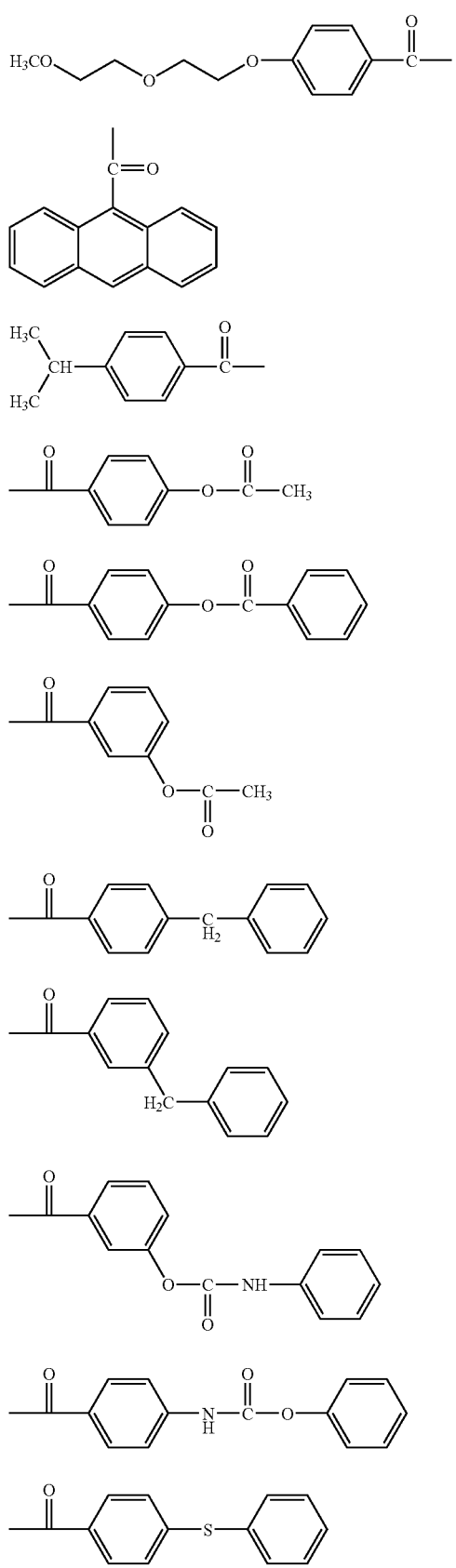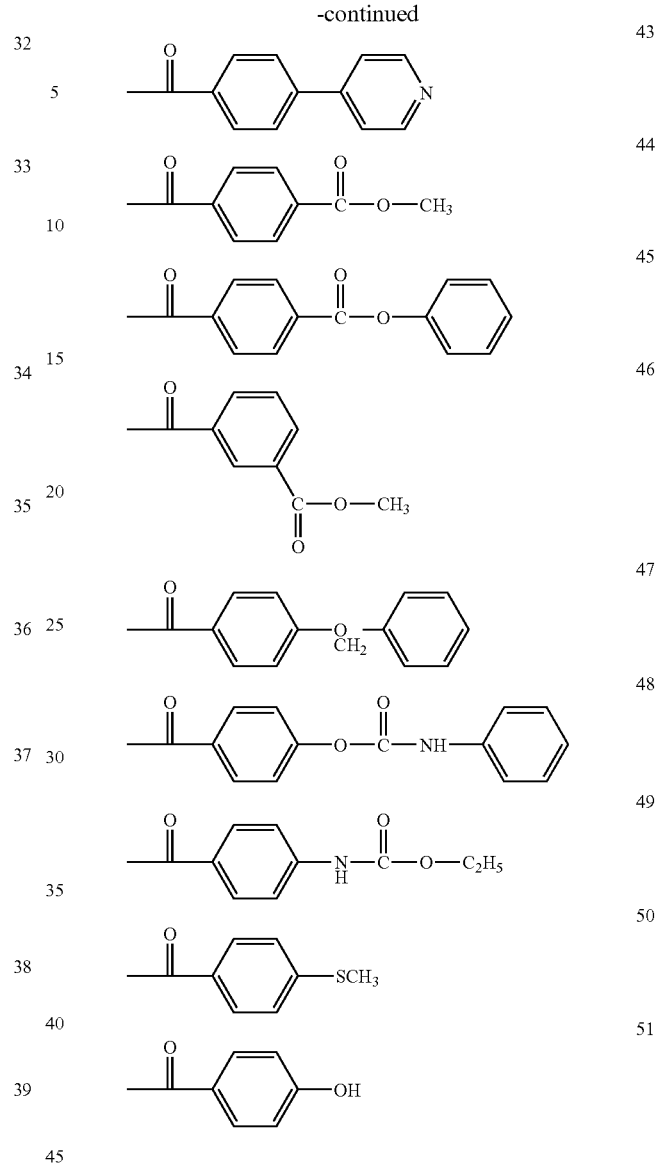

Preferably, the cellulose acylate for the second retardation film in the invention has a mass-average degree of polymerization of from 350 to 800, more preferably from 370 to 600. Preferably, the cellulose acylate for the second retardation film in the invention has a number-average molecular weight of from 70000 to 230000, more preferably from 75000 to 230000, most preferably from 78000 to 120000.

[Retarder]

Preferably, the second retardation cellulose acylate film in the invention contains a retarder. Preferably, the absorption maximum on the longest wavelength side (λ max(2)) of the retarder in the second retardation film in the invention exists on the side of a shorter wavelength than the absorption maximum on the longest wavelength side (λmax(1)) of the retarder in the first retardation film in the invention.

More preferably, λmax(1)−λmax(2)>10; most preferably, λmax(1)−λmax(2)>20.

When the retarders satisfy the above-mentioned relation, then the effect of the first retardation film to reduce the viewing angle-dependent color tone change and the effect of the second retardation film to reduce the viewing angle-dependent color tone change are synergistically augmented, therefore more effectively resulting in the reduction in viewing angle-dependent color change in liquid crystal display devices.

Preferred examples of the retarder that may be used in the second retardation film in the invention are, in addition to those mentioned hereinabove for the retarder to be in the first retardation film, rod-shaped aromatic compounds described in JP-A-2004-50516, pp. 11-14.

It is preferred that the cellulose acylate film used in the invention contains an Re generating agent, and it is particularly preferred that the polarizing plate protective film (the polarizing plate protective film A) satisfying the inequality (1) to (5) contains an Re generating agent. The Re generating agent is a compound for generating an in-plane birefringence.

The retarder used in the invention is preferably a compound represented by the following formula (I), most preferably a compound represented by the following formula (II).

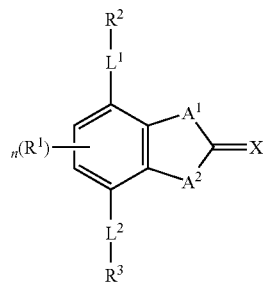

Formula (I)

In the formula (I), $L^1$ and $L^2$ independently represent a single bond or a divalent linking group. $A^1$ and $A^2$ independently represent one selected from the group consisting of —O—, —NR— (in which R represents a hydrogen atom or a substituent), —S—, and —CO—. $R^1$, $R^2$, and $R^3$ independently represent a substituent. X represents a nonmetal atom of Groups 14 to 16, and a hydrogen atom or a substituent may be connected to X. n represents an integer of 0 to 2.

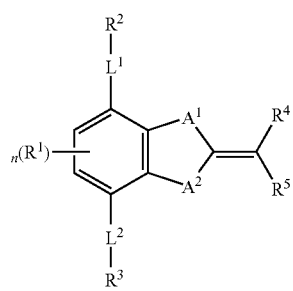

Formula (II)

In the formula (II), $L^1$ and $L^2$ independently represent a single bond or a divalent linking group. $A^1$ and $A^2$ independently represent one selected from the group consisting of —O—, —NR— (in which R represents a hydrogen atom or a substituent), —S—, and CO—. $R^1$, $R^2$, $R^3$, $R^4$, and $R^5$ independently represent a substituent. n represents an integer of 0 to 2.

In the formulae (I) and (II), preferred examples of the divalent linking groups of $L^1$ and $L^2$ include the following groups:

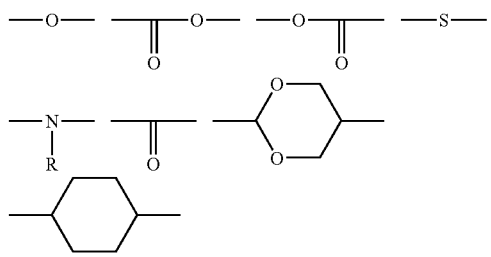

More preferred divalent linking groups are —O—, —COO—, and —OCO—.

In the formulae (I) and (II), $R^1$ is a substituent. When the compound has a plurality of $R^1$'s, they may be the same or different substituents, and may form a ring.

Examples of the substituents include halogen atoms such as a fluorine atom, chlorine atom, bromine atom, and iodine atom; alkyl groups, the carbon number thereof being preferably 1 to 30, such as a methyl group, ethyl group, n-propyl group, isopropyl group, t-butyl group, n-octyl group, and 2-ethylhexyl group; cycloalkyl groups, preferably substituted or unsubstituted cycloalkyl groups having a carbon number of 3 to 30, such as a cyclohexyl group, cyclopentyl group, 4-n-dodecylcyclohexyl group; bicycloalkyl groups, preferably substituted or unsubstituted bicycloalkyl groups having a carbon number of 5 to 30, i.e. monovalent groups provided by removing one hydrogen atom from bicycloalkanes having a carbon number of 5 to 30, such as a bicyclo[1,2,2]heptane-2-yl group and bicyclo[2,2,2]octane-3-yl group; alkenyl groups, preferably substituted or unsubstituted alkenyl groups having a carbon number of 2 to 30, such as a vinyl group and allyl group; cycloalkenyl groups, preferably substituted or unsubstituted cycloalkenyl groups having a carbon number of 3 to 30, i.e. monovalent groups provided by removing one hydrogen atom from cycloalkenes having a carbon number of 3 to 30, such as a 2-cyclopentene-1-yl group and 2-cyclohexene-1-yl; substituted or unsubstituted bicycloalkenyl groups, preferably substituted or unsubstituted bicycloalkenyl groups having a carbon number of 5 to 30, i.e. monovalent groups provided by removing one hydrogen atom from bicycloalkenes having one double bond, such as a bicyclo[2,2,1]hepto-2-ene-1-yl group and bicyclo[2,2,2] octo-2-ene-4-yl; alkynyl groups, preferably substituted or unsubstituted alkynyl groups having a carbon number of 2 to 30, such as an ethynyl group and propargyl group; aryl groups, preferably substituted or unsubstituted aryl groups having a carbon number of 6 to 30, such as a phenyl group, p-tolyl group, and naphtyl group; heterocyclic groups, preferably monovalent groups provided by removing one hydrogen atom from 5 or 6-membered, substituted or unsubstituted, aromatic or nonaromatic heterocycle compounds, more preferably 5 or 6-membered, aromatic heterocyclic groups having a carbon number of 3 to 30, such as a 2-furyl group, 2-thienyl group, 2-pyrimidinyl group, and 2-benzothiazolyl group; a cyano group; a hydroxyl group; a nitro group; a carboxyl group; alkoxy groups, preferably substituted or unsubstituted alkoxy groups having a carbon number of 1 to 30, such as a methoxy group, ethoxy group, isopropoxy group, t-butoxy group, n-octyloxy group, and 2-methoxyethoxy group; aryloxy groups, preferably substituted or unsubstituted aryloxy groups having a carbon number of 6 to 30, such as a phenoxy group, 2-methylphenoxy group, 4-tert-butylphenoxy group, 3-nitrophenoxy group, and 2-tetradecanoylaminophenoxy group; silyloxy groups, the carbon number thereof being preferably 3 to 20, such as a trimethylsilyloxy group and tert-butyldimethylsilyloxy group; heterocyclyloxy groups, preferably substituted or unsubstituted heterocyclyloxy groups having a carbon number of 2 to 30, such as a 1-phenyltetrazole-5-oxy group and 2-tetrahydropyranyloxy group; acyloxy groups, preferably a formyloxy group, substituted or unsubstituted alkylcarbonyloxy groups having a carbon number of 2 to 30, and substituted or unsubstituted arylcarbonyloxy groups having a carbon number of 6 to 30, such as a formyloxy group, acetyloxy group, pivaloyloxy group, stearoyloxy group, benzoyloxy group, and p-methoxyphenylcarbonyloxy group; carbamoyloxy groups, preferably substituted or unsubstituted carbamoyloxy groups having a carbon number of 1 to 30, such as an N,N-dimethylcarbamoyloxy group, N,N-diethylcarbamoyloxy group, morpholinocarbonyloxy group, N,N-di-n-octylaminocarbonyloxy group, and N-n-octylcarbamoyloxy group; alkoxycarbonyloxy groups, preferably substituted or unsubstituted alkoxycarbonyloxy groups having a carbon number of 2 to 30, such as a methoxycarbonyloxy group, ethoxycarbonyloxy group, tert-butoxycarbonyloxy group, and n-octylcarbonyloxy group; aryloxycarbonyloxy groups, preferably substituted or unsubstituted aryloxycarbonyloxy groups having a carbon number of 7 to 30, such as a phenoxycarbonyloxy group, p-methoxyphenoxycarbonyloxy group, and p-n-hexadecyloxyphenoxycarbonyloxy group; amino groups, preferably an amino group, substituted or unsubstituted alkylamino groups having a carbon number of 1 to 30, and substituted or unsubstituted anilino groups having a carbon number of 6 to 30, such as an amino group, methylamino group, dimethylamino group, anilino group, N-methylanilino group, and diphenylamino group; acylamino groups, preferably a formylamino group, substituted or unsubstituted alkylcarbonylamino groups having a carbon number of 1 to 30, and substituted or unsubstituted arylcarbonylamino groups having a carbon number of 6 to 30, such as a formylamino group, acetylamino group, pivaloylamino group, lauroylamino group, and benzoylamino group; aminocarbonylamino groups, preferably substituted or unsubstituted aminocarbonylamino groups having a carbon number of 1 to 30, such as a carbamoylamino group, N,N-dimethylaminocarbonylamino group, N,N-diethylaminocarbonylamino group, and morpholinocarbonylamino group; alkoxycarbonylamino groups, preferably substituted or unsubstituted alkoxycarbonylamino groups having a carbon number of 2 to 30, such as a methoxycarbonylamino group, ethoxycarbonylamino group, tert-butoxycarbonylamino group, n-octadecyloxycarbonylamino group, and N-methyl-methoxycarbonylamino group; aryloxycarbonylamino groups, preferably substituted or unsubstituted aryloxycarbonylamino groups having a carbon number of 7 to 30, such as a phenoxycarbonylamino group, p-chlorophenoxycarbonylamino group, and m-n-octyloxyphenoxycarbonylamino group; sulfamoylamino groups, preferably substituted or unsubstituted sulfamoylamino groups having a carbon number of 0 to 30, such as a sulfamoylamino group, N,N-dimethylaminosulfonylamino group, and N-n-octylaminosulfonylamino group; alkyl- or aryl-sulfonylamino groups, preferably substituted or unsubstituted alkylsulfonylamino groups having a carbon number of 1 to 30 and substituted or unsubstituted arylsulfonylamino groups having a carbon number of 6 to 30, such as a methylsulfonylamino group, butylsulfonylamino group, phenylsulfonylamino group, 2,3,5-trichlorophenylsulfonylamino group, and p-methylphenylsulfonylamino group; a mercapto group; alkylthio groups, preferably substituted or unsubstituted alkylthio groups having a carbon number of 1 to 30, such as a methylthio group, ethylthio group, and n-hexadecylthio group; arylthio groups, preferably substituted or unsubstituted arylthio groups having a carbon number of 6 to 30, such as a phenylthio group, p-chlorophenylthio group, and m-methoxyphenylthio group; heterocyclylthio groups, preferably substituted or unsubstituted heterocyclylthio group having a carbon number of 2 to 30, such as a 2-benzothiazolylthio group and 1-phenyltetrazole-5-yl thio group; sulfamoyl groups, preferably substituted or unsubstituted sulfamoyl groups having a carbon number of 0 to 30, such as an N-ethylsulfamoyl group, N-(3-dodecyloxypropyl) sulfamoyl group, N,N-dimethylsulfamoyl group, N-acetylsulfamoyl group, N-benzoylsulfamoyl group, and N—(N1-phenylcarbamoyl)sulfamoyl group; a sulfo group; alkyl- or aryl-sulfinyl groups, preferably substituted or unsubstituted alkylsulfinyl groups having a carbon number of 1 to 30 and substituted or unsubstituted arylsulfinyl groups having a carbon number of 6 to 30, such as a methylsulfinyl group, ethylsulfinyl group, phenylsulfinyl group, and p-methylphenylsulfinyl group; alkyl- or aryl-sulfonyl groups, preferably substituted or unsubstituted alkylsulfonyl groups having a carbon number of 1 to 30 and substituted or unsubstituted arylsulfonyl groups having a carbon number of 6 to 30, such as a methylsulfonyl group, ethylsulfonyl group, phenylsulfonyl group, and p-methylphenylsulfonyl group; acyl groups, preferably a formyl group, substituted or unsubstituted alkylcarbonyl groups having a carbon number of 2 to 30, substituted or unsubstituted arylcarbonyl groups having a carbon number of 7 to 30, such as an acetyl group and pivaloylbenzoyl group; aryloxycarbonyl groups, preferably substituted or unsubstituted aryloxycarbonyl groups having a carbon number of 7 to 30, such as a phenoxycarbonyl group, o-chlorophenoxycarbonyl group, m-nitrophenoxycarbonyl group, and p-tert-butylphenoxycarbonyl group; alkoxycarbonyl groups, preferably substituted or unsubstituted alkoxycarbonyl groups having a carbon number of 2 to 30, such as a methoxycarbonyl group, ethoxycarbonyl group, tert-butoxycarbonyl group, and n-octadecyloxycarbonyl group; carbamoyl groups, preferably substituted or unsubstituted carbamoyl groups having a carbon number of 1 to 30, such as a carbamoyl group, N-methylcarbamoyl group, N,N-dimethylcarbamoyl group, N,N-di-n-octylcarbamoyl group, and N-(methylsulfonyl)carbamoyl group; aryl- and heterocyclyl-azo groups, preferably substituted or unsubstituted arylazo groups having a carbon number of 6 to 30 and substituted or unsubstituted heterocyclylazo groups having a carbon number of 3 to 30, such as a phenylazo group, p-chlorophenylazo group, and 5-ethylthio-1,3,4-thiadiazole-2-yl azo group; imide groups, preferably an N-succinimido group and N-phthalimido group; phosphino groups, preferably substituted or unsubstituted phosphino groups having a carbon number of 2 to 30, such as a dimethylphosphino group, diphenylphosphino group, and methylphenoxyphosphino group; phosphinyl groups, preferably substituted or unsubstituted phosphinyl groups having a carbon number of 2 to 30, such as a phosphinyl group, dioctyloxyphosphinyl group, and diethoxyphosphinyl group; phosphinyloxy groups, preferably substituted or unsubstituted phosphinyloxy groups having a carbon number of 2 to 30, such as a diphenoxyphosphinyloxy group and dioctyloxyphosphinyloxy group; phosphinylamino groups, preferably substituted or unsubstituted phosphinylamino groups having a carbon number of 2 to 30, such as a dimethoxyphosphinylamino group and dimethylaminophosphinylamino group; and silyl groups, preferably substituted or unsubstituted silyl groups having a carbon number of 3 to 30, such as a trimethylsilyl group, tert-butyldimethylsilyl group, and phenyldimethylsilyl group.

In the above substituents having a hydrogen atom, the hydrogen atom may be removed and further replaced by the above substituent. Examples of such functional groups include alkylcarbonylaminosulfonyl groups, arylcarbonylaminosulfonyl groups, alkylsulfonylaminocarbonyl groups, and arylsulfonylaminocarbonyl groups, and specific examples thereof include a methylsulfonylaminocarbonyl group, p-methylphenylsulfonylaminocarbonyl group, acetylaminosulfonyl group, and benzoylaminosulfonyl group.

$R^1$ is preferably a halogen atom, alkyl group, alkenyl group, aryl group, heterocyclic group, hydroxyl group, carboxyl group, alkoxy group, aryloxy group, acyloxy group, cyano group, or amino group, more preferably a halogen atom, alkyl group, cyano group, or alkoxy group.

$R^2$ and $R^3$ independently represent a substituent, and examples thereof include those of $R^1$. Each of $R^2$ and $R^3$ is preferably a substituted or unsubstituted benzene ring, or a substituted or unsubstituted cyclohexane ring, more preferably a benzene ring having a substituent, or a cyclohexane ring having a substituent, further preferably a benzene ring having a substituent at the 4 position, or a cyclohexane ring having a substituent at the 4 position.

$R^4$ and $R^5$ independently represent a substituent, and examples thereof include those of $R^1$. Each of $R^4$ and $R^5$ is preferably an electron-withdrawing substituent having a Hammett's substituent constant $\sigma_p$ of more than 0, and more preferably a substituent having a $\sigma_p$ of 0 to 1.5. Examples of such substituents include a trifluoromethyl group, a cyano group, a carbonyl group, and a nitro group. $R^4$ and $R^5$ may be bonded to form a ring.

The Hammett's substituent constants $\sigma_p$ and $\sigma_m$ are described in detail in Naoki Inamoto, *Hamettosoku, Kozo to Hannosei*, Maruzen, Co., Ltd.; The Chemical Society of Japan, *Shin Jikken Kagaku Koza* 14, *Yuki Kagobutsu no Gosei to Han-no* V, Page 2605, Maruzen, Co., Ltd.; Tadao Nakaya, *Riron Yuki Kagaku Kaisetsu*, Page 217, Tokyo Kagaku Dozin, Co., Ltd.; *Chemical Reviews*, Vol. 91, Page 165-195 (1991); etc.

$A^1$ and $A^2$ independently represent one selected from the group consisting of —O—, —NR— (in which R represents a hydrogen atom or a substituent), —S—, and CO—. Each of $A^1$ and $A^2$ is preferably —O—, —NR— (in which R is a substituent, the examples thereof including those of $R^1$), or —S—.

X represents a nonmetal atom of Groups 14 to 16, and a hydrogen atom or a substituent may be connected to X. X is preferably =O, =S, =NR, or =C(R)R, wherein R represents a substituent, examples thereof including those of $R^1$.

n is an integer of 0 to 2, preferably 0 or 1.

Specific examples of the compounds represented by the formulae (I) and (II) are illustrated below without intention of restricting the scope of the invention. The following compounds are represented as Example Compound (X), in which X is a number in parentheses, unless otherwise provided.

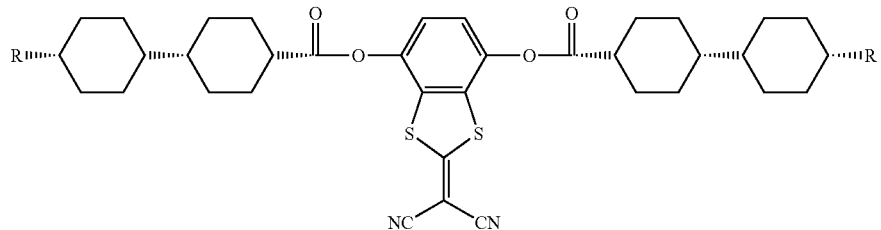

R = —C$_5$H$_{11}$
(1)
—C$_4$H$_9$
(2)
—C$_3$H$_7$
(3)
—C$_2$H$_5$
(4)

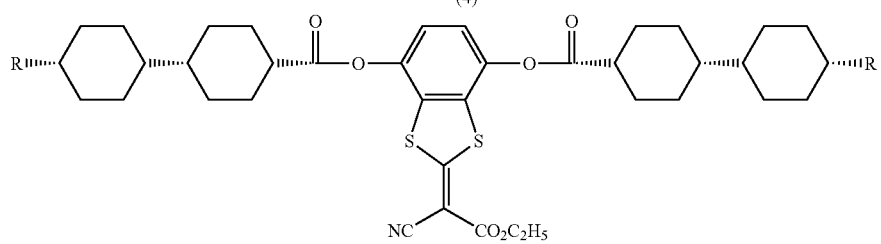

R = —C$_5$H$_{11}$
(5)
—C$_4$H$_9$
(6)
—C$_3$H$_7$
(7)
—C$_2$H$_5$
(8)

-continued
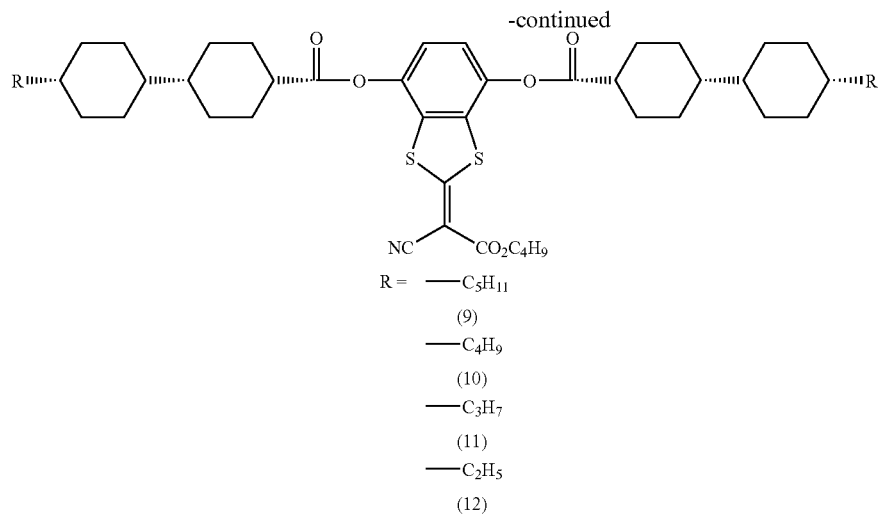
R = —C$_5$H$_{11}$
(9)
—C$_4$H$_9$
(10)
—C$_3$H$_7$
(11)
—C$_2$H$_5$
(12)
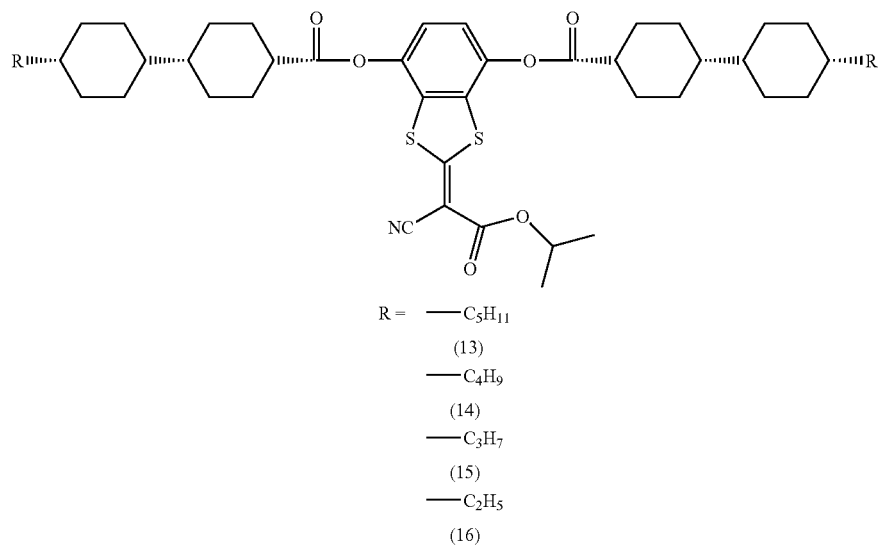
R = —C$_5$H$_{11}$
(13)
—C$_4$H$_9$
(14)
—C$_3$H$_7$
(15)
—C$_2$H$_5$
(16)
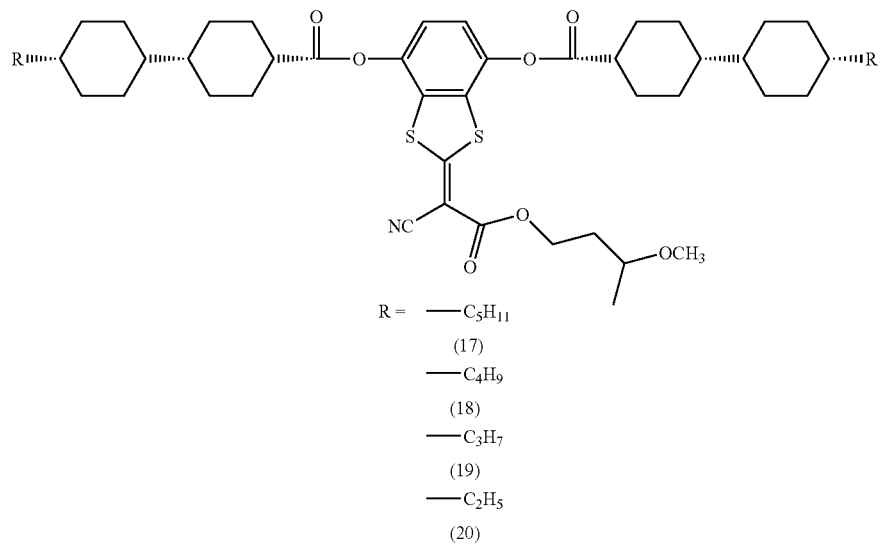
R = —C$_5$H$_{11}$
(17)
—C$_4$H$_9$
(18)
—C$_3$H$_7$
(19)
—C$_2$H$_5$
(20)

-continued
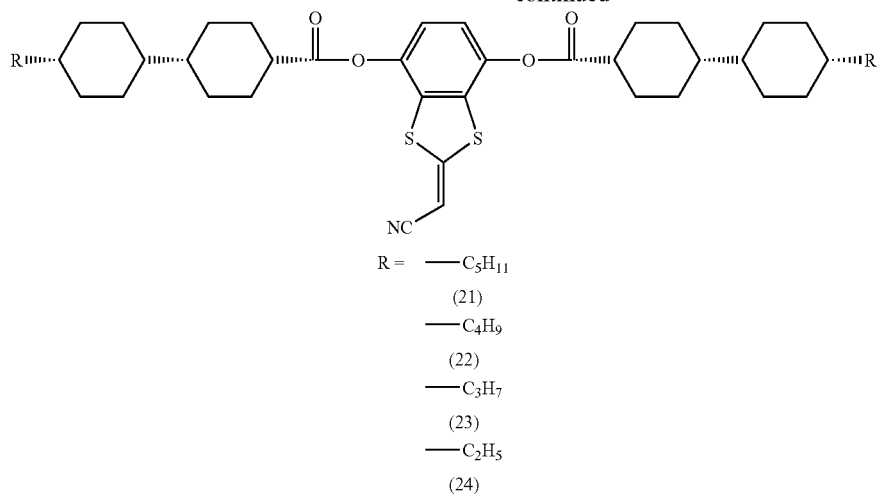
R = —C₅H₁₁
(21)
—C₄H₉
(22)
—C₃H₇
(23)
—C₂H₅
(24)
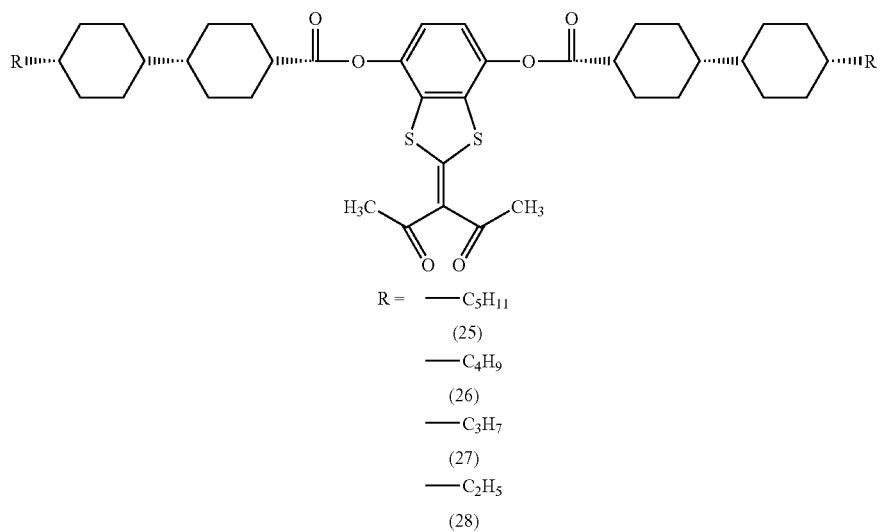
R = —C₅H₁₁
(25)
—C₄H₉
(26)
—C₃H₇
(27)
—C₂H₅
(28)
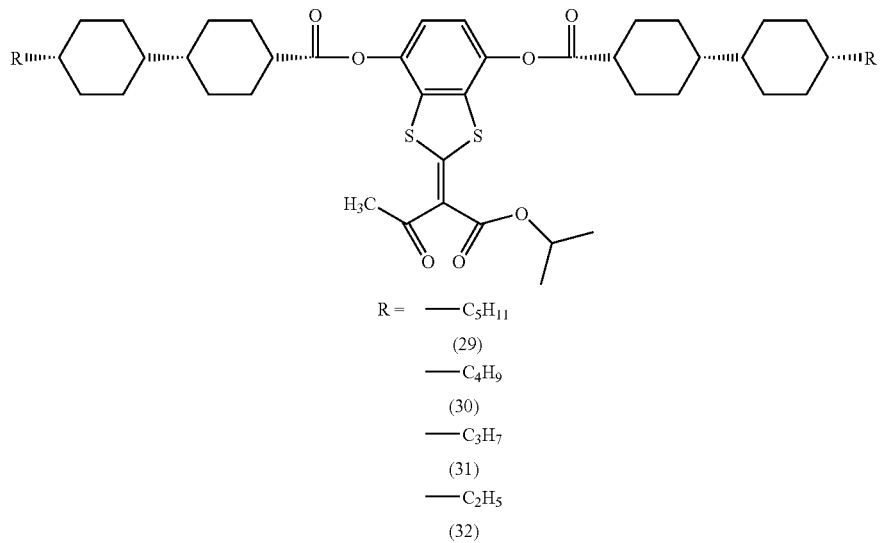
R = —C₅H₁₁
(29)
—C₄H₉
(30)
—C₃H₇
(31)
—C₂H₅
(32)

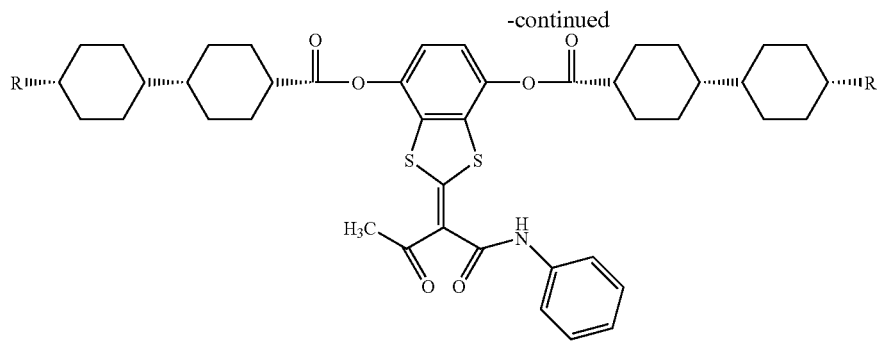
R =  —C₅H₁₁
(33)
—C₄H₉
(34)
—C₃H₇
(35)
—C₂H₅
(36)
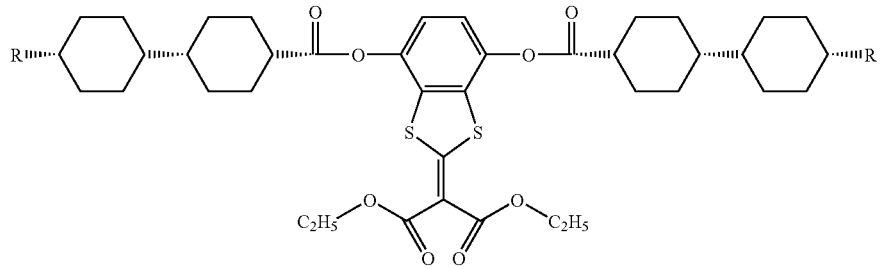
R =  —C₅H₁₁
(37)
—C₄H₉
(38)
—C₃H₇
(39)
—C₂H₅
(40)
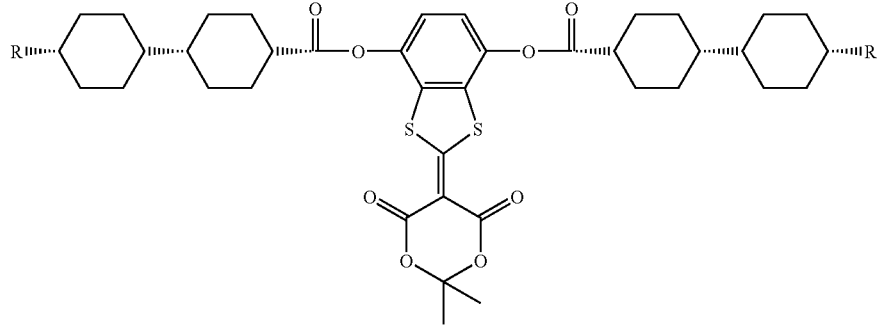
R =  —C₅H₁₁
(41)
—C₄H₉
(42)
—C₃H₇
(43)
—C₂H₅
(44)

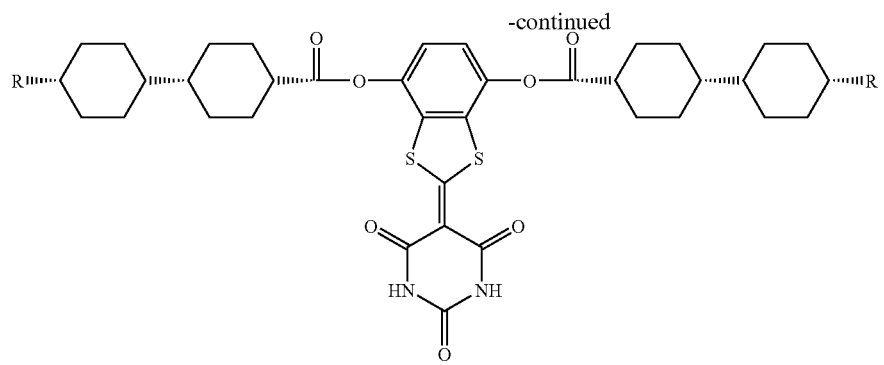
R = —C$_5$H$_{11}$ (45)
—C$_4$H$_9$ (46)
—C$_3$H$_7$ (47)
—C$_2$H$_5$ (48)
(49)
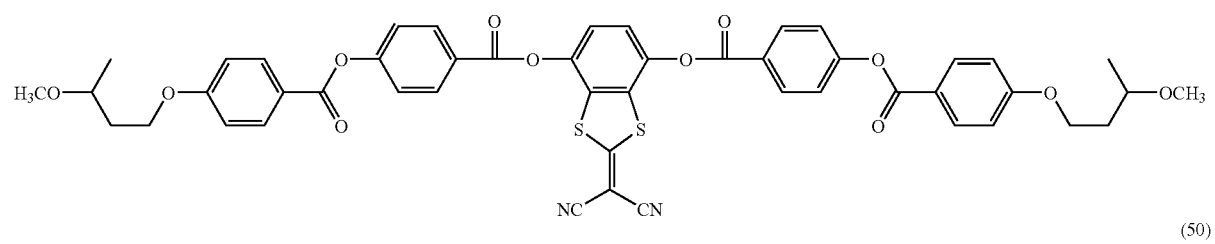
(50)
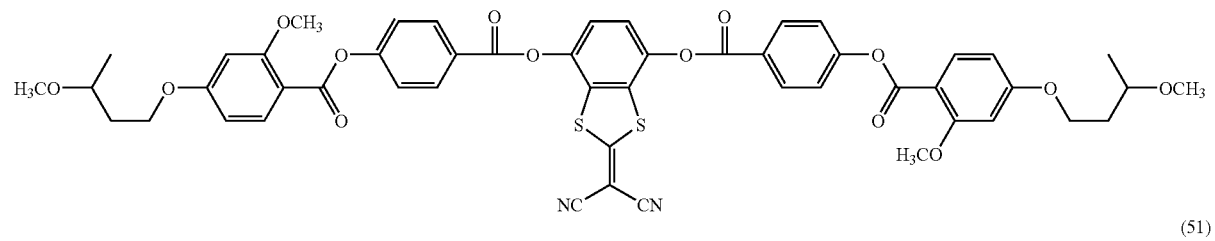
(51)
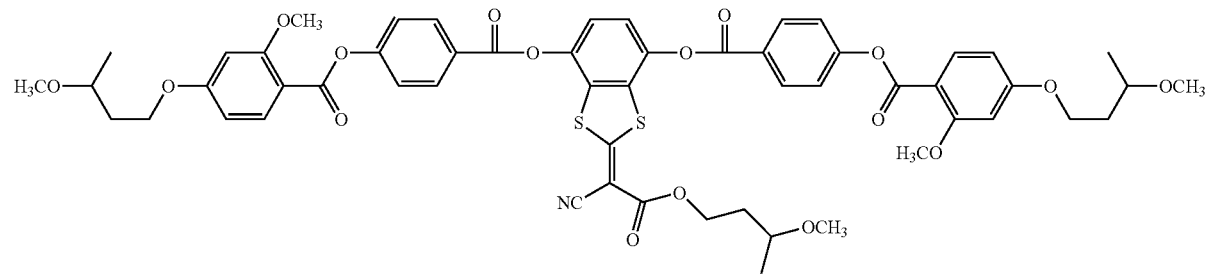
(52)
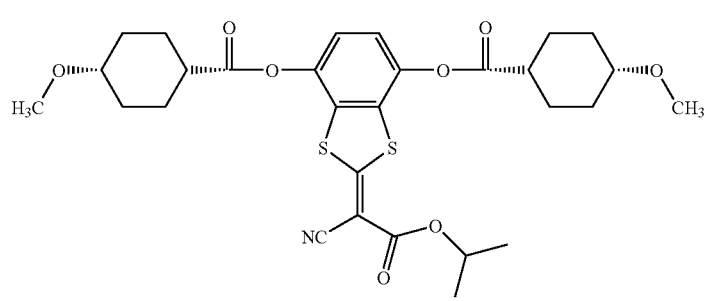

-continued
(53)
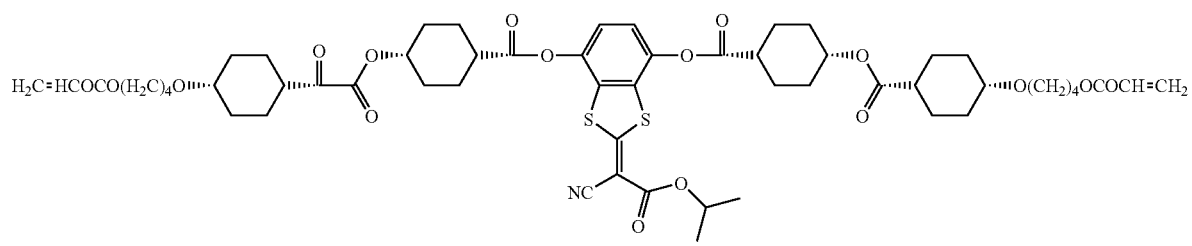
(54)
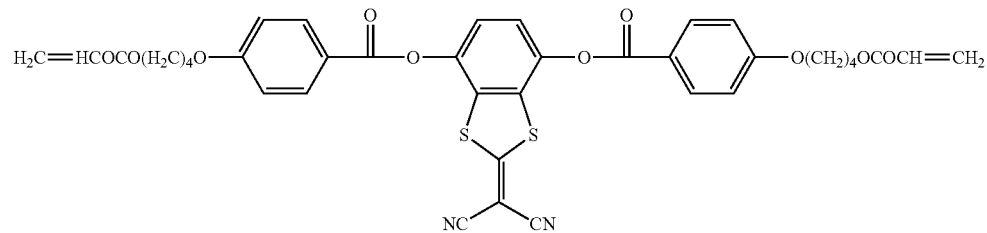
(55)
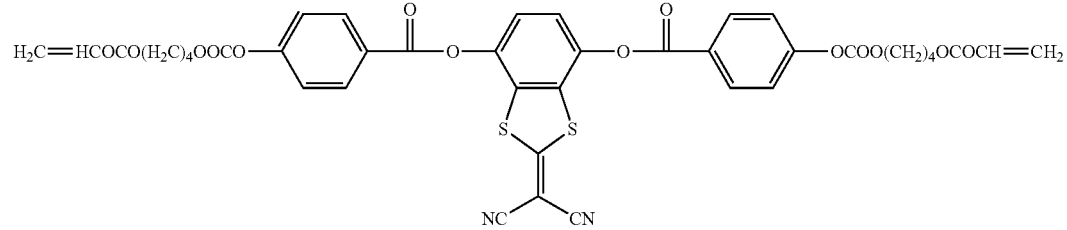
(56)
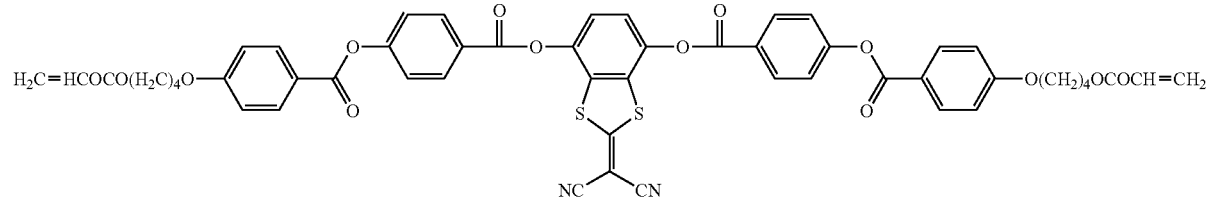
(57)
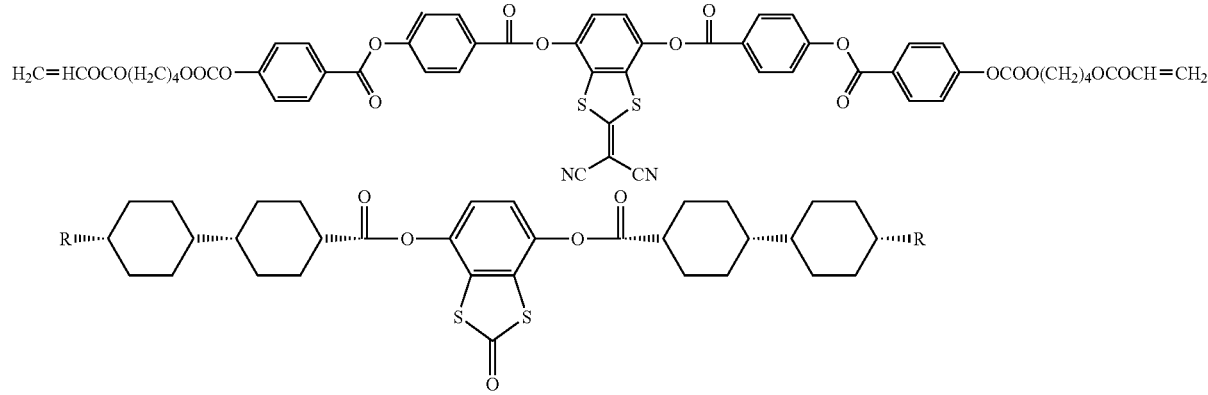
R = —$C_5H_{11}$
(58)
—$C_4H_9$
(59)
—$C_3H_7$
(60)
—$C_2H_5$
(61)

-continued
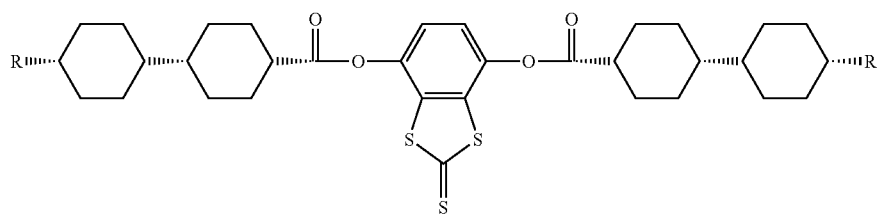
R = —C₅H₁₁ (62)
—C₄H₉ (63)
—C₃H₇ (64)
—C₂H₅ (65)
(66)
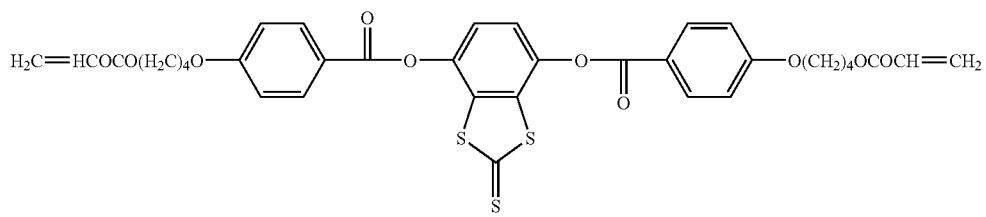
(67)
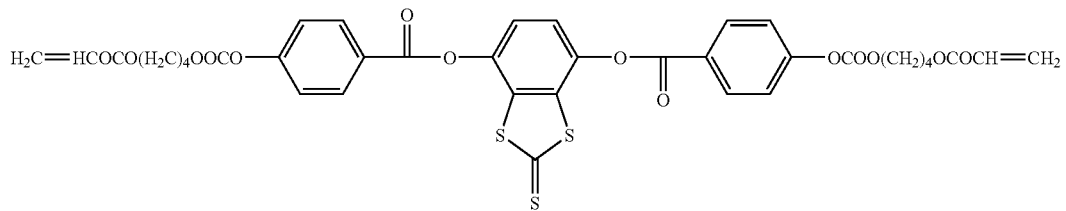
(68)
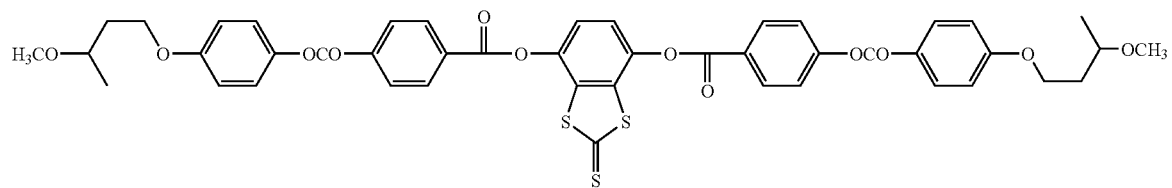
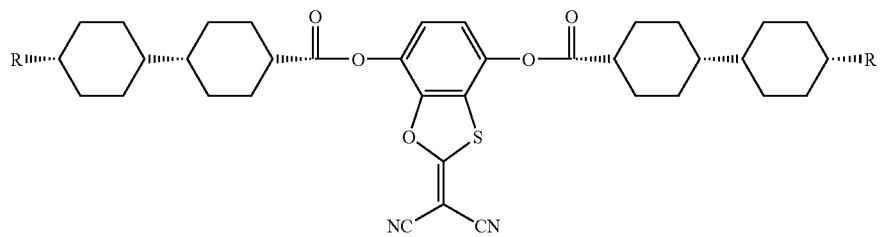
R = —C₅H₁₁ (69)
—C₄H₉ (70)
—C₃H₇ (71)
—C₂H₅ (72)

-continued
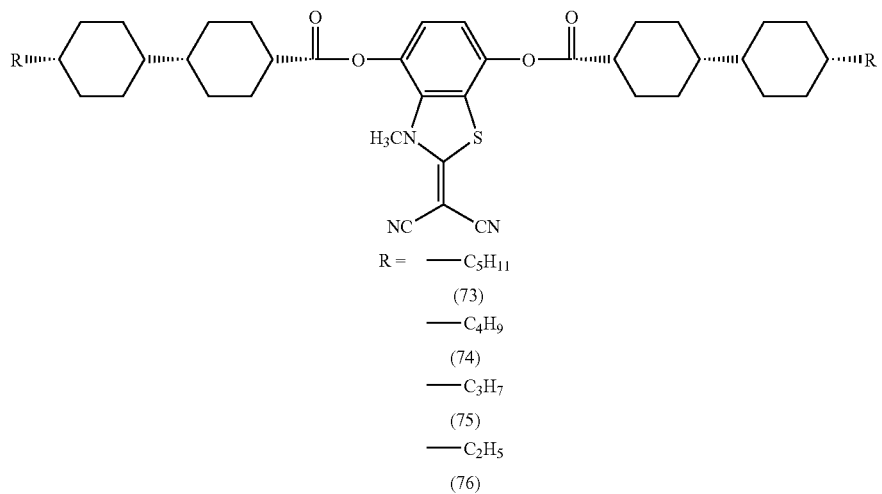
R =
— C₅H₁₁ (73)
— C₄H₉ (74)
— C₃H₇ (75)
— C₂H₅ (76)
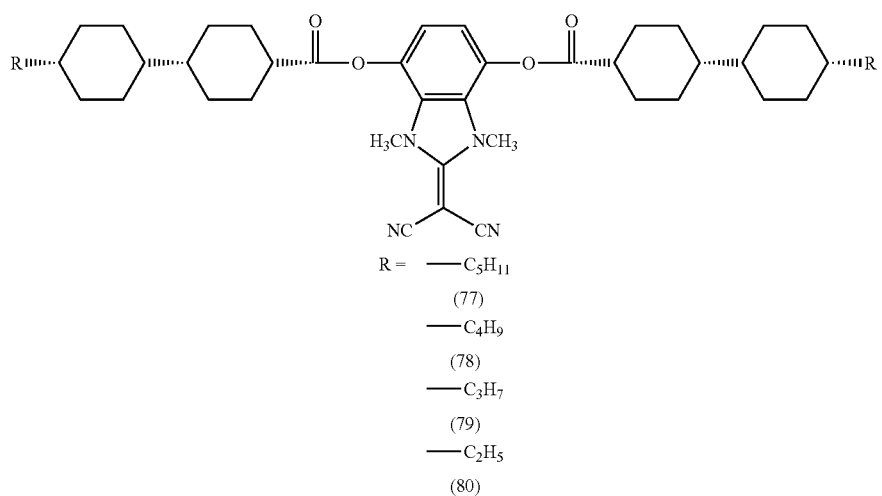
R =
— C₅H₁₁ (77)
— C₄H₉ (78)
— C₃H₇ (79)
— C₂H₅ (80)
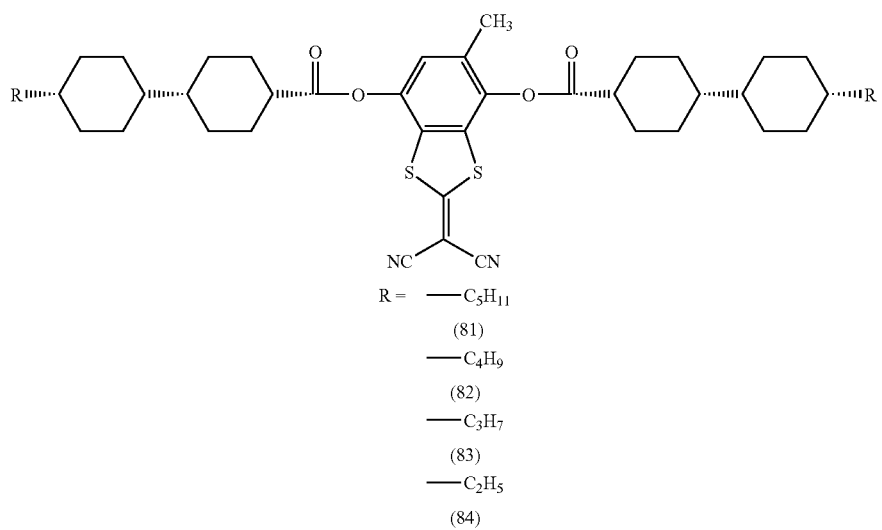
R =
— C₅H₁₁ (81)
— C₄H₉ (82)
— C₃H₇ (83)
— C₂H₅ (84)

-continued
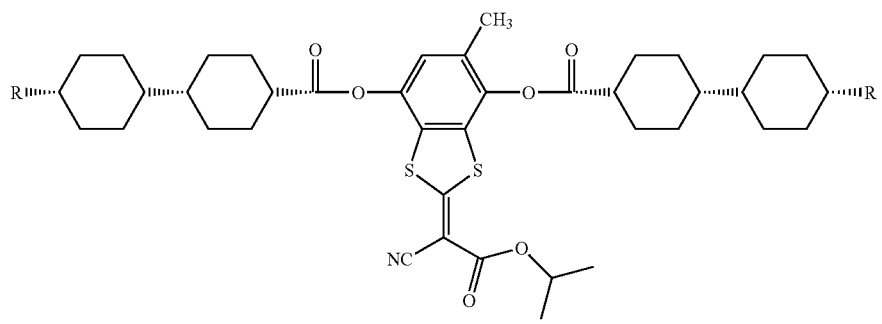
R = —C₅H₁₁
(85)
—C₄H₉
(86)
—C₃H₇
(87)
—C₂H₅
(88)
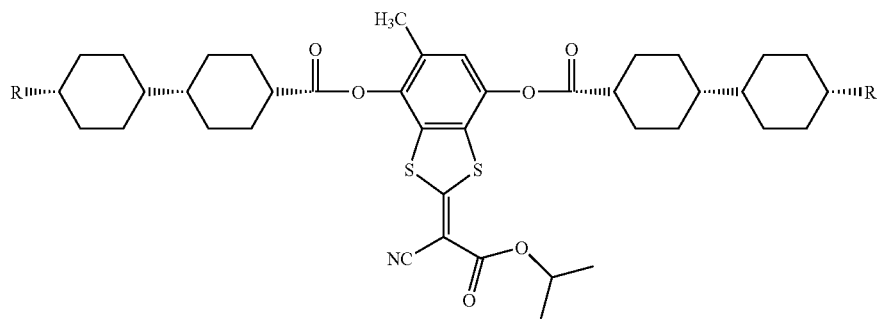
R = —C₅H₁₁
(89)
—C₄H₉
(90)
—C₃H₇
(91)
—C₂H₅
(92)

-continued
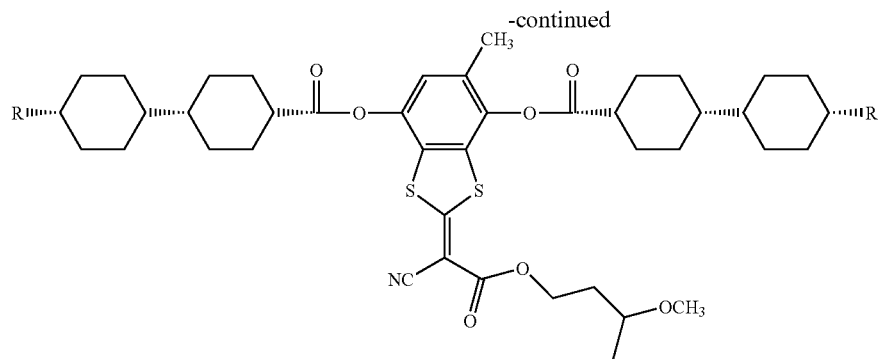
R =  —C₅H₁₁
(93)
—C₄H₉
(94)
—C₃H₇
(95)
—C₂H₅
(96)
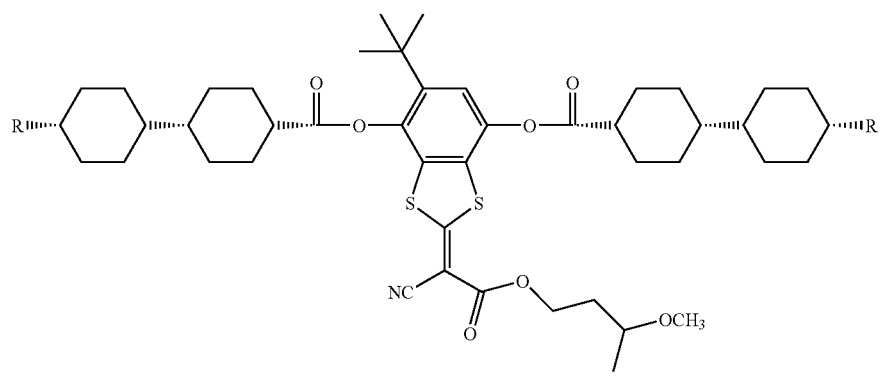
R =  —C₅H₁₁
(97)
—C₄H₉
(98)
—C₃H₇
(99)
—C₂H₅
(100)

-continued
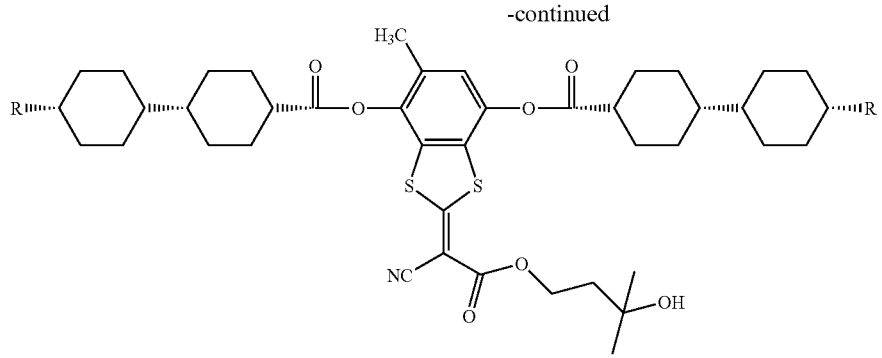
R = —C$_5$H$_{11}$ (101)
—C$_4$H$_9$ (102)
—C$_3$H$_7$ (103)
—C$_2$H$_5$ (104)
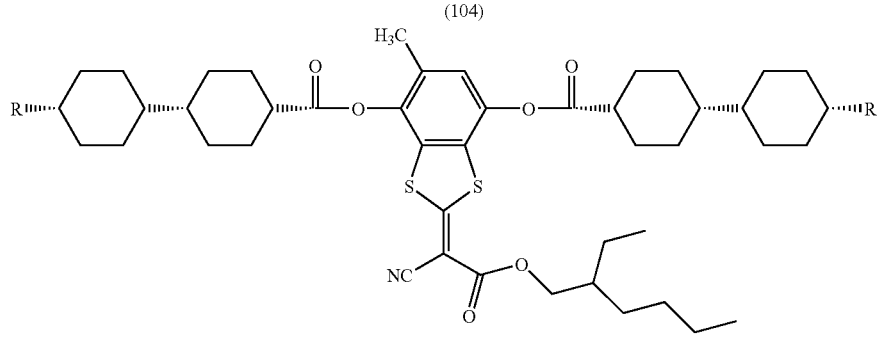
R = —C$_5$H$_{11}$ (105)
—C$_4$H$_9$ (106)
—C$_3$H$_7$ (107)
—C$_2$H$_5$ (108)
The compound represented by the formula (I) or (II) can be synthesized in reference to a known method. For example, Example Compound (1) can be synthesized according to the following scheme.
Example Compound (1)
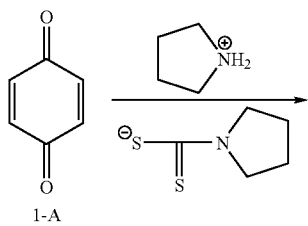
1-A
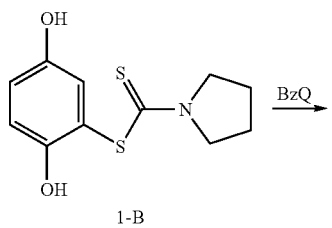
1-B

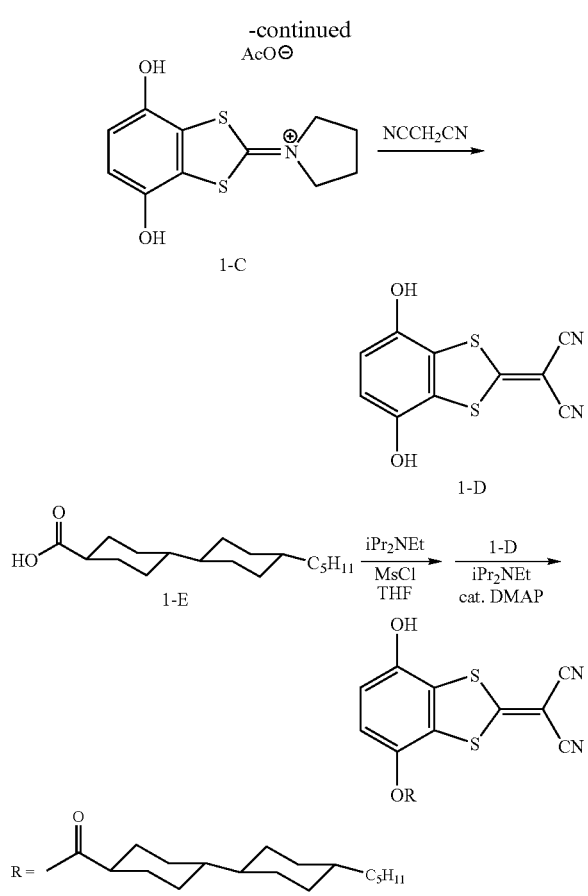

In the above scheme, the compounds (1-A) to (1-D) can be synthesized in reference to *Journal of Chemical Crystallography*, 1997, 27 (9), p. 515-526.

As shown in the scheme, Example Compound (I) can be obtained such that methanesulfonyl chloride is added to a tetrahydrofuran solution of the compound (1-E), N,N-diisopropylethylamine is added thereto dropwise and stirred, N,N-diisopropylethylamine is added to the resultant mixture, a tetrahydrofuran solution of the compound (1-D) is added thereto dropwise, and then a tetrahydrofuran solution of N,N-dimethylaminopyridine (DMAP) is added to the mixture dropwise.

One or more different types of retarders may be in the second retardation films in the invention, either singly or as combined. The amount of the retarder to be in the second retardation film in the invention is preferably from 0.1% to 20% by mass, more preferably from 0.5% to 10% by mass relative to 100% by mass of the cellulose acylate that constitutes the film.

Regarding a method of adding a retarder to the second retardation film in the invention, for example, a retarder may be dissolved in an organic solvent such as alcohol, methylene chloride or dioxolane and the resulting solution may be added to a cellulose acylate solution (dope), or a retarder may be directly added to the dope composition.

[Production of Second Retardation Cellulose Acylate Film]

The second retardation cellulose acylate film in the invention may be produced in the same manner as that for the first retardation cellulose acylate film mentioned hereinabove.

[Stretching Treatment]

The second retardation cellulose acylate film is especially preferably stretched. The stretched cellulose acylate film may have a desired retardation given thereto through the stretching treatment. Preferably, the cellulose acylate film is stretched in the cross direction (lateral stretching). Stretching the cellulose acylate film in the cross direction makes it possible to produce a polarizing plate in which the transmission axis of the polarizer is in parallel to the slow axis of the second retardation film (this is herein after referred to as a second polarizing plate) in a roll-to-roll process. Then, the first polarizing plate and the second polarizing plate may be stuck to a liquid crystal cell in such a manner that the absorption axes of their polarizer could be perpendicular to each other, thereby fabricating a liquid crystal display device in which the viewing angle-dependent color tone change is reduced.

The method of stretching the film in the cross direction is described, for example, in JP-A-62-115035, JP-A-4-152125, JP-A-4-284211, JP-A-4-298310, JP-A-11-48271.

The film may be stretched at room temperature or under heat. The film may be stretched in dry, and this is effective especially when a solvent remains in the film. For stretching the film in the cross direction, for example, the film is conveyed with its width held by a tenter, and the width of the tenter is gradually broadened. After dried, the film may be stretched with a stretcher (preferably monoaxially by the use of a long stretcher).

The film draw ratio (elongation of the stretched film relative to the unstretched film) is preferably from 1% to 200%, more preferably from 5% to 150%.

Further, it is preferred that the second retardation film of cellulose acylate used in the invention is produced by a method containing the step of shrinking the film while holding the film in the width direction.

In the method containing the steps of stretching the film in the width direction and shrinking the film in the transport direction, the film can be shrunk such that the film is held by a pantograph- or linear motor-type tenter, and a distance of clips is gradually reduced in the transport direction while stretching the film in the width direction.

For example, FITZ manufactured by Ichikin, Ltd. can be preferably used as a stretching apparatus for stretching the film in the longitudinal direction or width direction and for shrinking the film in the other direction simultaneously to increase the film thickness. The apparatus is described in JP-A-2001-38802.

A stretch ratio in the stretching step and a shrink ratio in the shrinking step may be appropriately selected depending on desired front retardation Re and thickness direction retardation Rth, and it is preferred that the stretch ratio is 10% or more and the shrink ratio is 5% or more.

It should be noted that, in the invention, the shrink ratio means the length ratio of the film in the shrinking direction before and after the shrinking step.

The shrink ratio is preferably 5 to 40%, particularly preferably 10 to 30%.

[Thickness of Stretched Cellulose Acylate Film]

The thickness of the stretched, second retardation cellulose acylate film in the invention is preferably from 10 µm to 200 µm, more preferably from 20 µm to 150 µm, most preferably from 30 µm to 100 µm.

(Mat Agent Particles)

Preferably, the second retardation film in the invention contains fine particles as a mat agent. The fine particles usable in the invention are silicon dioxide (silica), titanium dioxide, aluminium oxide, zirconium oxide, calcium carbonate, calcium carbonate, talc, clay, calcined kaolin, calcined calcium silicate, hydrated calcium silicate, aluminium silicate, magnesium silicate and calcium phosphate. Of the particles, preferred are those containing silicon as their turbidity is low; and more preferred is silicon dioxide. Preferably, silicone dioxide particles for use herein have a primary mean particle size of from 1 nm to 20 nm, and an apparent specific gravity of at least 70 g/liter. More preferred are those having a primary mean particle size of from 5 to 25 nm, as they reduce the haze of the film. The apparent specific gravity of the particles is more preferably from 90 to 200 g/liter, even more preferably from 100 to 200 g/liter. Using the particles having a higher apparent specific gravity is more preferred, since it is easier to produce a high-concentration dispersion of particles and the films produced may have a lower haze and may have few aggregates.

The fine particles generally form secondary particles having a mean particle size of from 0.05 to 2.0 µm, and these particles exist in the film as aggregates of primary particles therefore forming projections or recesses of from 0.05 to 2.0 µm in size in the surface of the film. Preferably, the secondary mean particle size is from 0.05 µm to 1.0 µm, more preferably from 0.1 µm to 0.7 µm, even more preferably from 0.1 µm to 0.4 µm. The primary or secondary particle size as referred to herein means the diameter of the circumscribed circle of each particle seen through scanning electromicroscopic observation of the particles in the film. 200 particles in different sites are analyzed, and their mean value is the mean particle size of the particles.

Commercially-available silicon dioxide particles are usable herein, for example, including Aerosil R972, R972V, R974, R812, 200, 200V, 300, R202, OX50, TT600 (by Nippon Aerosil). Commercially-available zirconium oxide particles are also usable herein, for example, including Aerosil R976 and R811 (by Nippon Aerosil).

Of those, especially preferred are Aerosil 200V and Aerosil R972V, as they are silicon dioxide particles having a primary mean particle size of at most 20 nm and having an apparent specific gravity of at most 70 g/liter. They are effective for significantly reducing the friction factor of optical films, while keeping the film haze low.

In the invention, the method of mixing the mat agent is not specifically defined. Preferably, an in-line mixer is used for mixing a mat agent dispersant with an additive solution and for mixing it with a cellulose acylate solution. When silicon dioxide particles are dispersed as mixed with a solvent, then the silicon dioxide concentration is preferably from 5% to 30% by mass, more preferably from 10% to 25% by mass, even more preferably from 15% to 20% by mass. The dispersion concentration is preferably higher since the turbidity of the dispersion containing the same amount of the particles may be lower, and therefore the haze of the films produced may be low and the films may contain few aggregates. Preferably, the amount of the mat agent to be in the final cellulose acylate dope solution is from 0.001% to 1.0% by mass, more preferably from 0.005% to 0.5% by mass, even more preferably from 0.01% to 0.1% by mass.

[Saponification Treatment]

The first retardation cellulose acylate film and the second retardation cellulose acylate film may be saponified with alkali. The saponification improves the adhesiveness of the film to the material of a polarizing element such as polyvinyl alcohol, and therefore the saponified films are favorably used as a protective film of polarizers.

The alkali saponification of the cellulose acylate film in the invention is preferably attained in a cycle that comprises dipping the film surface in an alkali solution, then neutralizing it with an acid solution, washed with water and dried. The alkali solution includes a potassium hydroxide solution and a sodium hydroxide solution. Preferably, the hydroxide ion concentration in the solution is within a range of from 0.1 to 5.0 mol/L, more preferably from 0.5 to 4.0 mol/L. Preferably, the temperature of the alkali solution is within a range of from room temperature to 90° C., more preferably from 40 to 70° C.

<Production of Polarizing Plate>

(Polarizer)

A polarizer used in a polarizing plate in the invention is described below.

In the invention, the polarizer is preferably composed of a polyvinyl alcohol (PVA) and a dichroic molecule, and may be a polyvinylene polarizer prepared by subjecting a PVA or polyvinyl chloride to dehydration or dechlorination and by aligning the generated polyene structure as described in JP-A-11-248937.

The PVA is preferably a polymer material obtained by saponifying a polyvinyl acetate, and may contain a component capable of copolymerizing with vinyl acetate, such as an unsaturated carboxylic acid, an unsaturated sulfonic acid, an olefin, or a vinyl ether. Further, modified PVAs having an acetoacetyl group, sulfonic acid group, carboxyl group, oxyalkylene group, etc. may be used in the invention.

The saponification degree of the PVA is not particularly limited, and is preferably 80 to 100 mol %, particularly preferably 90 to 100 mol %, from the viewpoint of solubility, etc. The polymerization degree of the PVA is not particularly limited, preferably 1,000 to 10,000, particularly preferably 1,500 to 5,000.

It is preferred that the syndiotacticity of the PVA is 55% or more in view of improving the durability as described in Japanese Patent No. 2978219. It is also preferred that the syndiotacticity is 45 to 52.5% as described in Japanese Patent No. 3317494.

It is preferred that the PVA is formed into a film and then a dichroic molecule is introduced to prepare the polarizer. Generally the PVA film is preferably produced by casting a liquid prepared by dissolving a PVA-based resin in water or an organic solvent. The polyvinyl alcohol-based resin concentration of the liquid is generally 5 to 20% by mass, and a 10 to 200-µm-thick PVA film may be formed by casting the liquid. The PVA film can be produced with reference to Japanese Patent No. 3342516, JP-A-09-328593, JP-A-2001-302817, JP-A-2002-144401, etc.

The crystallinity degree of the PVA film is not particularly limited. The average crystallinity degree (Xc) may be 50 to 75% by mass as described in Japanese Patent No. 3251073, and the crystallinity degree may be 38% or less to reduce the in-plane hue unevenness as described in JP-A-2002-236214.

The PVA film preferably has a small birefringence ($\Delta n$), and the birefringence is preferably $1.0 \times 10^{-3}$ or less as described in Japanese Patent No. 3342516. The birefringence of the PVA film may be 0.002 to 0.01 to obtain a high polarization degree while preventing breakage of the PVA film in the stretching step as described in JP-A-2002-228835. Further, the value of $(nx+ny)/2-nz$ may be 0.0003 to 0.01 as described in JP-A-2002-060505. The Re(1090) of the PVA film is preferably 0 to 100 nm, further preferably 0 to 50 nm. Further, the Rth(1090) of the PVA film is preferably 0 to 500 nm, further preferably 0 to 300 nm.

Additionally, a PVA film having a bonding 1,2-glycol amount of 1.5 mol % or less described in Japanese Patent No. 3021494, a PVA film having 500 or less optically foreign substances of 5 μm or more in size per 100 cm² described in JP-A-2001-316492, a PVA film having a hot water breaking temperature of 1.5° C. or lower in the TD direction described in JP-A-2002-030163, and a PVA film prepared from a solution containing 1 to 100 parts by mass of 3 to 6-polyvalent alcohol such as glycerin or 15% by mass or more of a plasticizer described in JP-A-06-289225 can be preferably used for the polarizing plate in the invention.

The film thickness of the unstretched PVA film is not particularly limited, preferably 1 μm to 1 mm, particularly preferably 20 to 200 μm from the viewpoint of the film stability and uniform stretching. Such a thin PVA film that 10 N or less of stress is generated in the stretching in water at a ratio of 4 to 6 times may be used as described in JP-A-2002-2362-12.

The dichroic molecule may be a higher iodine ion such as $I_3^-$ or $I_5^-$, or a dichroic dye. The higher iodine ion is particularly preferably used in the invention. The higher iodine ion can be generated such that the PVA is soaked in a liquid prepared by dissolving iodine in an aqueous potassium iodide solution and/or an aqueous boric acid solution to adsorb the iodine to the PVA as described in *Henkoban no Oyo*, Ryo Nagata, CMC and *Kogyo Zairyo*, Vol. 28, No. 7, Page 39 to 45.

In the case of using the dichroic dye as the dichroic molecule, the dichroic dye is preferably an azo dye, particularly preferably a bisazo or trisazo dye. The dichroic dye is preferably water-soluble, and thus a hydrophilic substituent such as a sulfonic acid group, an amino group, or a hydroxyl group is preferably introduced to a dichroic molecule, to generate a free acid, an alkaline metal salt, an ammonium salt, or an amine salt.

Specific examples of the dichroic dyes include benzidine dyes such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1; diphenylurea dyes such as C.I. Direct Yellow 44, C.I. Direct Red 23, and C.I. Direct Red 79; stilbene dyes such as C.I. Direct Yellow 12; dinaphtylamine dyes such as C.I. Direct Red 31; J acid dyes such as C.I. Direct Red 81, C.I. Direct Violet 9, and C.I. Direct Blue 78.

In addition, the dichroic dyes preferably used in the invention include C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and dyes described in JP-A-62-70802, JP-A-1-161202, JP-A-1-172906, JP-A-1-172907, JP-A-1-183602, JP-A-1-248105, JP-A-1-265205, and JP-A-7-261024. Two or more dichroic dyes may be used in combination to obtain various hues. In the case of using the dichroic dye, the adsorption thickness may be 4 μm or more as described in JP-A-2002-082222.

The ratio of the dichroic molecule to the film matrix of the polyvinyl alcohol-based polymer is generally controlled within a range of 0.01 to 5% by mass. Too low dichroic molecule content results in reduction of polarization degree, and excessively high dichroic molecule content results in reduction of the single-plate transmittance.

The thickness of the polarizer is preferably 5 to 40 μm, more preferably 10 to 30 μm. Further, it is preferred that the thickness ratio of the polarizer to the protective film satisfies the condition of 0.01≦A (Polarizer thickness)/B (Protective film thickness)≦0.16 as described in JP-A-2002-174727.

Further, the crossing angle between the slow axis of the protective film and the absorption axis of the polarizer may be any one, and it is preferred that the axes are parallel or the crossing angle is an azimuthal angle of 45±20°.

<Production of Polarizing Plate>

Processes for producing the polarizing plate in the invention are described below. The polarizing plate of the invention preferably comprises a polarizer and a protective film disposed on both sides of the polarizer.

In the invention, the polarizing plate is preferably produced by a method having a swelling step, dyeing step, hardening step, stretching step, drying step, protective film attaching step, and attached film drying step. The order of the dyeing, hardening, and stretching steps may be changed, and some steps may be combined and simultaneously carried out. It is preferred that the film is water-washed after the hardening step as described in Japanese Patent No. 3331615.

In the invention, the swelling, dyeing, hardening, stretching, drying, protective film attaching, and attached film drying steps are particularly preferably carried out in this order. On-line surface evaluation may be carried out in or after the steps.

Though the swelling step is preferably carried out using only water, a polarizing plate matrix may be swelled by an aqueous boric acid solution, thereby controlling the swelling degree to improve the optical performance stability and prevent wrinkling of the matrix in the production line as described in JP-A-10-153709.

The temperature and time of the swelling may be any one, and are preferably 10 to 60° C. and 5 to 2,000 seconds.

The dyeing step may be carried out using a method described in JP-A-2002-86554. The dyeing may be achieved by soaking, application or spraying of an iodine or dye solution, etc. Further, the dyeing may be carried out while controlling the iodine concentration, dyeing bath temperature, and stretch ratio in the bath and while stirring the solution in the bath as described in JP-A-2002-290025.

In the case of using the higher iodine ion as the dichroic molecule, in the dyeing step, a solution prepared by dissolving iodine in an aqueous potassium iodide solution is preferably used to obtain a high-contrast polarizing plate. It is preferred that, in the aqueous iodine-potassium iodide solution, the iodine concentration is 0.05 to 20 g/l, the potassium iodide concentration is 3 to 200 g/l, and the mass ratio of iodine and potassium iodide is 1 to 2,000. The dyeing time is preferably 10 to 1,200 seconds, and the solution temperature is preferably 10 to 60° C. It is more preferred that the iodine concentration is 0.5 to 2 g/l, the potassium iodide concentration is 30 to 120 g/l, the mass ratio of iodine and potassium iodide is 30 to 120, the dyeing time is 30 to 600 seconds, and the solution temperature is 20 to 50° C.

A boron compound such as boric acid or borax may be added to the dyeing solution as described in Japanese Patent No. 3145747.

In the hardening step, the intermediate film is preferably soaked in a crosslinking agent solution or coated with the solution, thereby adding a crosslinking agent to the film. The hardening step may be carried out in several batches as described in JP-A-11-52130.

The crosslinking agent may be an agent described in U.S. Reissue Pat. No. 232897. Also a boron compound such as boric acid or borax may be used as the crosslinking agent. The crosslinking agent is most preferably a boric acid compound though it may be a polyvalent aldehyde for increasing the dimension stability as described in Japanese Patent No. 3357109. In the case of using boric acid as the crosslinking agent in the hardening step, a metal ion may be added to an aqueous boric acid-potassium iodide solution. A compound containing the metal ion is preferably zinc chloride, and zinc salts including zinc halides such as zinc iodide, zinc sulfate, and zinc acetate may be used instead of zinc chloride as described in JP-A-2000-35512.

In the invention, the PVA film is preferably hardened by soaking the film in an aqueous boric acid-potassium iodide solution containing zinc chloride. It is preferred that the boric acid concentration is 1 to 100 g/l, the potassium iodide concentration is 1 to 120 g/l, the zinc chloride concentration is 0.01 to 10 g/l, the hardening time is 10 to 1,200 seconds, and the solution temperature is 10 to 60° C. It is more preferred that the boric acid concentration is 10 to 80 g/l, the potassium iodide concentration is 5 to 100 g/l, the zinc chloride concentration is 0.02 to 8 g/l, the hardening time is 30 to 600 seconds, and the solution temperature is 20 to 50° C.

In the stretching step, a vertical monoaxial stretching method described in U.S. Pat. No. 2,454,515, etc. and a tentering method described in JP-A-2002-86554 can be preferably used. The stretch ratio is preferably 2 to 12 times, more preferably 3 to 10 times. It is preferred that the stretch ratio, the film thickness, and the polarizer thickness satisfies the condition of (Thickness of protective film-attached polarizer/Thickness of film)×(Total stretch ratio)>0.17 as described in JP-A-2002-040256, and that the width of the polarizer taken from final bath and the width of the polarizer at the time of attaching the protective film satisfies the condition of 0.80≦(Width of polarizer at attaching protective film/Width of polarizer taken from final bath)≦0.95, as described in JP-A-2002-040247.

In the drying step, a known method described in JP-A-2002-86554 may be used, and the drying temperature is preferably 30 to 100° C., and the drying time is preferably 30 seconds to 60 minutes. It is also preferred that a heat treatment for controlling an in-water discoloring temperature at 50° C. or higher is carried out as described in Japanese Patent No. 3148513, and that an aging treatment under controlled temperature and humidity is carried out as described in JP-A-07-325215 and JP-A-07-325218.

In the protective film attaching step, 2 protective films are bonded to both sides of the polarizer after the drying step. It is preferred that an adhesive liquid is applied immediately before the bonding, and the polarizer is sandwiched between and bonded to the protective films by a couple of rollers. It is preferred that the water content of the polarizer is controlled at the time of the bonding, to prevent concavity and convexity like grooves in a record due to the stretching as described in JP-A-2001-296426 and JP-A-2002-86554. In the invention, the water content is preferably 0.1 to 30%.

The adhesive for bonding the polarizer and the protective films is not particularly limited, and examples thereof include PVA-based resins (including PVAs modified with an acetoacetyl group, a sulfonic acid group, a carboxyl group, an oxyalkylene group, etc.) and aqueous boron compound solutions. The adhesive is preferably the PVA-based resin. The thickness of the dried adhesive layer is preferably 0.01 to 5 µm, particularly preferably 0.05 to 3 µm.

It is preferred that, to increase the adhesive strength between the polarizer and the protective films, the protective films are surface-treated to be hydrophilic, and then bonded to the polarizer. The surface treatment is not particularly restricted and may be a known treatment such as a saponification treatment using an alkali solution or a corona treatment. Further, a highly adhesive layer such as a gelatin undercoat layer may be formed after the surface treatment. It is preferred that the contact angle of the protective film surface against water is 50° or less as described in JP-A-2002-267839.

The conditions of drying after the bonding may be those described in JP-A-2002-86554, and the drying temperature is preferably 30 to 100° C. and the drying time is preferably 30 seconds to 60 minutes. Further, it is preferred that an aging treatment under controlled temperature and humidity is carried out as described in JP-A-07-325220.

Each element content of the polarizer is preferably such that the iodine content is 0.1 to 3.0 g/m$^2$, the boron content is 0.1 to 5.0 g/m$^2$, the potassium content is 0.1 to 2.00 g/m$^2$, and the zinc content is 0 to 2.00 g/m$^2$. The potassium content may be 0.2% by mass or less as described in JP-A-2001-166143, and the zinc content may be 0.04% to 0.5% by mass as described in JP-A-2000-035512.

An organic titanium compound and/or an organic zirconium compound may be added to the film in any of the dyeing, stretching, and hardening steps, to increase the dimension stability of the polarizing plate, as described in Japanese Patent No. 3323255. Further, a dichroic dye may be added to control the hue of the polarizing plate.

<Properties of Polarizing Plate>

(1) Transmittance and Polarization Degree

In the invention, the single-plate transmittance of the polarizing plate is preferably 42.5% to 49.5%, more preferably 42.8% to 49.0%. The polarization degree defined by the following Equation 4 is preferably 99.900% to 99.999%, more preferably 99.940% to 99.995%. The parallel transmittance is preferably 36% to 42%, and the perpendicular transmittance is preferably 0.001% to 0.05%.

$$\text{Polarization degree (\%)} = \sqrt{\{(Pa-Pe)/(Pa+Pe)\}} \qquad \text{Equation 1}$$

Pa: Parallel transmittance

Pe: Perpendicular transmittance

The transmittance is defined by the following equation in accordance with JIS Z8701.

$$T = K\int S(\lambda) y(\lambda) \tau(\mu) d\lambda$$

In the equation, K, S($\lambda$), y($\lambda$), and $\tau(\lambda)$ are as follows.

$$K = \frac{100}{\int S(\lambda) y(\lambda) d\lambda} \qquad \text{Equation 3}$$

S($\lambda$): Spectral distribution of standard light for color display y($\lambda$): Color matching function in XYZ system $\tau(\lambda)$: Spectral transmittance The dichroic ratio defined by the following Equation 5 is preferably 48 to 1215, more preferably 53 to 525.

$$\text{Dichroic ratio}(Rd) = \frac{\log\left[\dfrac{\text{Single-plate transmittance}}{100}\left(1 - \dfrac{\text{Polarization degree}}{100}\right)\right]}{\log\left[\dfrac{\text{Single-plate transmittance}}{100}\left(1 + \dfrac{\text{Polarization degree}}{100}\right)\right]} \quad \text{Equation 5}$$

The iodine concentration and the single-plate transmittance may be in ranges described in JP-A-2002-258051, Paragraph 0017.

The wavelength dependency of the parallel transmittance may be lower as described in JP-A-2001-083328 and JP-A-2002-022950. In the case of placing the polarizing plate in the crossed nicols state, the optical property may be in a range described in JP-A-2001-091736, Paragraph 0007, and the relation between the parallel transmittance and the perpendicular transmittance may be in a range described in JP-A-2002-174728, Paragraph 0006.

As described in JP-A-2002-221618, in a light wavelength range of 420 to 700 nm, the standard deviation of parallel transmittance of every 10 nm may be 3 or less, and the minimum values of (Parallel transmittance/Perpendicular transmittance) of every 10 nm may be 300 or more.

Also it is preferred that the parallel transmittance and the perpendicular transmittance of the polarizing plate at a wavelength of 440 nm, those at a wavelength of 550 nm, and those at a wavelength of 610 nm are within ranges described in JP-A-2002-258042, Paragraph 0012 or JP-A-2002-258043, Paragraph 0012.

(2) Hue

The hue of the polarizing plate in the invention is preferably evaluated by using a lightness index L* and chromaticness indexes a* and b* of the L*a*b* colorimetric system with a CIE uniform color space.

Definitions of L*, a*, and b* are described in *Shikisai Kogaku*, Tokyo Denki University Press, etc.

The a* of one polarizing plate is preferably −2.5 to 0.2, more preferably −2.0 to 0. The b* of one polarizing plate is preferably 1.5 to 5, more preferably 2 to 4.5. The a* of a parallel transmitted light in two polarizing plates is preferably −4.0 to 0, more preferably −3.5 to −0.5. The b* of a parallel transmitted light in two polarizing plates is preferably 2.0 to 8, more preferably 2.5 to 7. The a* of a perpendicular transmitted light in two polarizing plates is preferably −0.5 to 1.0, more preferably 0 to 2. The b* of a perpendicular transmitted light in two polarizing plates is preferably −2.0 to 2, more preferably −1.5 to 0.5.

The hue may be evaluated by chromaticity coordinates (x, y) calculated from the above X, Y, and Z. For example, it is preferred that the parallel transmitted light chromaticity ($x_p$, $y_p$) and the perpendicular transmitted light chromaticity ($x_c$, $y_c$) of two polarizing plates are within ranges described in JP-A-2-002-214436, Paragraph 0017, JP-A-2001-166136, Paragraph 0007, or JP-A-2002-169024, Paragraph 0005 to 0008, and that the relation between the hue and absorbance is within a range described in JP-A-2001-311827, Paragraph 0005 to 0006.

(3) Viewing Angle Properties

It is preferred that, when the polarizing plate is disposed in the crossed nicols state and a light having a wavelength of 550 nm is injected thereinto, the transmittance ratio and the xy chromaticity differences between a vertically light injection and a light injected from an angle of 45' against the polarizing axis at an angle of 40° against the normal line are within ranges described in JP-A-2001-166135 or JP-A-2001-166137. It is preferred that the ratio $T_{60}/T_0$, in which $T_0$ is a light transmittance of a polarizing plate stack placed in the crossed nicols state in the vertically direction and $T_{60}$ is a light transmittance in the direction at an angle of 60° against the normal line of the stack, is 10,000 or less as described in JP-A-10-068817. It is preferred also that, in a case where a natural light is injected to the polarizing plate from the normal line direction or at an elevation angle of 80° or less, the transmittance difference of transmitted lights is 6% or less in 20 nm within a transmission spectrum wavelength range of 520 to 640 nm as described in JP-A-2002-139625. Further, it is preferred that the brightness difference of the transmitted lights between regions 1 cm away from each other is 30% or less as described in JP-A-08-248201.

(4) Durability (4-1) Temperature and Humidity Durability

When the light transmittance and polarization degree are measured before and after the polarizing plate is left under a temperature of 60° C. and a relative humidity of 95% for 500 hours, the change of the light transmittance and polarization degree are preferably 3% or less based on the absolute values. The change of the light transmittance is particularly preferably 2% or less, and the change of the polarization degree is particularly preferably 1.0% or less, based on the absolute values. Further, it is preferred that the polarizing plate has a polarization degree of 95% or more and a single transmittance of 38% or more after the polarizing plate is left under a temperature of 80° C. and a relative humidity of 90% for 500 hours as described in JP-A-07-077608.

(4-2) Dry Durability

When the light transmittance and polarization degree are measured before and after the polarizing plate is left under a dry condition at 80° C. for 500 hours, the change of the light transmittance and polarization degree are preferably 3% or less based on the absolute values. The change of the light transmittance is particularly preferably 2% or less, and the change of the polarization degree is particularly preferably 1.0% or less, furthermore preferably 0.1% or less, based on the absolute values.

(4-3) Other Durability

Further, it is preferred that the shrinkage ratio of the polarizing plate by leaving the polarizing plate at 80° C. for 2 hours is 0.5% or less as described in JP-A-06-167611. Also it is preferred that, when a stack is prepared by disposing the polarizing plates on the both sides of a glass plate in the crossed nicols state and left at 69° C. for 750 hours, x and y values of the stack are within ranges described in JP-A-10-068818 after the leaving. Furthermore, it is preferred that, when the polarizing plate is left at 80° C. under a relative humidity of 90% for 200 hours, the change of spectral intensity ratio between 105 cm$^{-1}$ and 157 cm$^{-1}$ obtained by Raman spectroscopy is within a range described in JP-A-08-094834 or JP-A-09-197127.

(5) Alignment Degree

More excellent polarization performance is achieved as the alignment degree of the PVA is increased. The alignment degree calculated as order parameter values by polarized Raman scattering or polarized FT-IR, etc. is preferably 0.2 to 1.0. Also it is preferred that difference between an alignment coefficient of a high-molecular segment in the entire amorphous region of the polarizer and an alignment coefficient of occupying molecules (0.75 or more) is at least 0.15 as described in JP-A-59-133509. Further, it is preferred that the alignment coefficient of the amorphous region in the polarizer is 0.65 to 0.85 or that the alignment degree of the higher iodine ion such as $I_3^-$ and $I_5^-$ is 0.8 to 1.0 as an order parameter value as described in JP-A-04-204907.

(6) Other Properties

It is preferred that the shrinkage force per unit width in the absorption axis direction is 4.0 N/cm or less when the polarizing plate is heated at 80° C. for 30 minutes as described in JP-A-2002-006133, that the dimension changes of the polarizing plate in the absorption axis direction and the polarizing axis direction are both within ±0.6% when the polarizing plate is heated at 70° C. for 120 hours as described in JP-A-2002-236213, and that the water content of the polarizing plate is 3% by mass or less as described in JP-A-2002-090546. Further, it is preferred that the surface roughness in a direction vertically to the stretching axis is 0.04 μm or less based on the center line average roughness as described in JP-A-2000-249832, that the refractive index $n_0$ in the transmission axis direction is 1.6 or more as described in JP-A-10-268294, and that the relation between the polarizing plate thickness and the protective film thickness is within a range described in JP-A-10-111411, Paragraph 0004.

<Functionalization of Polarizing Plate>

The polarizing plate used in the invention may be preferably used as a functionalized polarizing plate by combining with an antireflection film for increasing visibility of the display, a brightness increasing film, or an optical film having a functional layer such as a hard coating layer, a forward scattering layer, or an antiglare (antidazzle) layer.

(Antireflection Film)

The polarizing plate used in the invention may be used in combination with an antireflection film. The antireflection film may be a film with a reflectivity of about 1.5% composed of a single layer of a low refractive material such as a fluorine polymer, or a film with a reflectivity of about 1% utilizing interference of thin layers. In the invention, it is preferred that a low refractive layer and at least one layer having a refractive index higher than that of the low refractive layer (a high refractive layer or an middle refractive layer) are stacked on a transparent substrate. Further, also antireflection films described in Nitto Giho, Vol. 38, No. 1, May 2000, Page 26 to 28, JP-A-2002-301783, etc. may be preferably used in the invention.

The refractive indexes of the layers satisfy the following relations.

Refractive index of high refractive layer>Refractive
  index of middle refractive layer>Refractive index
  of transparent substrate>Refractive index of low
  refractive layer The transparent substrate used for the antireflection film may be preferably the above mentioned transparent polymer film for the protective film of the polarizer.

The refractive index of the low refractive layer is preferably 1.20 to 1.55, more preferably 1.30 to 1.50. It is preferred that the low refractive layer is used as the outermost layer having an excoriation resistance and antifouling property. It is also preferred that a silicone-containing compound or a fluorine-containing compound, etc. is used for improving the slipping property of the surface to increase the excoriation resistance.

For example, compounds described in JP-A-9-222503, Paragraph 0018 to 0026, JP-A-11-38202, Paragraph 0019 to 0030, JP-A-2001-40284, Paragraph 0027 to 0028, JP-A-2000-284102, etc. can be preferably used as the fluorine-containing compound.

The silicone-containing compound preferably has a polysiloxane structure. Reactive silicones such as SILAPLANE available from Chisso Corporation and polysiloxanes having silanol end groups described in JP-A-11-258403, etc. can be used as the compound. An organic metal compound such as a silane coupling agent and a silane coupling agent having a particular fluorine-containing hydrocarbon group may be hardened by a condensation reaction in the presence of a catalyst, as described in JP-A-58-142958, JP-A-58-147483, JP-A-58-147484, JP-A-9-157582, JP-A-11-106704, JP-A-2000-117902, JP-A-2001-48590, JP-A-2002-53804, etc.

The low refractive layer may preferably contain another additive such as a filler (e.g. low refractive inorganic compound having an average primary particle size of 1 to 150 nm composed of silicon dioxide (silica) or a fluorine-containing compound (magnesium fluoride, calcium fluoride, barium fluoride, etc.), a fine organic particle described in JP-A-11-3820, Paragraph 0020 to 0038), a silane coupling agent, a slipping agent, or a surfactant.

The low refractive layer may be formed by a gas phase method such as a vacuum deposition method, a sputtering method, an ion plating method, or a plasma CVD method, and is preferably formed by a coating method advantageous in low costs. Preferred examples of the coating methods include dip coating methods, air-knife coating methods, curtain coating methods, roller coating methods, wire bar coating methods, gravure coating methods, and microgravure coating methods.

The thickness of the low refractive layer is preferably 30 to 200 nm, more preferably 50 to 150 nm, most preferably 60 to 120 nm.

The middle refractive layer and the high refractive layer are preferably such that high refractive inorganic compound ultrafine particles with an average particle size of 100 nm or less are dispersed in a matrix material. The high refractive inorganic compound fine particles are preferably composed of an inorganic compound having a refractive index of 1.65 or more such as an oxide of Ti, Zn, Sb, Sn, Zr, Ce, Ta, La, In, etc. or a multiple oxide containing the metal atom.

The ultrafine particles may be used such that the particle surfaces are treated with a surface treatment agent such as a silane coupling agent described in JP-A-11-295503, JP-A-11-153703, JP-A-2000-9908, etc., or an anionic compound or organic metal coupling agent described in JP-A-2001-310432, etc., such that a core-shell structure is formed by using high refractive particles as cores as described in JP-A-2001-166104, or such that a particular dispersant is used in combination as described in JP-A-11-153703, U.S. Pat. No. 6,210,858B1, JP-A-2002-2776069, etc.

The matrix material may be a known thermoplastic resin or hardening resin coating, etc., and may be a polyfunctional material described in JP-A-2000-47004, JP-A-2001-315242, JP-A-2001-31871, JP-A-2001-296401, etc. or a hardening film derived from a metal alkoxide composition described in JP-A-2001-293818, etc.

The refractive index of the high refractive layer is preferably 1.70 to 2.20. The thickness of the high refractive layer is preferably 5 nm to 10 μm, more preferably 10 nm to 1 μm.

The refractive index of the middle refractive layer is controlled at a value between those of the low refractive layer and the high refractive layer. The refractive index of the middle refractive layer is preferably 1.50 to 1.70.

The haze of the antireflection film is preferably 5% or less, more preferably 3% or less. The strength of the film is preferably H or more, more preferably 2H or more, most preferably 3H or more, in a pencil hardness test in accordance with JIS K5400.

(Brightness Increasing Film)

In the invention, the polarizing plate may be used in combination with a brightness increasing film. The brightness increasing film has a function of separating a circular polarized light or a linearly polarized light, is placed between the polarizing plate and a backlight, and reflects or scatters a circular polarized light or linearly polarized light backward to the backlight. The light reflected by the backlight is in a partly changed polarization state, and is injected again to the brightness increasing film and the polarizing plate. In this case, a part of the light is transmitted therethrough, whereby the light utilization ratio is increased by repeating the processes to improve the front brightness about 1.4 times. In the invention, the polarizing plate may be used in combination with a known brightness increasing film such as an anisotropy reflection type film or an anisotropy scattering type film.

A known anisotropy reflection type brightness increasing film is such that uniaxially stretched films and unstretched films are stacked to enlarge the refractive index difference in the stretch direction, thereby showing a reflectivity and a transmittance anisotropy. Such brightness increasing films include multilayer films using dielectric mirror described in WO 95/17691, WO 95/17692, and WO 95/17699, and cholesteric liquid crystal films described in EP No. 606940A2 and JP-A-8-271731. In the invention, DBEF-E, DBEF-D, and DBEF-M available from 3M is preferably used as the multilayer brightness increasing film using the dielectric mirror principle, and NIPOCS available from Nitto Denko Corporation is preferably used as the cholesteric liquid crystal brightness increasing film. NIPOCS is described in *Nitto Giho*, Vol. 38, No. 1, May 2000, Page 19 to 21, etc.

In the invention, also an anisotropy scattering type brightness increasing film prepared by blending a positive intrinsic birefringence polymer and a negative intrinsic birefringence polymer and by uniaxial stretching, described in WO 97/32223, WO 97/32224, WO 97/32225, WO 97/32226, JP-A-9-274108, and JP-A-11-174231, is preferably used in combination. DRPF-H available from 3M is preferably used as the anisotropy scattering type brightness increasing film.

(Other Functional Optical Film)

In the invention, the polarizing plate is preferably used in combination with a functional optical film having a hard coating layer, a forward scattering layer, an antiglare (anti-dazzle) layer, a gas barrier layer, a slipping layer, an antistatic layer, an undercoat layer, a protective layer, etc. Further, it is preferred that these functional layers are combined with the antireflection layer of the antireflection film or the optically anisotropic layer in one layer. These functional layers may be formed on one or both of the polarizer side and the opposite side near the air interface.

[Hard Coating Layer]

The polarizing plate is preferably combined with a functional optical film prepared by forming a hard coating layer on a transparent substrate to improve the mechanical strength such as excoriation resistance. Particularly in the case of forming the hard coating layer in the above antireflection film, the hard coating layer is preferably formed between the transparent substrate and the high refractive layer.

The hard coating layer is preferably formed by a crosslinking reaction of a hardening compound by light and/or heat, or a polymerization reaction. A hardening functional group of the compound is preferably a photopolymerizable group, and an organic alkoxysilyl compound is preferably used as a hydrolyzable functional group-containing, organic metal compound. A hard coating layer composition described in JP-A-2002-144913, JP-A-2000-9908, and WO 00/46617, etc. is preferably used in the invention.

The thickness of the hard coating layer is preferably 0.2 to 100 μm.

The strength of the hard coating layer is preferably H or more, more preferably 2H or more, most preferably 3H or more, by a pencil hardness test in accordance with JIS K5400. Further, in a taber test according to JIS K5400, the hard coating layer more preferably has a smaller abrasion.

Compounds having an unsaturated ethylenic group and compounds having a ring opening polymerizable group can be used as materials for the hard coating layer, and the compounds may be used singly or in combination. Preferred examples of the compounds having the unsaturated ethylenic groups include polyol polyacrylates such as ethyleneglycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylate of bisphenol A diglycidyl ether and diacrylate of hexanediol diglycidyl ether; and urethane acrylates prepared by a reaction of a polyisocyanate and a hydroxyl-containing acrylate such as hydroxyethyl acrylate. Examples of commercially available compounds include EB-600, EB-40, EB-140, EB-1150, EB-1290K, IRR214, EB-2220, TMPTA, and TMPTMA available from Daicel ucb, and UV-6300 and UV-1700B available from Nippon Synthetic Chemical Industry Co., Ltd.

Preferred examples of the compounds having a ring opening polymerizable group include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, polyglycidyl ethers of cresol novolac resins, and polyglycidyl ethers of phenol novolac resins; alicyclic epoxys such as CELOXIDE 2021P, CELOXIDE 2081, EPOLEAD GT-301, EPOLEAD GT-401, and EHPE3150CE available from Daicel Chemical Industries, Ltd., and polycyclohexyl epoxymethyl ether of phenol novolac resins; oxetanes such as OXT-121, OXT-221, OX-SQ, and PNOX-1009 available from Toagosei Co., Ltd. Further, polymers of glycidyl (meth)acrylate, and copolymers of glycidyl (meth)acrylate and a monomer copolymerizable there with may be used for the hard coating layer.

It is preferred that fine particles of oxides of silicon, titanium, zirconium, aluminum, etc., crosslinked particles of polyethylenes, polystyrenes, poly(meth)acrylic esters, polydimethylsiloxanes, etc., and organic crosslinked fine particles such as crosslinked rubber particles of SBR, NBR, etc. are added to the hard coating layer to reduce hardening shrinkage of the hard coating layer, increase the adhesion to the substrate, and reduce curling of the hard coating product. The average particle size of these crosslinked fine particles is preferably 1 to 20,000 nm. The shape of the crosslinked fine particles is not particularly limited, and may be a spherical shape, rod-like shape, needle-like shape, tabular shape, etc. The amount of the fine particles is preferably such that the fine particle content of the hardened hard coating layer is 60% or less by volume. The fine particle content is more preferably 40% or less by volume.

In the case of adding the above described inorganic fine particles, which are poor in affinity for binder polymers generally, a surface treatment is preferably carried out using a surface treatment agent having a metal such as silicon, aluminum, or titanium, and a functional group such as an alkoxide group, a carboxylic acid group, a sulfonic acid group, or a phosphonic acid group.

The hard coating layer is hardened preferably by heat or an activation energy ray, and more preferably by an activation energy ray such as a radioactive ray, a gamma ray, an alpha ray, an electron ray, or a ultraviolet ray, and particularly preferably by an electron ray or a ultraviolet ray in view of safeness and productivity. In the case of the heat hardening, the heating temperature is preferably 140° C. or lower, more preferably 100° C. or lower, in view of the heat resistance of the plastic.

[Forward Scattering Layer]

The forward scattering layer is used for improving the viewing angle properties (the hue and brightness distribution) in the directions of up, down, left, and right, of the liquid crystal display device containing the polarizing plate according to the invention. In the invention, the forward scattering layer is preferably composed of fine particles with different refractive indexes dispersed in a binder. For example, the forward scattering layer may have such a structure that the forward scattering coefficient is particularly controlled as described in JP-A-11-38208, that relative refractive indexes of a transparent resin and fine particles are particularly controlled as described in JP-A-2000-199809, or that the haze is controlled at 40% more as described in JP-A-2002-107512. Further, it is preferred that the polarizing plate is used in combination with LUMISTY described in Sumitomo Chemical Co., Ltd., *Technical Report, Optical functional film*, page 31 to 39 to control the haze viewing angle properties.

[Antiglare Layer]

The antiglare (antidazzle) layer is used for scattering a reflected light to prevent glare. The antiglare function is obtained by forming concavity and convexity on the outermost surface of the liquid crystal display device. The haze of the optical film having the antiglare function is preferably 3 to 30%, more preferably 5 to 20%, most preferably 7 to 20%.

The concavity and convexity is preferably formed on the film surface by a method of adding fine particles (JP-A-2000-271878, etc.), a method of adding a small amount (0.1 to 50% by mass) of relatively large particles having a size of 0.05 to 2 μm (JP-A-2000-281410, JP-A-2000-95893, JP-A-2001-100004, JP-A-2001-281407, etc.), or a method of physically transferring the concavity and convexity to the film surface (such as a embossing method described in JP-A-63-278839, JP-A-11-183710, JP-A-2000-275401, etc.)<

<Liquid Crystal Display Device>

The liquid crystal display device of the invention to which a polarizing plate comprising an optical compensatory sheet is preferably applied is described below.

FIG. 1 is a schematic view showing an example of the liquid crystal display device according to the invention. In FIG. 1, a liquid crystal display device 10 has a liquid crystal cell containing a liquid crystal layer 7, and an upper electrode substrate 5 and a lower electrode substrate 8 disposed thereon, and has an upper polarizing plate 1 and a lower polarizing plate 12 disposed on the both sides of the liquid crystal cells. A color filter may be disposed between the liquid crystal cell and the polarizing films. When the liquid crystal display device 10 is a transmission type device, a backlight using a light source such as a cold or hot cathode fluorescent tube, a light emitting diode, a field emission device, or an electroluminescent device is disposed on the back side. In the FIGURE, 2 and 13 denote direction of the absorption axis of the upper polarizing plate and the lower polarizing plate, respectively, and 6 and 9 denote alignment control direction of the upper substrate and the lower substrate, respectively.

The upper and lower polarizing plates 1 and 12 are each composed of a polarizer sandwiched between two protective films. In the liquid crystal display device 10 of the invention, the protective film facing the cell in one of the polarizing plate has the properties of the above formulae (1) to (6), and the protective film facing the liquid crystal cell in the other polarizing plate has the properties of the above formulae (7) to (12). In the liquid crystal display device 10 of the invention, a transparent protective film, a polarizer, and a cellulose acylate film are preferably stacked in this order from the outside of the device (from the side farther from the liquid crystal cell). The liquid crystal display device 10 may be a direct view type, projection type, or optical modulation type display. The invention is particularly efficiently applied to active matrix liquid crystal display devices using 3- or 2-terminal semiconductor elements such as TFT and MIM. The invention may be efficiently applied also to passive matrix liquid crystal display devices as represented by STN mode, which is so-called time division operation.

(VA Mode)

The liquid crystal display device of the invention preferably has a VA mode liquid crystal cell.

In the case of the VA mode, a liquid crystal having $\Delta n$ of about 0.0813 and $\Delta \in$ of negative value −4.6 is enclosed between the upper and lower substrates. The alignment of the liquid crystal can be controlled by rubbing, and the director representing the alignment direction of the liquid crystal molecules, the tilt angle, is preferably about 89°. In the FIG. 1, the thickness d of the liquid crystal layer 7 is 3.5 μm. The brightness at the white display depends on the product $\Delta nd$ of the thickness d and the refractive index anisotropy $\Delta n$. Thus the thickness of the liquid crystal layer is controlled in a range of 0.2 to 0.5 μm to obtain a maximum brightness.

The absorption axis 2 of the upper polarizing plate 1 in the liquid crystal cell is approximately perpendicular to the absorption axis 13 of the lower polarizing plate 12. A transparent electrode (not shown) is formed on the inner surface of the alignment film disposed on each of the upper and lower electrode substrates 5 and 8. In the non-driving state where a driving voltage is not applied to the electrodes, the liquid crystal molecules in the liquid crystal layer 7 are aligned approximately perpendicular to the substrate, so that the polarization state of a light that passes through the liquid crystal panel is hardly changed. Thus, the liquid crystal display device shows ideal black display in the non-driving state. On the other hand, in the driving state, the liquid crystal molecules are aligned approximately parallel to the substrate, so that the polarization state of the light that passes through the liquid crystal panel is changed by the tilted liquid crystal molecules. Thus, the liquid crystal display device shows white display in the driving state.

An electric field is applied to the upper and lower substrates, whereby the used liquid crystal material has a negative dielectric anisotropy and is such that the liquid crystal molecules are aligned perpendicularly to the electric field direction. In a case where an electrode is placed on one substrate, and an electric field is applied in the longitudinal direction parallel to the substrate, the liquid crystal material having a positive dielectric anisotropy is used.

In the VA mode liquid crystal display device, A chiral agent, which is commonly used for TN mode liquid crystal display devices, is not often used because it deteriorates the dynamic response characteristic. A chiral agent may be added to reduce alignment defects in some cases.

The VA mode is characterized by high-speed response and high contrast. However, the contrast is lowered in the oblique direction though it is high at the front. The liquid crystal molecules are aligned perpendicular to the substrate surface at the time of black level. When the display is observed at the front, the transmittance is low and the contrast is high because the liquid crystal molecules have little birefringence. However, when the display is observed from an oblique direction, the liquid crystal molecules show a birefringence. The angle between the absorption axes of the upper and lower polarizing plates is more than 90° from an oblique direction, though it is 90° at the front. By the two factors, light leakage is caused and the contrast is reduced in the oblique direction. An optical compensatory sheet is added to solve the problem.

Further, the liquid crystal molecules are tilted at the time of white level, and in the tilted direction and the opposite direction, the birefringences of the liquid crystal molecules are different from the oblique direction, resulting in different brightness and color hue. To solve the problem, one pixel of the liquid crystal display device is divided into a plurality of domains to form a multidomain structure.

[Multidomain]

For example, in the VA mode, when an electric field is applied to the liquid crystal molecules, the molecules are tilted in different domains in one pixel, thereby averaging the viewing angle properties. The alignment of the one pixel may be divided by forming a slit in the electrode, or by forming a projection to change the electric field direction or make an electric field density deviation. To obtain constant viewing angles in all the directions, the number of the domains has to be increased. Approximately constant viewing angles can be obtained by dividing into 4 or 8 domains. When the pixel is divided into 8 domains, the polarizing plate absorption axis can be preferably controlled at a desired angle.

In the boundary of the domains, the liquid crystal molecules are hardly likely to respond. Thus, in the normally black display, the black level of display is maintained, thereby resulting in brightness reduction. The boundary area can be reduced by adding a chiral agent to the liquid crystal material.

EXAMPLES

The invention is described more concretely with reference to the following Examples, in which the material used, its amount and the ratio, the details of the treatment and the treatment process may be suitably modified or changed not overstepping the sprit and the scope of the invention. Accordingly, the scope of the invention should not be limited to the following Examples.

Reference Example 1

Formation of First Retardation Film 1

The following composition of cellulose acylate solution A was put into a mixing tank and stirred under heat to dissolve the ingredients to prepare a cellulose acylate solution A.

| (Composition of Cellulose Acylate Solution A) | |
|---|---|
| Cellulose acetate having a substitution degree of 2.86 | 100% by weight |
| Triphenyl phosphate (plasticizer) | 7.8% by weight |
| Biphenyldiphenyl phosphate (plasticizer) | 3.9% by weight |
| Methylene chloride (first solvent) | 300% by weight |

-continued

| (Composition of Cellulose Acylate Solution A) | |
|---|---|
| Methanol (second solvent) | 54% by weight |
| 1-Butanol | 11% by weight |

The following composition of additive solution B-1 was put into a different mixing tank and stirred under heat to dissolve the ingredients to prepare an additive solution B-1.

| (Composition of Additive Solution B-1) | |
|---|---|
| Methylene chloride | 64% by weight |
| Methanol | 16% by weight |
| Retarder B-121 | 10% by weight |
| Retarder B-130 | 10% by weight |

<Formation of First Retardation Film 1>

40% by weight of the additive solution B-1 was added to 477% by weight of the cellulose acylate solution A, and fully stirred to prepare a dope. The dope was cast onto a drum cooled to 0° C., through a casting port. The film was peeled off from the drum when the solvent content of the film was 70% by mass based on the dry weight thereof, and this was led to pass through two rolls running at a different speed whereby the film was 5% stretched in the machine direction. Next, this was led to pass between rolls for heat treatment, and dried to produce a first retardation film 1 having a thickness of 80 μm.

Reference Example 2

Formation of First Retardation Films 2 and 3

First retardation films 2 and 3 were formed in the same manner as that for the first retardation film 1, for which, however, the substitution degree in cellulose acetate, the type and the amount of the retarder, and the thickness of the film in the formation of the first retardent film 1 were varied as in Table 1.

Reference Example 3

Formation of First Retardation Film 4

A cellulose acylate solution C was prepared and a UV absorbent solution D was prepared in the manner mentioned below, and using them, a first retardation film 4 was formed.

(Preparation of Cellulose Acylate Solution C)

A mixture of the ingredients of a cellulose acylate solution C mentioned below was put into a closed container, and gradually heated with stirring up to 45° C. to dissolve them, taking 60 minutes. The inner pressure of the container became 1.2 atmospheres. The dope was filtered through Azumi filter paper No. 244 (by Azumi Filter), and kept static for 24 hours to remove the foams from the dope.

| (Composition of Cellulose Acylate Solution C) | |
|---|---|
| Cellulose acetate propionate (having a substitution degree for acetyl group of 2.00 and a substitution degree for propionyl group of 0.80, and having a viscosity-average degree of polymerization of 350) | 100% by weight |

-continued

| (Composition of Cellulose Acylate Solution C) | |
|---|---|
| Ethylphthalylethyl glycolate | 2% by weight |
| Triphenyl phosphate | 8.5% by weight |
| Methylene chloride | 290% by weight |
| Ethanol | 60% by weight |

(Preparation of UV Absorbent Solution D)

5% by weight of cellulose acetate propionate, 6% by weight of Tinuvin 326 (by Ciba Speciality Chemicals), 4% by weight of Tinuvin 109 (by Ciba Speciality Chemicals) and 5% by weight of Tinuvin 171 (by Ciba Speciality Chemicals) were mixed in 94% by weight of methylene chloride and 8% by weight of ethanol with stirring to dissolve therein to prepare a UV absorbent solution D.

2.5% by weight of the UV absorbent solution D was added to 100% by weight of the cellulose acylate solution C, and well mixed with a static mixer, and the resulting dope was cast onto a stainless belt via a die to a width of 1.6 m, at a dope temperature of 30° C. Water at 25° C. was kept in contact with the back surface of the stainless belt so as to control the temperature of the belt, on which the cast film was dried for 1 minute. Then, cold water at 15° C. was kept in contact with the back surface of the stainless belt for 15 seconds, and the film having a residual solvent content of 80% by mass was peeled away from the stainless belt.

Next, the film was stretched at a draw ratio of 1.5 times in the cross direction, using a monoaxially-stretching tenter. Then, this was led to pass between rolls and dried to give a first retardation film 4 having a thickness of 82 μm.

Reference Example 4

Formation of Second Retardation Film 1

(Preparation of Cellulose Acylate Solution 01)

The following composition of cellulose acylate solution 01 was put into a mixing tank and stirred to dissolve the ingredients, thereby preparing a cellulose acylate solution 01.

| (Composition of Cellulose Acylate Solution 01) | |
|---|---|
| Cellulose acetate (having a substitution degree for acetyl group of 2.70) | 100.0% by weight |
| Plasticizer, triphenyl phosphate | 6.0% by weight |
| Plasticizer, biphenyl phosphate | 3.0% by weight |
| Methylene chloride (first solvent) | 347.0% by weight |
| Methanol (second solvent) | 52.0% by weight |

(Preparation of Mat Agent Solution 11)

The following composition of mat agent solution 11 was put into a disperser and stirred to dissolve the ingredients, thereby preparing a mat agent solution 11.

| (Composition of Mat Agent Solution 11) | |
|---|---|
| Silica particles having a mean particle size of 20 nm (AEROSIL R972, by Nippon Aerosil) | 2.0% by weight |
| Methylene chloride (first solvent) | 75.0% by weight |
| Methanol (second solvent) | 12.7% by weight |
| Cellulose acylate solution 01 | 10.3% by weight |

TABLE 1

| | Cellulose Acylate | | Retarder 1 | | Retarder 2 | | | |
|---|---|---|---|---|---|---|---|---|
| Sample No. | Sub. Degree for Acetyl Group | Sub. Degree for Propionyl Group | Type | Amount added* | Type | Amount added* | Stretching Direction | Draw Ratio |
| First Retardation Film 1 | 2.86 | 0 | B-121 | 2 | B-130 | 2 | machine | 9% |
| First Retardation Film 2 | 2.8 | 0 | UV-1 | 10 | — | — | machine | 6% |
| First Retardation Film 3 | 2.7 | 0 | I-2 | 7.5 | — | — | machine | 8% |
| First Retardation Film 4 | 1.9 | 0.8 | — | — | — | — | cross | 32% |

*% by weight relative to cellulose acylate.

UV-1 is an example of a UV absorbent having an additional function of a retarder.

UV Absorbent, UV-1:

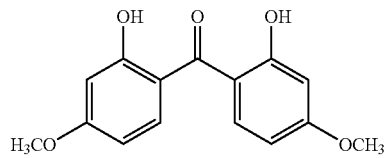

(Preparation of Retarder Solution 21)

The following composition of retarder solution 21 was put into a mixing tank and stirred under heat to dissolve the ingredients, thereby preparing a retarder solution 21.

| (Composition of Retarder Solution 21) | |
|---|---|
| Retarder (G) | 10.0% by weight |
| Methylene chloride (first solvent) | 67.1% by weight |

| (Composition of Retarder Solution 21) | |
|---|---|
| Methanol (second solvent) | 10.0% by weight |
| Cellulose acylate solution 01 | 12.8% by weight |

The cellulose acylate solution 01 (94.9% by weight), the mat agent solution 11 (1.3% by weight) and the retarder solution 21 (3.8% by weight), after filtered separately, were mixed, and the resulting mixture was cast using a band casting machine. The resulting web was peeled away from the band, and cross-stretched at a draw ratio of 36% at 140° C., using a tenter. Next, the clips were removed, and the film was dried at 130° C. for 40 minutes to produce a stretched cellulose acylate film (second retardation film 1). Thus produced, the stretched cellulose acylate film had a residual solvent content of 0.2% by mass, and its thickness was 80 µm.

| (Composition of Retarder Solution 22) | |
|---|---|
| UV absorbent (UV-1 mentioned above) | 20.0% by weight |
| Methylene chloride (first solvent) | 58.5% by weight |
| Methanol (second solvent) | 8.7% by weight |
| Cellulose acylate solution 02 | 12.8% by weight |

The cellulose acylate solution 02 (91.9% by weight), the mat agent solution 12 (1.3% by weight) and the retarder solution 22 (6.8% by weight), after filtered separately, were mixed, and the resulting mixture was cast using a band casting machine. The resulting web was peeled away from the band, and cross-stretched at a draw ratio of 36% at 140° C., using a tenter. Next, the clips were removed, and the film was dried at 130° C. for 40 minutes to produce a stretched cellulose acylate film (second retardation film 2). Thus produced, the stretched cellulose acylate film had a residual solvent content of 0.2% by mass, and its thickness was 78 µm.

Retarder (G):

Reference Example 5

Formation of Second Retardation Film 2

(Preparation of Cellulose Acylate Solution 02)

The following composition of cellulose acylate solution 02 was put into a mixing tank and stirred to dissolve the ingredients, thereby preparing a cellulose acylate solution 02.

| (Composition of Cellulose Acylate Solution 02) | |
|---|---|
| Cellulose acetate (having a substitution degree for acetyl group of 2.78) | 100.0% by weight |
| Plasticizer, triphenyl phosphate | 6.0% by weight |
| Plasticizer, biphenyl phosphate | 3.0% by weight |
| Methylene chloride (first solvent) | 347.0% by weight |
| Methanol (second solvent) | 52.0% by weight |

(Preparation of Mat Agent Solution 12)

The following composition of mat agent solution 12 was put into a disperser and stirred to dissolve the ingredients, thereby preparing a mat agent solution 12.

| (Composition of Mat Agent Solution 12) | |
|---|---|
| Silica particles having a mean particle size of 20 nm (AEROSIL R972, by Nippon Aerosil) | 2.0% by weight |
| Methylene chloride (first solvent) | 75.0% by weight |
| Methanol (second solvent) | 12.7% by weight |
| Cellulose acylate solution 02 | 10.3% by weight |

(Preparation of Retarder Solution 22)

The following composition of retarder solution 22 was put into a mixing tank and stirred under heat to dissolve the ingredients, thereby preparing a retarder solution 22.

Reference Example 6

Formation of Second Retardation Film 3

(Preparation of Cellulose Acylate Solution 03)

The following composition of cellulose acylate solution 03 was put into a mixing tank and stirred to dissolve the ingredients, thereby preparing a cellulose acylate solution 03.

| (Composition of Cellulose Acylate Solution 03) | |
|---|---|
| Cellulose acetate (having a substitution degree for acetyl group of 2.80) | 100.0% by weight |
| Plasticizer, triphenyl phosphate | 7.0% by weight |
| Plasticizer, biphenyl phosphate | 3.5% by weight |
| Methylene chloride (first solvent) | 347.0% by weight |
| Methanol (second solvent) | 52.0% by weight |

(Preparation of Mat Agent Solution 13)

The following composition of mat agent solution 13 was put into a disperser and stirred to dissolve the ingredients, thereby preparing a mat agent solution 13.

| (Composition of Mat Agent Solution 13) | |
|---|---|
| Silica particles having a mean particle size of 20 nm (AEROSIL R972, by Nippon Aerosil) | 2.0% by weight |
| Methylene chloride (first solvent) | 75.0% by weight |
| Methanol (second solvent) | 12.7% by weight |
| Cellulose acylate solution 03 | 10.3% by weight |

(Preparation of Retarder Solution 23)

The following composition of retarder solution 23 was put into a mixing tank and stirred under heat to dissolve the ingredients, thereby preparing a retarder solution 23.

| (Composition of Retarder Solution 23) | |
|---|---|
| Retarder (20) (see above) | 20.0% by weight |
| Methylene chloride (first solvent) | 58.5% by weight |
| Methanol (second solvent) | 8.7% by weight |
| Cellulose acylate solution 03 | 12.8% by weight |

The cellulose acylate solution 03 (94.7% by weight), the mat agent solution 13 (1.3% by weight) and the retarder solution 23 (4.0% by weight), after filtered separately, were mixed, and the resulting mixture was cast using a band casting machine. The resulting web was peeled away from the band, and cross-stretched at a draw ratio of 40% at 135° C., using a tenter. The film was relaxed at 10% in the transport direction. Next, the clips were removed, and the film was dried at 130° C. for 40 minutes to produce second retardation film 3. Thus produced, second retardation film 3 had a residual solvent content of 0.2% by mass, and its thickness was 83 μm.

TABLE 2

| | Cellulose Acylate | | Retarder 3 | | | |
|---|---|---|---|---|---|---|
| Sample No. | Sub. Degree for Acetyl Group | Sub. Degree for Propionyl Group | Type | Amount added* | Stretching Direction | Draw Ratio |
| Second Retardation Film 1 | 2.70 | 0 | G | 2.0 | Cross | 36% |
| Second Retardation Film 2 | 2.78 | 0 | UV-1 | 10 | Cross | 31% |
| Second Retardation Film 3 | 2.80 | 0 | (20) | 4.3 | Cross | 40% |

*% by weight relative to cellulose acylate.

Using an automatic birefringence meter (KOBRA-WR, by Oji Scientific Instruments), the first retardation films 1 to 4 and the second retardation films 1 to 3 produced in the manner as above were analyzed in an environment at 25° C. and 60% relative humidity for their Re and Rth at 446 nm, 548 nm and 628 nm. The results are given in Table 3 below.

TABLE 3

| Sample No. | Slow Axis Direction | Re (446) | Re (548) | Re (628) | Re(446)/ Re(548) | Re(628)/ Re(548) | Rth(446) | Rth(548) | Rth(628) | Rth(446)/ Rth(548) | Rth(628)/ Rth(548) | λ1.0[a] | Polarizing Plate |
|---|---|---|---|---|---|---|---|---|---|---|---|---|---|
| 1st Retardation Film 1 | Machine Direction | 45 | 38 | 36 | 1.18 | 0.95 | 257 | 228 | 220 | 1.13 | 0.96 | 360 nm | A |
| 1st Retardation Film 2 | Machine Direction | 41 | 31 | 29 | 1.34 | 0.93 | 217 | 176 | 163 | 1.23 | 0.93 | 411 nm | B |
| 1st Retardation Film 3 | Machine Direction | 29 | 27 | 26 | 1.07 | 0.96 | 197 | 182 | 171 | 1.08 | 0.94 | 322 nm | C |
| 1st Retardation Film 4 | Cross Direction | 38 | 42 | 43 | 0.93 | 1.02 | 128 | 134 | 137 | 0.96 | 1.02 | 336 nm | D |
| 2nd Retardation Film 1 | Cross Direction | 102 | 101 | 100 | 1.01 | 0.99 | 95 | 94 | 93 | 1.01 | 0.99 | 232 nm | E |
| 2nd Retardation Film 2 | Cross Direction | 121 | 100 | 93 | 1.21 | 0.93 | 239 | 192 | 177 | 1.24 | 0.92 | 411 nm | F |
| 2nd Retardation Film 3 | Cross Direction | 72 | 92 | 102 | 0.78 | 1.11 | 52 | 70 | 77 | 0.74 | 1.1 | 384 nm | G |

[a] λ1.0: Wavelength at which the absorbance of the film, as calculated in terms of the film having a thickness of 80 μm, is 1.0 within a wavelength range of from 200 nm to 700 nm.

Reference Example 7

Saponification of First Retardation Film 1

(Alkali Treatment of Film)

The first retardation film 1 formed was dipped in an aqueous 2.3 mol/L sodium hydroxide solution at 55° C. for 3 minutes. This was washed in a water bath at room temperature, and neutralized with 0.05 mol/L sulfuric acid at 30° C. Again, this was washed in a water bath at room temperature, and dried with hot air at 100° C. In that manner, the surface of the first retardation film 1 was saponified.

Saponification of First Retardation Films 2 to 4, and Second Retardation Films 1 to 3

The first retardation films 2 to 4 and the second retardation films 1 to 3 were saponified on their surfaces, in the same manner as that for the first retardation film 1.

Reference Example 8

Formation of Polarizing Plate (Saponification of Protective Film of Polarizer)

A commercially-available cellulose acylate film (TD80 by FUJITAC) was dipped in an aqueous 1.5 mol/L sodium hydroxide solution at 55° C. for 1 minute. This was washed in a water bath at room temperature, and neutralized with 0.05 mol/L sulfuric acid at 30° C. Again, this was washed in a water bath at room temperature, and dried with hot air at 100° C.

(Formation of Polarizing Element)

Iodine was adsorbed by a stretched polyvinyl alcohol film to prepare a polarizing element. Using a polyvinyl alcohol-based adhesive, the first retardation film 1 formed in Reference Example 7 and the cellulose acylate film saponified in Reference Example 8 were stuck to both surfaces of the polarizing element to fabricate a polarizing plate A. The absorption axis of the polarizer in the first polarizing plate and the slow axis of the first retardation film 1 were kept in parallel to each other.

Reference Example 9

Formation of Polarizing Plates B to G

Using the first retardation films 2 to 4 and the second retardation films 1 to 3, polarizing plates B to G were fabricated in the same manner as in Reference Example 8. In the polarizing plates B and C, the absorption axis of the polarizer was kept in parallel to the slow axis of the retardation film; and in the polarizing plates D to G, the transmission axis of the polarizer was kept in parallel to the slow axis of the retardation film.

Example 1

Construction of Liquid Crystal Display Device

FIG. 1 is referred to. To a VA-mode liquid crystal cell, the polarizing plate A as the upper polarizing plate 1 in FIG. 1 was stuck in such a manner that the first retardation film 1 could be on the side of the liquid crystal cell, and the polarizing plate G as the lower polarizing plate 12 was thereto in such a manner that the second retardation film 1 could be on the side of the liquid crystal cell, using an adhesive. That is, the first and second retardation films were stuck to the liquid crystal cell, each one on the viewers' side and on the backlight side. These were in a cross-Nicol configuration of such that the transmission axis of the polarizer on the viewers' side is in the vertical direction and the transmission axis of the polarizer on the backlight side is in the horizontal direction. In that manner, a liquid crystal display device 101 was constructed.

Liquid crystal display devices 102 to 104 of the invention and comparative liquid crystal display devices 201 and 202 were constructed in the same manner as above, for which, however, the upper polarizing plate and the lower polarizing plate were changed as in Table 2.

(Viewing Angle-Dependent Color Tone Change)

At a polar angle 60°, the liquid crystal display devices 101 to 104, 201 and 202 constructed in the above were tested for the color expression change at an azimuth angle of 0° and an azimuth angle of 80°, using a color analyzer (ELDIM's Ezcontrast). On an x-y chromaticity diagram, the absolute values Δx and Δy of the color expression change were obtained. The results are given in Table 4.

TABLE 4

|  | First Polarizing Plate | Second Polarizing Plate | Δx | Δy | Remarks |
|---|---|---|---|---|---|
| Liquid crystal Display Device 101 | Plate A | Plate E | 0.17 | 0.17 | Invention |
| Liquid crystal Display Device 102 | Plate B | Plate E | 0.21 | 0.20 | Invention |
| Liquid crystal Display Device 103 | Plate C | Plate E | 0.19 | 0.19 | Invention |
| Liquid crystal Display Device 104 | Plate B | Plate G | 0.18 | 0.19 | Invention |
| Liquid crystal Display Device 201 | Plate D | Plate D | 0.27 | 0.26 | Comparison |
| Liquid crystal Display Device 202 | Plate C | Plate F | 0.36 | 0.34 | Comparison |

From the results in Table 2, it is understood that the liquid crystal display devices 101, 102, 103 and 104 that satisfy the conditions in the invention are better than the comparative liquid crystal display device 201 in that the viewing angle-dependent color tone change of the former is smaller than that of the latter.

The liquid crystal display device 202 satisfies the conditions in the invention, but does not satisfy the condition of formula (A). Accordingly, compared with the comparative liquid crystal display device 201, the device 202 is good in that the viewing angle-dependent color tone change thereof is small. However, compared with the liquid crystal display devices 101, 102, 103 and 104, it is understood that the device 105 is not so good in point of the viewing angle-dependent color tone change thereof.

The invention claimed is:

1. A liquid crystal display device comprising a liquid crystal cell, a first polarizer disposed on one side of the liquid crystal cell, a second polarizer disposed on the other side of the liquid crystal cell, a first retardation film disposed between the first polarizer and the liquid crystal cell, and a second retardation film disposed between the second polarizer and the liquid crystal cell, wherein the absorption axis of the first polarizer and the slow axis of the first retardation film are substantially in parallel to each other, the transmission axis of the second polarizer and the slow axis of the second retardation film are substantially in parallel to each other, the first retardation film satisfies the following formulae (1) to (6), and the second retardation film satisfies the following formulae (7) to (12):

$$10\text{ nm} < Re(548) < 100\text{ nm} \tag{1}$$

$$20\text{ nm} < Rth(548) < 400\text{ nm} \tag{2}$$

$$1.0 < Re(446)/Re(548) < 2.0 \tag{3}$$

$$0.5 < Re(628)/Re(548) < 1.0 \tag{4}$$

$$1.0 < Rth(446)/Rth(548) < 2.0 \tag{5}$$

$$0.5 < Rth(628)/Rth(548) < 1.0 \tag{6}$$

$$40\text{ nm} < Re(548) < 300\text{ nm} \tag{7}$$

$$20\text{ nm} < Rth(548) < 400\text{ nm} \tag{8}$$

$$0.5 < Re(446)/Re(548) < 1.5 \tag{9}$$

$$0.5 < Re(628)/Re(548) < 2.0 \tag{10}$$

$$0.5 < Rth(446)/Rth(548) < 2.0 \tag{11}$$

$$0.5 < Rth(628)/Rth(548) < 1.5 \tag{12}$$

2. The liquid crystal display device according to claim 1, wherein the first retardation film and the second retardation film satisfy the following formula:

$$\lambda 1.0(1st) - \lambda 1.0(2nd) > 0 \tag{A}$$

wherein $\lambda 1.0(1st)$ indicates a wavelength at which the absorbance of the first retardation film is 1.0, as calculated in terms of the film having a thickness of 80 μm, within a wavelength range of from 200 nm to 700 nm; and $\lambda 1.0(2nd)$ indicates a wavelength at which the absorbance of the second retardation film is 1.0, as calculated in terms of the film having a thickness of 80 μm, within a wavelength range of from 200 nm to 700 nm.

3. The liquid crystal display device according to claim 1, wherein the first retardation film also serves as a protective film of the first polarizer and/or the second retardation film also serves as a protective film of the second polarizer.

4. The liquid crystal display device according to claim 1, wherein at least one of the first retardation film and the second retardation film is a cellulose acylate film.

5. The liquid crystal display device according to claim 1, wherein the first retardation film contains a compound having at least one absorption maximum within a range of from 200 nm to 380 nm.

6. The liquid crystal display device according to claim 1, wherein the first retardation film is a cellulose acylate film stretched in the longitudinal direction.

7. The liquid crystal display device according to claim 1, wherein the second retardation film is a cellulose acylate film stretched in the cross direction.

8. The liquid crystal display device according to claim 1, wherein the liquid crystal cell is a VA-mode cell.

* * * * *